US012728449B2

(12) United States Patent
Desrochers

(10) Patent No.: US 12,728,449 B2
(45) **Date of Patent: *Sep. 8, 2026**

(54) SYSTEM AND METHODS FOR CONTROLLING LABORATORY FUME HOOD MINIMUM AIRFLOW

(71) Applicant: Measured Air Performance, LLC, Merrimack, NH (US)

(72) Inventor: Eric Desrochers, Merrimack, NH (US)

(73) Assignee: Measured Air Performance, LLC, Merrimack, NH (US)

( * ) Notice: Subject to any disclaimer, the term of this patent is extended or adjusted under 35 U.S.C. 154(b) by 431 days.

This patent is subject to a terminal disclaimer.

(21) Appl. No.: 18/472,641

(22) Filed: Sep. 22, 2023

(65) Prior Publication Data

US 2024/0009715 A1 Jan. 11, 2024

Related U.S. Application Data

(63) Continuation of application No. 17/191,979, filed on Mar. 4, 2021, now Pat. No. 11,801,538.

(60) Provisional application No. 62/991,104, filed on Mar. 18, 2020.

(51) Int. Cl.
*B08B 15/02* (2006.01)
*F24F 3/163* (2021.01)

(52) U.S. Cl.
CPC ............ *B08B 15/023* (2013.01); *F24F 3/163* (2021.01)

(58) Field of Classification Search
CPC ............................... B08B 15/023; F24F 3/163
USPC ........................................................... 454/58
See application file for complete search history.

(56) References Cited

U.S. PATENT DOCUMENTS

| | | | |
|---|---|---|---|
| 4,150,606 | A | 4/1979 | Nelson |
| 4,893,551 | A | 1/1990 | Sharp et al. |
| 5,117,746 | A | 6/1992 | Sharp |
| 5,240,455 | A | 8/1993 | Sharp |
| 5,882,254 | A | 3/1999 | Jacob |
| 6,125,710 | A | 10/2000 | Sharp |
| 6,137,403 | A | 10/2000 | Desrochers et al. |
| 6,241,950 | B1 | 6/2001 | Veelenturf et al. |
| 6,561,892 | B2 | 5/2003 | Kolkebeck |
| 6,646,444 | B2 | 11/2003 | Dolgov et al. |
| 7,421,911 | B2 | 9/2008 | Desrochers et al. |
| 8,147,302 | B2 | 4/2012 | Desrochers et al. |
| 8,372,186 | B2 | 2/2013 | Dobbyn |

(Continued)

OTHER PUBLICATIONS

U.S. Appl. No. 62/834,526, filed Apr. 16, 2019, Desrochers.

(Continued)

*Primary Examiner* — Avinash A Savani
*Assistant Examiner* — Dana K Tighe
(74) *Attorney, Agent, or Firm* — DALY, CROWLEY, MOFFORD & DURKEE, LLP

(57) ABSTRACT

Methods, systems, and apparatus are described which can safely reduce a laboratory fume hood's minimum airflow and energy consumption when it is determined that the fume hood is not in active use, based on a condition monitoring approach. The condition monitoring approach may incorporate a combination of setback criteria to reliably determine if the fume hood is or is not in use. When a determination has been made that a fume hood is not in use, energy reduction is achieved via automatic methods of hood minimum airflow setback. Fume hood minimum flow reductions are automatically disabled when it is determined that the hood is in active use.

20 Claims, 37 Drawing Sheets

700A

(56) References Cited

U.S. PATENT DOCUMENTS

| | | | |
|---|---|---|---|
| 2007/0082601 | A1 | 4/2007 | Desrochers et al. |
| 2009/0191803 | A1 | 7/2009 | Barrette et al. |
| 2013/0068313 | A1 | 3/2013 | George et al. |
| 2019/0137126 | A1 | 5/2019 | Desrochers |
| 2021/0291242 | A1 | 9/2021 | Desrochers |

OTHER PUBLICATIONS

Cornell University Environmental Health and Safety Department, "Laboratory Chemical Hood Hibernation;" Laboratory Ventilation Management Program; Revised Jul. 1, 2015; 10 Pages.

Massachusetts Institute of Technology Green Labs, "Fume Hood Hibernation Request;" retrieved from https://greenlab.mit.edu/hoods on Apr. 15, 2020; 3 Pages.

Sharp, "Demand-Based Control of Lab Air Change Rates;" Article Published in ASHRAE Journal; Feb. 2010; 9 Pages.

University of Massachusetts/Amherst, "Standards for the Design, Construction, Maintenance, and Use of Laboratory Fume Hoods;" Revision Date of May 2006; 26 Pages.

U.S. Restriction Requirement dated Feb. 15, 2023 for U.S. Appl. No. 17/191,979; 8 Pages.

Response to U.S. Restriction Requirement dated Feb. 15, 2023 for U.S. Appl. No. 17/191,979; Response filed Apr. 14, 2023; 1 Page.

U.S. Notice of Allowance dated Aug. 3, 2023 for U.S. Appl. No. 17/191,979; 12 Pages.

(100)

(300)

400

500

600

800A

1000

1100

1600

1800

2000

2600

2900

SYSTEM AND METHODS FOR CONTROLLING LABORATORY FUME HOOD MINIMUM AIRFLOW

CROSS REFERENCE TO RELATED APPLICATIONS

The present application is a continuation of U.S. patent application Ser. No. 17/191,979, filed on Mar. 4, 2021, which claims the benefit of U.S. Provisional Patent Application No. 62/991,104, filed on Mar. 18, 2020, which are incorporated herein by reference.

FIELD OF THE DISCLOSURE

The present disclosure relates generally to the energy efficient and safe operation of a laboratory fume hood and, more particularly, to systems and methods used to safely reduce the minimum airflow through a laboratory fume hood.

BACKGROUND

Many facilities such as laboratories and other critical environments incorporate ventilated fume hoods (also known as laboratory fume hoods) to protect lab workers and other occupants from contaminants which may become airborne as compounds are used in experimentation, testing, manufacturing, and other applications. Herein, "fume hood" and "hood" shall be used interchangeably to describe a laboratory fume hood. An important factor with the operation of fume hood systems is that they have extremely high operating costs, due to fan energy and heating and cooling costs. When a lab space incorporates one or more fume hoods, each hood directly influences the amount of ventilation that must be supplied to the lab space. Lab facilities commonly employ what is known in the art as 100% outside air systems because the air which is supplied to a lab usually will not be permitted to include air that is recirculated from other parts of the lab facility. As air is exhausted from a lab space through fume hoods and other exhausts, air must be simultaneously added to the space to ensure that the space pressurization is properly maintained. Therefore, for each cubic foot per minute (CFM) of airflow exhausted through a fume hood, one CFM of outside air must be brought into the lab, because the lab supply air is comprised substantially of outside air. The air flowing into the lab from the supply and out of the lab from the fume hood exhaust not only requires fan energy from the supply and exhaust fans, but also energy may have to be expended to provide heating, cooling, dehumidification, and humidification of the outside air.

A standard sized fume hood which operates continuously may consume as much energy on an annual basis as a typical home. It is common for campuses of higher education institutions, as well as many commercial research facilities to contain hundreds of hoods. Thus, the fume hood related energy associated with just one campus can approach that of a small town, and energy efficiency improvements to fume hood operation can greatly impact overall building and campus energy use. A driving factor behind such improvements is the demand by the general public for more energy efficient and environmentally friendly building operating practices. This includes but is not limited to the need to reduce the effective carbon emissions associated with facility energy use, which is an objective that is seeing increasing support from the general public. For example, the US Green Building Council (USGBC) has established a rating system for the design, construction, operation, and maintenance of green buildings where a significant influence on a building's rating is based on energy use. The building rating is referred to as Leadership in Energy and Environmental Design (LEED). Most new building construction includes a LEED rating objective. As a further example, currently there is a movement towards Net Zero Labs. A Net Zero Lab (sometimes called a Zero Energy Lab) is a lab building with zero "net" energy consumption. This means that the energy used by the facility is equal to the amount of renewable energy created at that location or associated with that location. This ultimately may result in a facility that contributes less greenhouse gas to the environment than a facility that has no renewable energy source associated with it. Increasingly, public and private institutions are making a commitment to being environmentally responsible, in part by striving for Net Zero in their designs. Achieving a Net Zero Lab has been particularly challenging because of the level of ventilation energy that must be offset via renewable energy sources and, as a result, there have been relatively few successful Net Zero Lab projects to date. To achieve this goal, every aspect of lab energy consumption needs to be scrutinized, however, lab safety cannot be sacrificed when considering energy efficiency measures.

A fume hood is a specialized enclosure which, when connected to a lab exhaust system and control equipment provides an important function in protecting lab occupants from chemical and other contaminants. FIG. 1 is a general illustration of a common fume hood configuration.

The fume hood includes a movable sash 101, through which room air 103 from the space surrounding the hood 100 will flow through sash opening 102, through the interior of the hood and out through duct 105 which is connected to a lab exhaust system that regulates air flow 104. As room air 103 flows into opening 102, the velocity of the air flow into 102, herein "face velocity", is determined by the flow rate of 103 divided by the surface area of 102. For example, for a 6-foot-wide hood, if the sash 101 is opened at 1 foot above its fully closed position (a 6 square foot opening), a face velocity of 80 feet per minute results if the total flow rate of 103 is 480 CFM. The flow rate through opening 102 may differ from the flow rate out of the hood 104, due to fume hood leakage around the sash 101. The lab exhaust system may include a manifolded exhaust system in which a plurality of fume hoods and rooms may be connected to a common exhaust plenum served by one or more exhaust fans. Alternatively, the fume hood may be connected to an exhaust fan that is dedicated to that hood.

The fume hood of FIG. 1 is known as a bench style fume hood because it sits on a pedestal 106 that may incorporate cabinets for storage of equipment. There are, however, a wide range of fume hood types which may or may not include a pedestal 106 such as, for example, floor mount hoods which include but are not limited to walk-in style hoods. The sash 101 illustrated in 100 is known as a vertical moving sash however, in practice fume hoods may incorporate sashes which may slide vertically, horizontally, or in combination. The complexity of hood sashes varies considerably. Some hoods may incorporate any combination of double-hung, triple-hung, or even quadruple-hung sashes, and each vertically moving sash frame may contain any number of horizontal moving sashes depending on the fume hood's purpose. Some hoods may also contain only horizontally moving sashes and no vertical moving ones. The sash 101, for example, may be referred to as a single-hung vertical sash. Those experienced in the art of laboratory equipment will recognize that there are a wide variety of fume hood types including but not limited to: bench-top, walk-in, pass-through, distillation, auxiliary air, radioisotope, perchloric acid, California style and biosafety fume hoods, to name a few.

A fume hood's ability to contain and therefore isolate contaminants from the surrounding lab environment and its occupants can generally be influenced by the face velocity at the sash opening 102. In practice, most hoods may provide acceptable containment performance if they are configured to operate with a face velocity between 80 FPM and 100 FPM; however, there are exceptions to this, depending on hood construction, the amount of equipment loaded in the hood, and the hood's surroundings. Because the higher flow rates 104 and therefore energy use is required to operate at higher face velocities, it is advantageous to configure fume hoods at lower face velocities, provided the fume hood's containment performance is not sacrificed. One source of guidance on fume hood face velocities is ANSI Z9.5, which is a publication from the American Industrial Hygiene Association and is incorporated herein by reference. This standard not only includes guidelines for hood face velocities, but it also provides guidance on fume hood minimum flows when a hood sash is closed. When a fume hood is in use and the sash is open, ANSI Z9.5 recommends that an average hood face velocity within the range of 80 feet per minute (FPM) to 100 FPM may generally provide acceptable fume hood containment performance.

In what's known as a variable air volume (VAV) fume hoods, the laboratory fume hood's airflow 104 may be controlled so that air flow 104 varies in direct relation to opening 102. In some applications, this approach results in a relatively constant face velocity through the sash opening 102, while allowing the hood CFM 104 to be reduced as the sash opening is reduced, thus saving energy. As a result, a VAV hood's energy consumption is proportional to its sash height. One variation of a VAV hood strategy is known in the art as two-state hood control. With the two-state hood control technique, the hood flow 104 does not vary continuously with hood sash opening 102 but instead will operate at one of two flow values: a first minimum flow, when the hood sash is closed below a certain level, and a second maximum flow, when the hood sash is open above a certain level. In addition, as a less common type of VAV hood, it is possible to have a multi-state fume hood in which the fume hood's flow 104 may resolve to any number of discrete values with sash opening 102. With a multi-state fume hood, four or five discrete flow values 104 may be possible with sash opening 102.

FIG. 2 is a cutaway side illustration of a fume hood system, which includes the hood and its exhaust control device 206. The exhaust control device 206 may include a damper, a venturi valve, or some other airflow control element and control electronics, depending on the type of system. With a VAV hood, an airflow command to exhaust device 206 is established using sash position sensing and monitoring equipment which monitors the position of sash 101 and creates an airflow command that is proportional to the estimated sash opening 201 or a two state or multi-state command that is responsive to sash opening 201. As exhaust device 206 controls to this commanded flow, a fixed face velocity will be maintained at opening 201 over a determined operating range.

An alternative to a VAV fume hood is a constant air volume (CAV) hood. With a CAV hood, exhaust device 206 is set to deliver a fixed airflow value 104, and the fume hood is configured with a perforated bypass grille 204. When bypass grille 204 is perforated for this purpose, the opening it creates acts inversely with the sash opening 201 so that the combined opening is the same regardless of the position of sash 101. This results in a relatively fixed face velocity at opening 201, regardless of the sash position. CAV hood systems are relatively simple to implement since face velocity is maintained using the mechanical relationship of the sash to the bypass 204. Thus, with CAV hoods, exhaust flow device 206 may be a simple device such as a fixed damper without electronics. The big drawback to CAV hood systems is that they are very energy intensive, as they constantly operate at a high flow rate necessary to maintain the required face velocity as if the sash 101 is fully open.

Because of industry demand on lab designers to improve lab energy efficiency, the most recent version of the standard (ANSI Z9.5-2012) incorporates guidance for reduced fume hood minimum flows over previous versions of the standard. A fume hood's minimum flow rate is a parameter that mainly applies to hoods that are controlled via a VAV approach or variations thereof, such as for example two-state hood control. The purpose of a hood's minimum flow setting is to ensure that enough hood ventilation is provided to prevent the buildup of toxins, odors, corrosion, and potential fires or explosions in some cases. Because of this, a fume hood's minimum airflow is also commonly referred to as the minimum dilution airflow or dilution flow.

FIG. 3 further illustrates the operation of a typical VAV fume hood using example data from a common hood having a sash width of 6 feet and set to operate with a face velocity of 80 feet per minute. The vertical line 301 on the graph 300 is the bisecting point between two modes of the fume hood's operation, a first constant volume operation to the left of 301 and a second variable volume operation to the right of 301. These two modes of operation are dependent on sash opening as determined typically by sash position sensing equipment and the fume hood controls. As it relates to sash position, the bisecting point between a fume hood's constant volume and variable volume mode of operation may herein be referred to as the variable air volume sash threshold or, interchangeably, the VAV sash threshold. For vertically moving sashes 101, it is common for the fume hood controls to be set so that the constant volume range of operation occurs from the fully closed position of the sash up to a 6-inch sash opening 201. The first constant volume range is established to ensure that the fume hood's flow does not go below a pre-determined minimum value 302 necessary to provide adequate minimum flow of contaminants from sources held within the hood as the sash 101 approaches its fully closed position. The actual minimum flow value of 240 CFM shown in 300 is for illustrative purposes only, as actual values of 302 will vary with the hood dimensions and fume hood leakage. Fume hood leakage is the result of gaps in the fume hood construction which allows air to enter the hood through paths other than the sash opening 201. For example, leakage may result from the gap between the hood frame and the sash 101, such as leakage path 203. If a minimum flow 302 were not provided, then contaminants could build up to hazardous levels within the hood. As an example, this could result in hazards from combustible compounds from flammable liquids where vapors from such liquids could exceed lower explosion limits (LEL's). As another example, contaminant buildup could result in increased hood interior corrosion. A further consequence of not maintaining a minimum flow 302 is that when the sash 101 is closed, the hood's pressurization may not be adequate to ensure consistent directional flow to contain potential contaminants within the hood. This may additionally be influenced by localized airflow patterns on the hood's exterior, such as the flow of supply air from ceiling diffusers in the vicinity of the hood. When the hood is not sufficiently negatively pressurized, the eddies from the airflow around the hood's exterior can create localized negative pressure regions that can promote the escape of contaminants.

Often, fume hoods incorporate an airfoil 210 which limits the travel of sash 101. The purpose of an airfoil is to limit the extent to which the fume hood may be closed while ensuring most of the airflow is through the sash region and not predominantly through leakage paths (such as 203). A predominant flow 202 is established between the foil 210 and the work surface 208. This prevents undesirable airflow eddy currents and stagnation points behind the sash 101 at the hood's interior to ensure hood containment is well maintained and is predictable as the hood sash is closed.

In versions of the ANSI Z9.5 standard prior to 2012, the standard recommended a minimum fume hood air flow rate of 25 CFM per square foot of a fume hood's interior work surface area. The area of the work surface 208 is defined simply as the product of its depth 209 and the sash width. As an example, for a common sized 6-foot-wide hood having 10 $ft^2$ of work surface area, the minimum flow recommended by the older standard would be 250 CFM. In the 2012 version of ANSI Z9.5 it is suggested that the fume hood minimum CFM may be determined based on a fume hood air change rate of between 150 and 375 hood air changes per hour (ACH). For a common sized 6-foot fume hood, 150 ACH corresponds to a fume hood minimum flow of 120 CFM. Therefore, with the guidance from ANSI Z9.5-2012 the minimum flow setting of a typical 6-foot hood may be reduced from 250 CFM down to 120 CFM, assuming that there is no fume hood leakage and that the hood's containment performance will be adequate at the lower flow rate, given the hood's construction. In practice, however, there has been a tendency in the lab industry to save energy by setting fume hood minimum flows based on 150 ACH without verification, and in many cases this may significantly increase lab occupant exposure risk as many fume hoods do not perform well at this lower ACH value. This can especially be the case with fume hoods having multiple sashes, as such hoods operate with higher levels of leakage and generally require higher minimum flows to maintain good containment when the sashes are closed. As a result, uncertainty exists in the lab industry concerning the safety of fume hoods which are set to operate at 150 ACH. As such many practitioners have not adopted this lower hood flow value.

Methods do exist to directly and quantitatively verify fume hood containment, but these methods require the application of a tracer gas and sensing equipment and the tests can be time consuming and cumbersome to implement. This is a practical impediment to the use of this type of verification. ANSI/ASHRAE Standard 110-2016, which is incorporated herein by reference, includes flow visualization using smoke, face velocity and tracer gas tests to evaluate hood performance. These tests are evaluated with the sash opened to 25%, 50%, and 100% open positions but do not perform an evaluation at a sash position where the fume hood is operating within its constant volume mode of operation (sash opening 301 or lower). Of these tests, the flow visualization test is an example of a qualitative test, while the tracer gas test is quantitative. The velocity test, while it relies upon quantitative velocity measurement, only provides an indirect indication of fume hood containment. Further examples of smoke test methods are described within "Standards for the Design, Construction, Maintenance, and Use of Laboratory Fume Hoods" which is published by the Environmental Health and Safety department of the University of Massachusetts/Amherst which is incorporated herein by reference. This publication also provides details on how to qualitatively identify notable sources of fume hood leakage using smoke tests.

The lab industry's approach to fume hood operation assumes that contaminants are always present within the hood. The reason for this is that it can be difficult for individuals to keep track of activities within hoods and, even if chemicals and other hazards have been removed, non-visible contaminants may linger inside the hood for a period of time which can pose a health hazard to lab occupants. This is one reason why, for example fume hood exhaust flow will not be shut off after the hood is used, even though in many facilities hoods may be used less than 50% of the time. In some facilities, especially including higher education facilities such as universities, average fume hood use may be less than 30% of the time for many hoods. It is often common for example for labs in universities to be vacant for many weeks at a time, especially during vacation periods. Yet, the ventilation systems to these labs continue to operate during these periods.

U.S. Pat. No. 5,240,455, which is incorporated herein by reference, describes an example of an early innovation to improve fume hood energy efficiency by allowing the fume hood to operate at a relatively low face velocity based on occupancy conditions. This is accomplished by applying a presence and motion detection instrument to the front of a hood. If neither a presence nor an object motion condition exists in front of the hood, then it is assumed that it is safe to operate the hood at a reduced face velocity. This led to the development of the Zone Presence Sensor® product by Phoenix Controls Corporation, a subsidiary of Honeywell, located in Acton Massachusetts. The Zone Presence Sensor® is typically used to reduce a fume hood's face velocity from a normal level of, for example, between 80 FPM and 100 FPM when occupants or motion is present, to 60 FPM when there is no occupancy (either by presence or motion) in front and outside of the hood where personnel would normally stand. Although contaminants may exist within the hood when it becomes unoccupied, its face velocity can be reduced when human activity is not present while still maintaining containment. The Zone Presence Sensor® cannot be used to reduce hood minimum flows, other than under some circumstances where the hood's minimum CFM is set to a value higher than that needed to ensure proper containment when the sash 101 is closed or placed in a position within the hood's constant volume range of operation below the sash opening 301. The Zone Presence Sensor® mostly provides energy savings by lowering fume hood face velocity and therefore flow when the hood sash is left open after use. Far more energy may be saved simply by ensuring that a fume hood's sash is closed and kept closed after use.

An approach that is briefly described within U.S. Pat. No. 5,240,455 is the ability to provide an added criterion (in addition to presence and motion detection outside the hood) for reducing fume hood face velocity when it is additionally verified that a tracer gas that is applied to the hood is not detected at the face of the hood. This provides a way to verify that the fume hood continues to maintain containment when it is in its face velocity setback state. The patent does not describe how the tracer gas is detected or what the tracer gas is composed of.

Over the years of VAV hood use, the lab industry has developed solutions to what is generally referred to as "sash management" issues. Sash management is the act of simply ensuring that a VAV hood's sash is closed when the hood is not in use. Poor sash management can lead to significant energy waste as VAV fume hood sashes are left in an open position (above the minimum flow position 301, for example) when the hood is not in use. Products, such as the Zone Presence Sensor® improve upon the energy waste condition when there is poor sash management by reducing face velocity when the hood is not occupied. Another approach is to incorporate an audible alarm within the fume hood controls which is activated when the fume hood sash is left open and the hood becomes unoccupied. This approach utilizes an occupancy sensor which either is dedicated to the work area in front of the hood, or an occupancy sensor that is dedicated to the lab itself. Other approaches utilize a time schedule to signify that the lab is unoccupied. Such approaches to improve sash management using the described audible alarm may provide limited results given that, as the zone or lab room becomes unoccupied, an audible alarm may not be heard. Of these approaches, the method which incorporates occupancy detection of the work area in front of the hood generally provides better results as there is a higher probability that the alarm will be heard by lab personnel.

One approach to automatically improve sash management involves the use of what is known in the art as a sash closer. A sash closer is a device that is incorporated within the VAV fume hood controls which mechanically closes the fume hood sash, as the hood becomes unoccupied, thus saving energy. Over the years there have been a wide range of sash closer designs and most of which are best suited for fume hoods having a single hung vertically moving sash. U.S. Pat. No. 4,150,606, describes a fume hood sash closer (described as an attachment) which opens the hood sash in the presence of operating personnel and closes the hood sash when it becomes unattended. That disclosure includes a concept of a switch mat intended to be positioned on the floor in front of the hood to detect if the hood is unattended. Smart-Sash™ is an example of a sash closing product manufactured by Jamestown™ Metal Products of Jamestown New York. This sash closing system incorporates an infrared occupancy detector placed on front of the fume hood and an electric drive system which can be automatically overridden using a small opening or closing force applied by the hood operator. Another manufacturer and distributor of automatic sash systems is TEL Americas of Oshkosh Wisconsin. This manufacturer produces what is described as an auto sash controller. Like other types of sash closing systems, this system includes an infrared occupancy detector and is designed to close the sash when the operator is not present in front of the fume hood. It additionally includes a display and keypad that is mounted on the front of the hood that displays the status of the system and enables the user to raise and lower the sash via the keypad thereof. Intelli-Sash™, by Labconco Corporation of Kansas City Missouri is a competitive system with similar features to that made by TEL Americas.

There are several notable disadvantages to sash closing systems. First, due to the complexity of these electromechanical systems, they are prone to malfunction, and when they do, they can pose a safety issue to the hood operator. Even when these systems do work as designed, there is a tendency for interference between equipment which is held within the hood (such as beaker stands, beakers, chemicals, gas cylinders and other equipment) and the sash that is operated by the closing system. This can result in equipment damage and chemical spills, which can pose a hazard to lab occupants. In some cases when sash closing systems are used, fume hoods may use more energy than in cases where good sash management is employed. This is due to the automatic way most sash closing systems open the hood sash as lab occupants are present in front of hoods. In many cases a lab occupant may stand in front of a hood not only to gain access to the hood but, in many cases, to gain access to storage space underneath the hood or due to narrow corridors between hoods and other lab bench space. Sash closing systems are also most suitable for use with hoods having only a single hung vertically moving sash and this represents a small percentage of the fume hood types commonly used in the lab industry. For example, many of the larger hoods, such as larger bench top hoods and walk-in hoods are equipped with horizontal and, often, multiple vertically moving sashes. These types of hoods, because of their size, require higher ventilation levels and therefore may account for a large percent of the hood energy use in a lab facility; and yet, this energy use cannot be reduced using sash closing systems due to the complexity of the sash configurations.

U.S. Pat. No. 5,882,254 (issued to Jacob), which is incorporated herein by reference, describes an approach to reduce hood energy use by determining the usage condition of the hood based solely upon object detection within the hood. That patent describes the use of light emitting arrays placed on one side of the interior of the hood with detector arrays placed on the opposite side. Objects which are held within the fume hood would then break light beams emitted and therefore be detected, resulting in object detection. According to the description of that disclosure, the hood's flow rate may be reduced when objects are not detected in the hood. The approach makes no reference to other factors, such as recent chemical usage and whether elevated contaminants are present even though no object big enough to be detected by the light arrays are present. This can result in a chemical exposure issue to lab occupants as the approach described by Jacob reduces hood flow as no objects are detected within the hood, but does not address the presents of chemical residue after hood use. Further, according to Jacob's description, the hood may be operated at a lower flow by way of a proportional face velocity reduction as objects are placed towards the back of the hood. This suggests that the method of flow reduction considered by Jacob is intended only for the variable volume range of operation of a VAV hood and not a minimum flow reduction. One inconvenient aspect of this object detection approach is that, especially in more active labs, apparatus such as beakers, beaker stands, and other equipment may be kept within fume hoods on a long-term basis including periods of many days, months, or even years. It is common practice to leave such equipment in fume hoods because of the setup time of such equipment and due to limitations of storage space outside of the fume hood. As a result, when the object detection method is applied to hoods where equipment is not removed, the method will not provide any improvement to energy use as the system will not act to reduce the hood flow rate. Another problematic aspect is that object detection in the manner described results in a scenario where contaminants are assumed to not exist in the hood just because of the absence of apparatus which is large enough to be detected. In practice, activities within a hood often result in finite chemical spills which may off gas for long periods of time (often many hours) which can present an exposure hazard to lab occupants if the fume hood is not operating at a sufficient flow rate to contain these vapors. Under this scenario reducing flows as described by Jacob, can present a hazard to lab occupants as fume hood flows are reduced when a chemical spill is present, as the system will not detect the chemical spill. Further, the light emitting array object detector approach described by Jacob provides a limited ability to detect objects using a limited number of detectors which roughly may detect objects along a two-dimensional space that is parallel with the hood worksurface. This approach for example would not be effective at detecting objects which are held far above the hood worksurface towards the sash opening of a hood which may be held up using, for example, a beaker stand. Therefore, such an approach can result in the misdetection of objects, such as beakers which may hold chemicals. Another serious issue that can arise with a light emitting array/detector such as described by Jacob is the tendency for such optical object detectors to malfunction due to sensor fouling as the sensor elements described by Jacob are exposed to the harsh chemical environment within the hood. In the case of the light emitting array and detectors described by Jacob, fouling due to for example adsorption of chemical compounds on the sensor elements can eventually result in the false detection of objects which may result in the fume hood not being setback even when it is empty, resulting in energy waste.

The fume hood systems discussed thus far are known in the art as ducted hoods because the hoods, such as those of FIG. 1 and FIG. 2, are ventilated by connecting their exhaust duct 105 to lab exhaust ductwork which is connected to an exhaust fan system that mechanically draws the air from the hood. Another type of fume hood system is known as a ductless fume hood system or ductless fume hood. A ductless fume hood incorporates a dedicated fan or blower to draw air through the fume hood sash opening and hood interior. Instead of discharging this air into an exhaust duct 105, the air is routed through sorption material (the filter), such as activated carbon, which removes hood contaminants (particulates and gas vapors) from the air stream. The air stream is then returned to the lab space. One benefit of a ductless fume hood is that it enables fume hood operation within removing air from the lab, thereby eliminating the need to make up that airflow through the supply. This can significantly reduce supply related energy consumption. Ductless fume hoods are most suitable for labs which strictly limit chemical usage to compounds which are low in toxicity and odor. One reason for this is that the sorption material used in these hoods may saturate over time, at which point hood contaminants won't be completely removed from the air stream and these contaminants will then be directly introduced to the lab. As a result of the potential for filters to saturate, filters may be inspected to verify their condition on a periodic basis such as every 6 to 12 months. U.S. Pat. No. 8,372,186 B2, which is incorporated herein by reference, describes a ductless fume hood which incorporates a monitoring and detection system used to automatically check the integrity of the hood filter. It incorporates a photoionization detector (PID) and detection system to provide contaminant measurements at different layers within the hood's filter media.

Within the ventilation controls industry, the application of environmental monitoring for Indoor Environmental Quality (IEQ) sensing to control IEQ parameters is often referred to as active IEQ sensing or active sensing. IEQ sensing is accomplished either by applying discrete sensors installed within each building location or by way of a centralized monitoring approach in which a single enclosure or suite containing one or more sensors required to detect the compounds or parameters of interest is applied to sense a plurality of locations which are remotely located from the common suite of one or more sensors. The suite of the one or more sensors connects to each location using tubing and valves which may be sequenced to draw air samples from each location forming what is generally referred to as a multipoint air sampling system. Several of the advantages of using a multipoint air sampling system over a discrete sensor approach include but are not limited to superior measurement accuracy, ease of implementation, ease of sensor maintenance and lower initial sensor cost.

Multipoint air sampling systems can be used to sense airborne IEQ parameters at many locations throughout a building, including rooms, corridors, lobbies, interstitial spaces, mechanical spaces, and some locations within ductwork and plenums.

FIG. 4 is an illustration of a typical star-configured multipoint air sampling system. The system of FIG. 4 shows a star-configured multipoint air sampling system that can sense up to four locations 403A, 403B, 403C, 403D. Actual star-configured multipoint air sampling systems may sense from one to any number of locations, within a practical limit that is determined by the number of air sampling valves 404 that can fit within a single enclosure 401. Enclosure 401 contains sampling valves 404 which are sequenced via CPU/Valve Logic 406, via an electronic interface 404E which provides discrete electrical connections to open and close each valve 404A, 404B, 404C, and 404D based on a desired air sampling sequence. One side of each solenoid valve 404A, 404B, 404C, and 404D is connected to internal tubing backbone 409 which is used to convey each air sample from each monitored location through optional valving 405 so that airborne parameters in the air sample may be sensed by shared sensors 412. Typically, for a given internal backbone 409, the air sampling sequence will involve one air sample per monitored location 403 at a given time. Therefore, for example, as an air sample is taken from location 403A by opening valve 404A, valves 404B, 404C, 404D will remain closed. In some applications, the star-configured multipoint air sampling system will contain more than one isolated backbone 409 to enable a faster overall sampling sequence by allowing the transport of a sample from a location other than 403A, 403B, 403C, 403D to be conveyed or setup while the shared sensor 412 is busy sensing a sample from one of 403A, 403B, 403C, 403D. This approach is sometimes referred to as an "alternating backbone" or "alternating limb" sampling technique.

In some star-configured multipoint air sampling systems, the process of obtaining an air sample from each location 403A, 403B, 403C, 403D involves two steps; a first step wherein the air sample from the desired location is transported at a higher flow rate than could be supported by the shared sensors 412, followed by a second step wherein the air sample flow rate is reduced to a lower flow rate that is more suitable for the shared sensors 412. The higher flow rate associated with the first step is often referred to as the purge flow rate while the lower flow rate associated with the second step is often referred to as the sample flow rate. The purge flow rate is often a value of 10 times or more than the low flow rate. For example, an air sample may first be conveyed at a purge flow rate of 20 liters per minute from the monitored location and it will then be sensed at a flow rate of 2 liters per minute. Optional valving 405 is used to facilitate the switching between the purge and sample flow rates and is controlled by CPU/Valve Logic 406 in conjunction with flow control 414 which is responsible for regulating the air flow rates.

An example of a star-configured multipoint air sampling system is described in U.S. Pat. No. 6,241,950, which is incorporated herein by reference. Other types of systems known in the art of environmental monitoring include those that are designed to sense refrigerant gases and other related toxic gases. For example, the Bacharach Multi-Zone Gas Monitor, which is a refrigerant monitoring system manufactured by Bacharach Inc., can be configured to sense halogens, ammonia, carbon dioxide and many other compounds. This is a star-configured multipoint air sampling system that can be applied to monitor up to 16 different locations. The MultiGard™ 5000, which is manufactured by MSA Safety Incorporated, can be configured to sense a broad range of refrigerant gases, carbon monoxide and other compounds. This is a star-configured multipoint air sampling system that can be applied to monitor up to 32 locations. Several of MSA Safety Inc. products incorporate photoacoustic infrared sensing for specialized sensing of refrigerant gases, including ammonia.

FIG. 5 is an illustration of a typical distributed configuration multipoint air sampling system. As can be seen from FIG. 5, the distributed configuration has all the elements of a star-configured multipoint air sampling system, but these elements such as valves 504A, 504B, 504C, 504D reside in a separate enclosure and valve assembly 517 that may be located separately from enclosure 501 which houses the shared sensors 512 and flow and valve logic. Enclosure 517 may incorporate from one to any number of valves and each enclosure 517 on network connection 516 may have a different number of valves. One characteristic feature of a distributed configuration multipoint air sampling system is the use of an external common backbone 509 which may be used to connect to a number of air sampling valves both including and in addition to valves 504A, 504B, 504C, 504D. By locating valve assemblies like 517 using a common backbone 509, the amount of tubing 402A, 402B, 402C, 402D needed to span the distance between shared sensors 512 and the monitored locations 403A, 403B, 403C, 403D is dramatically reduced, as compared to applications with a star-configuration multipoint air sampling system. Another key feature of such a system as 500 is network connection 516, which is used by CPU/Valve logic 506 to communicate with CPU 518 in order to remotely command valves 504A, 504B, 504C, 504D to their required state. To increase the overall number of locations which can be monitored by 500, more valve assemblies like 517 can be installed within the facility and connected to network 516 and backbone 509. Because of the network 516, the distributed configuration multipoint air sampling system such 500 is also referred to as a networked air sampling system. Another variation of a distributed configuration multipoint air sampling system involves using Information Management Server 520 to provide the sequencing logic to CPU 506, rather than maintaining such a program within 506. Information Management Server 520 communicates with CPU 506 via a network 519, which is separate from network 516. In practice, networks 519 and 516 are implemented on what's known in the art as an RS485 physical layer, which is a robust digital communications protocol design for reliable operation over long distances within buildings. Network 519 is also designed to support connections to other CPU's providing the function of 506 for other systems, and this enables Information Management Server 520 to remotely control a plurality of multipoint air sampling systems within a building. Connecting all the multipoint air sampling systems in a building to one common Information Management Server 520 enables better overall management and monitoring of systems 500 using internet connection 521.

An example of a distributed configuration multipoint air sampling system is described in U.S. Pat. No. 6,125,710, which is incorporated herein by reference. One example of a commercially available system that is a distributed configuration multipoint air sampling system is known as the Aircuity® system or OptiNet® system, made by Aircuity Inc. of Newton Massachusetts. The Aircuity® system incorporates an Air Data Router which is similar to the components in enclosure 517, a sensor suite or SST product which is similar to the components within 501, and an Information Server or IMS, similar to 520.

Tubing 402A, 402B, 402C, 402D usually connect to each location 403A, 403B, 403C, 403D by way of a duct probe element if the air sample is being taken from ductwork or, by way of a wall or ceiling mounted probe or aspiration device, if the air sample is being acquired from a room location. U.S. Pat. No. 7,421,911 B2, which is incorporated herein by reference, describes a suitable duct probe for use with a multipoint air sampling system. Once the air sampling interval has been completed for location 403A, the system will then sequence to obtain an air sample from the next designated location (location 403B for example). The air sampling sequence will continue until all locations 403A, 403B, 403C and 403D have been sampled.

Shared sensors 412 and 512 within FIGS. 4 and 5 may include one or a plurality of sensors. These one or more sensors are said to be "shared" because they are applied to the one or more locations sensed by the multipoint air sampling system. This shared sensor approach provides great advantages over the use of discrete sensors applied to each location. The cost benefit of a shared sensor approach is that it reduces the number of sensors which would have to be purchased to sense each location if one were to apply a discrete sensor to each location. The accuracy benefit of a shared sensor approach is partially related to the fact that a shared sensor approach requires fewer sensors than a discrete sensor approach which makes it feasible to address the maintenance related calibration of sensors. An added factor, however, is that when IEQ sensing of multiple locations is performed using discrete sensors in these locations the finite calibration related errors from each discrete sensor stack together as sensed values are compared from one location to the next. This tolerance stacking is virtually eliminated with the shared sensor approach. The maintenance benefit of a shared sensor approach is that, by reducing the number of sensors which need to be maintained the cost and labor associated with this maintenance can be significantly reduced. Sensor maintenance is a critical requirement for any sensor technology designed for IEQ monitoring, as typically most sensors should be serviced and recalibrated every 6-12 months, even when monitoring relatively clean indoor environments.

Multipoint air sampling systems 400, 500 are used for IEQ monitoring and active sensing in both lab and non-lab environments. Within the non-lab environment, such as office environments, for example, a system 400 or 500 may incorporate any number of sensing options for shared sensors 412, 512 including but not limited to sensors for: airborne particulates, CO, CO2, moisture, and TVOC's. Office environments have generally been viewed by engineers of ventilation systems as being less critical environments when compared to labs, in terms of the compound exposure risks to occupants and especially in terms of the energy savings benefits associated with active sensing, so sensing or active sensing applications which would involve the same breadth of sensing more commonly applied in labs is a less common application in non-lab settings. "Multi-parameter" demand control ventilation has nevertheless been used in non-lab spaces to regulate ventilation levels in order to achieve a healthier environment for occupants. Most non-lab environments are clean in terms of contaminant levels. Given the high level of air cleanliness seen in non-lab spaces, as a PID sensor is applied to multi-parameter demand control ventilation applications as one of shared sensors 412, 512 the PID can reliably detect many compounds or species at concentrations of a few tens of parts per billion and perform this function reliably over a period of many months.

One lab ventilation application where active sensing is applied using a multipoint air sampling system 400, 500 involves lab room or area-based demand control ventilation (DCV), herein Lab DCV. In Lab DCV applications, the multipoint air sampling system 400, 500 is used to measure IEQ parameters within the lab space in order to control the air change rate of the lab space, based on the level of contaminants that are present within the lab. The measured IEQ parameters in Lab DCV applications are sampled by system 400 or 500 at locations in the lab space that are representative of the air that lab occupants are exposed to. These locations that are representative of air that the lab occupants are exposed to (the occupant breathing zone) may be sampled by 400 or 500 from wall mounted probes or, more typically, from a duct probe which is connected to the general exhaust exiting the lab space. Lab general exhaust is substantially representative of occupant breathing zone conditions, as it usually will not contain exhaust from fume hoods and other pollutant sources but will comprise only the air that is in the lab space itself, which is substantially the breathing zone air. Sensing applied for Lab DCV applications typically includes at least some form of volatile organic compound (VOC) sensing, but also may include sensing for a variety of other parameters, including but not limited to airborne particulate levels, carbon monoxide (CO), carbon dioxide (CO2), and acid gas sensing. One of the more important sensor technologies commonly used to sense contaminants within the lab environment and used in most Lab DCV implementations is known in the art as the photoionization detector or PID.

The photoionization detector or PID has been the sensor of choice for lab IEQ monitoring due to its excellent sensitivity and its ability to detect a very broad range of compounds which are often used in the lab environment. In the art it is said that the PID cannot "speciate" or discern one gas compound from another. PID's are used extensively for a variety of environmental health and safety applications because of their ability to detect hundreds of different compounds and especially volatile organic compounds (VOC's). A PID can also detect a limited number of inorganic compounds as well and this includes some of the higher risk non-organic compounds such as ammonia and arsine for example. U.S. Pat. No. 6,646,444, which is incorporated herein by reference, describes an exemplary PID used as one of the shared sensors 412 and 512 within systems such as system 400 or 500, respectively.

One characteristic of a photoionization detector is that it can provide a signal that is simultaneously responsive to multiple compounds. This is sometimes referred to as a "broadband" sensing characteristic. Other types of broadband sensors include but are not limited to metal oxide semiconductor (MOS) sensors, flame ionization detectors, and total organic compound (TOC) infrared sensors. With a PID, the photoionization occurs as a molecule absorbs a photon of energy at a sufficient level to release an electron to create a positive ion. This takes place when the ionization potential of the molecule in electron volts (eV) is less than the energy of the photon. A PID uses a specialized ultraviolet lamp as its photonic source. It is common to use PIDs with lamps which operate at 10.6 eV, as these lamps tend to be reasonably durable for detecting compounds in most occupant environments while also providing a broad detection range. As a compound is ionized by the lamp, electron flow is measured by a detector electrode, and this current is proportional to the concentration of the gas that has been ionized. Different compounds can be ionized at a given time, allowing the sensor to be responsive to concentrations of multiple compounds. A PID is also an extremely sensitive device which, when used in relatively clean environments, can reliably detect many compounds at concentrations of a few tens of parts per billion and perform this function reliably over a period of many months.

A PID has different sensitivities to different compounds. This is known in the art as a response factor or "RF". Often a PID will be calibrated on a specific gas, such as isobutylene for example, and the response factor of the PID to a particular compound will be referenced to its response to isobutylene. Response factors will vary slightly from one PID design to another. For example, a typical PID response factor for acetic acid is 11. This means that the PID's response to 1 part per million (ppm) of isobutylene is 11 times that of its response to 1 ppm of acetic acid. Therefore, when such a PID is exposed to 1 ppm of acetic acid, it will read 0.09 ppm in units of isobutylene. In the art, this would be described as a reading of "0.09 ppm as isobutylene". A response factor influences the sensor's ability to detect a compound at a given threshold. Detection will be most limited for compounds which have a combination of very low TLV or odor thresholds and very high response factors. In the case of acetic acid, which has an odor threshold of 0.016 ppm, it would not likely be detected by the PID in this example at its odor threshold, because this would be a reading of (0.016 ppm/11) 0.0014 ppm as isobutylene, which is beyond the resolution of most PID's.

The Lab DCV application typically varies the air change rate of a lab room in direct proportion to the level of the sensed IEQ parameter that is present within the lab room. With such an approach, the lab space may operate at a minimum occupied air change rate of 4 air changes per hour (ACH), when the lab is relatively free of IEQ contaminants and upwards to 10 ACH or even higher as the lab space IEQ contaminant levels reach some pre-determined level. A common impediment to operating labs at 4 ACH is that the cumulative hood minimum flows for a lab may result in ACH values significantly higher than this. During unoccupied hours, it is also possible to allow the lab ACH value to be reduced to a minimum of 2 ACH using this DCV strategy, again if the fume hood minimum flows do not exceed this value. Without the active control provided via Lab DCV, lab minimum ACH values are often fixed to a value of 6 to 8 ACH, depending on the lab ventilation design. U.S. Pat. No. 8,147,302 B2, which is incorporated herein by reference, describes exemplary Lab DCV systems and methods, including the use of a differential IEQ measurement. The differential IEQ measurements references a lab air quality measurement to the air quality measured within the supply air duct serving the lab in order to make the DCV control non-responsive to IEQ contaminants within the supply duct. Lab DCV enables reductions in fan energy and heating and cooling energy usage, as a result of reduced ventilation levels. This is based on the knowledge that most lab spaces are relatively free from contaminant levels most of the time. In an ASHRAE Journal article "Demand-Based Control of Lab Air Change Rates" [Sharp, ASHRAE Journal, February 2010], incorporated herein by reference, Sharp presents data representing many labs taken over 1.5 million hours of operation. The data shows that the labs of this study were relatively free from contaminants more than 99% of the time. Given the high level of air cleanliness seen in labs, as a PID sensor is applied to Lab DCV applications as one of shared sensors 412, 512 the PID can reliably detect many compounds at concentrations of a few tens of parts per billion and usually perform this function reliably over a period of many months. However, should the PID malfunction due to component failure or calibration drift the Lab DCV application may deliver too much or too little ventilation, resulting in either energy waste or a potential IEQ problem.

U.S. application Ser. No. 16/141,109, which is incorporated herein by reference, describes an improved multipoint air sampling system and methods for implementing exhaust demand control. The improved multipoint air sampling system significantly reduces the potential for sensor calibration drift or degradation by implementing a "sensor protective mode" which isolates sensors when measured contaminant levels exceed a predetermined threshold. Such a system and methods described within U.S. application Ser. No. 16/141,109 makes it possible to apply sensors, such as PID's and other sensors to monitor the harsh lab exhaust environment found within the inlet of lab exhaust fans or within the duct riser connecting to a lab exhaust plenum. It further makes it possible to reliably provide a method of setting back the exhaust fan system when it is found by the multipoint air sampling system of that disclosure that the lab exhaust air is relatively free of contaminants. A further benefit disclosed in that patent application is that the system promotes good fan stability by preventing the described fan setback from being influenced by perturbations of contaminant concentrations present within the exhaust risers or fan inlet. Methods of providing the sensor protective mode disclosed within U.S. application Ser. No. 16/141,109 include system-based methods of isolating the one or more sensors used by the multipoint air sampling system from the measured contaminants when measured contaminant concentrations exceed a predetermined action level. SmartStack® is a product manufactured by Measured Air Performance, LLC. of Manchester New Hampshire, which is based upon U.S. application Ser. No. 16/141,109. As disclosed by U.S. application Ser. No. 16/141,109, if the measured contaminant concentration from any of the one or more locations (duct riser locations) monitored by the multipoint air sampling system exceeds a predetermined action level then, using system-based isolation methods, the one or more sensors will be isolated from all monitored locations. This is different than how the legacy multipoint air sampling systems previous to that disclosed in U.S. application Ser. No. 16/141,109 operate (such as for example that described in U.S. Pat. No. 6,125,710) which continue to take air samples and therefore expose their one or more sensors to contaminants regardless of the concentration of the contaminants sensed. Herein, the legacy multipoint air sampling systems (such as that described in U.S. Pat. No. 6,125,710) may be referred to as continuous monitoring systems, while that described in U.S. application Ser. No. 16/141,109 may be referred to as a sensor protective system. A further aspect of the disclosure described within U.S. application Ser. No. 16/141,109 includes a method of simultaneously flushing the tubing that is connected between the multipoint air sampling system and all exhaust locations, when contaminant levels above a defined action level are detected from any location. The flushing of the tubing provides a beneficial action of removing adsorbed contaminants to prevent contaminant buildup within the tubing which may otherwise create a false positive condition as the multipoint air sampling system resumes its sensing operation.

U.S. application Ser. No. 12/019,223 (Barrette et al.), which is incorporated herein by reference, describes a fume hood system that has a decommission mode. The decommission mode that is described may be initiated in a variety of manual ways, such as using a push button sequence on the fume hood monitor or a switch associated with the fume hood monitor, or it may be enabled through a network command or through the building management system. However, it is the user's responsibility to verify that the hood is safe to decommission before activating this mode of reduced hood ventilation. Aspects of what is disclosed within the application by Barrette are similar to elements of U.S. Pat. No. 5,882,254 (Jacob), described above, in that Barrette et al. describes a method of providing object detection as a method of automatically disabling the described decommission mode if objects are found within the hood. Similarly, Jacob describes a method of reducing a fume hood's airflow when objects are not detected within the fume hood. Another method described by Barrette et al. includes a method of disabling the described decommission mode if the fume hood sash is determined to be open. Barrette further describes the use of motion or occupancy detection in front of the hood, where occupants may stand, as a method of disabling the described decommission mode. As disclosed by Barrette et al., this method of determining occupancy is based upon the Zone Presence Sensor® product by Phoenix Controls Corporation. Barrette et al. also describes a system which includes a fume sensor placed inside the fume hood enclosure used to detect chemical fumes and, when fumes are detected, the sensor creates a signal that causes the fume hood to exit decommission mode. Details are not provided by Barrette et al. on the type of sensor intended for chemical fume detection, nor what compounds it may detect. Those experienced in the art of fume hood controls will recognize that a decommission mode may refer to the act of temporarily taking a hood out of service, either for maintenance purposes or for purposes of saving energy by either reducing the operating airflow rate through the hood or even by shutting off all airflow to the hood which is not in use. Barrette et al. specifically recommends that "Proper standard operating procedures should be in place for removing chemicals from the fume hood enclosure . . . before it is decommissioned".

The act of manually taking a fume hood out of service is common to most lab facilities and, one reason to do so can be to save on energy use when a hood is not intended to be used for an extended period of time In particular, most environmental health and safety (EH&S) departments maintain written procedures and strict guidelines for this purpose as, once a hood's flow has been reduced to values below normal operation, it may not be safe to use the hood as a containment vessel for chemicals or experiments while it is in this state. As an example, Cornell University's EH&S department provides written guidance on what they describe as "Laboratory Chemical Hood Hibernation", which is incorporated herein by reference. As another example, the Massachusetts Institute of Technology's Green Labs website (https://greenlab.mit.edu/hoods) encourages lab users to identify hoods which may be candidates for placing into a state of hibernation, and outlines a procedure to accomplish this. Generally, taking a fume hood out of service is a process which requires review from EH&S, as it involves interrupting or disabling the fume hood air flow controls so that the airflow may be fixed to a desired low level which may be much lower than the normal operating minimum airflow of the fume hood and is commonly set to the minimum possible flow (including the possibility of a complete shutoff of airflow) that may be delivered by the fume hood air flow control device. Once a fume hood has been decommissioned, it must be manually recommissioned and tested before it may once again be used. This is not an easy process and requires effort and coordination between EH&S, lab personnel, and facilities personnel who are skilled with the fume hood controls.

Many commercially available fume hood control systems support methods of reducing fume hood flows, such as a hibernation mode, when it is determined that a hood shall not be used by providing analog or digital inputs with their controllers for this purpose that a switch, binary signal, or other signal may be connected to. When a hibernation mode is implemented an activating signal to the fume hood controls results in a reduction of fume hood airflow by a preprogrammed amount or to a preset value regardless of whether it is safe to do so. Instead, in the case of hibernation mode, the verification as to whether it's safe to reduce the airflow rate of the fume hood is manually determined by EH&S and other parties. Unlike a face velocity setback function, a hibernation mode function may result in a reduction in a fume hood's minimum airflow setting, which may dramatically reduce the fume hood's ability to provide containment when contaminants are present within the hood, even if the hoods sash is closed. As an example, the AVC fume hood controls system manufactured by Accutrol, LLC of Danbury Connecticut, provides up to 4 different levels of fume hood setback through which it is possible to implement a hibernation mode when working closely with EH&S and other parties responsible for lab safety. Within their AVC product brochure, which is incorporated herein by reference, they also clearly define a hood hibernation mode based on an adjustable setting of sash opening using their product's software. Another example of a fume hood control system which supports methods of a hibernation mode includes the Vantage system by Phoenix Controls Corporation of Acton Massachusetts. As described by the Vantage product brochure, which is incorporated herein by reference, the Vantage system includes a switch input on their Sentry-SE fume hood display to support hood hibernation mode. The methods of hibernation mode provided by the fume hood controls described above generally involve a manual setting at the fume hood controls to activate the hibernation or setback function and these controls do not include an automated reliable method of determining that it is safe to reduce fume hood minimum ventilation. Usually, hibernation mode is therefore restricted for use with fume hoods that are no longer intended for use due to maintenance reasons or for conditions where the quantity of hoods needed in a facility has reduced. Due to the expense of providing ventilation to unused fume hoods, the unused hoods may be placed in a hibernation mode, usually for extended periods of time.

U.S. Pat. No. 9,494,324 (Livchak et al.), which is incorporated herein by reference, describes a system and methods for controlling the exhaust flow rate associated with a cooking appliance. A method described by Livchak involves a determination of a kitchen exhaust hood positioned above a cooking appliance based on a determination of the status of the cooking appliance using the combination of an exhaust temperature measurement and the radiant temperature measurement of a surface associated with the appliance. The patent describes the use of an IR sensor to obtain radiant temperature measurements, such as from the surface of a cooking range.

BRIEF DESCRIPTION OF THE DRAWINGS

The foregoing features may be more fully understood from the following description of the drawings.

DETAILED DESCRIPTION

Figure 1:
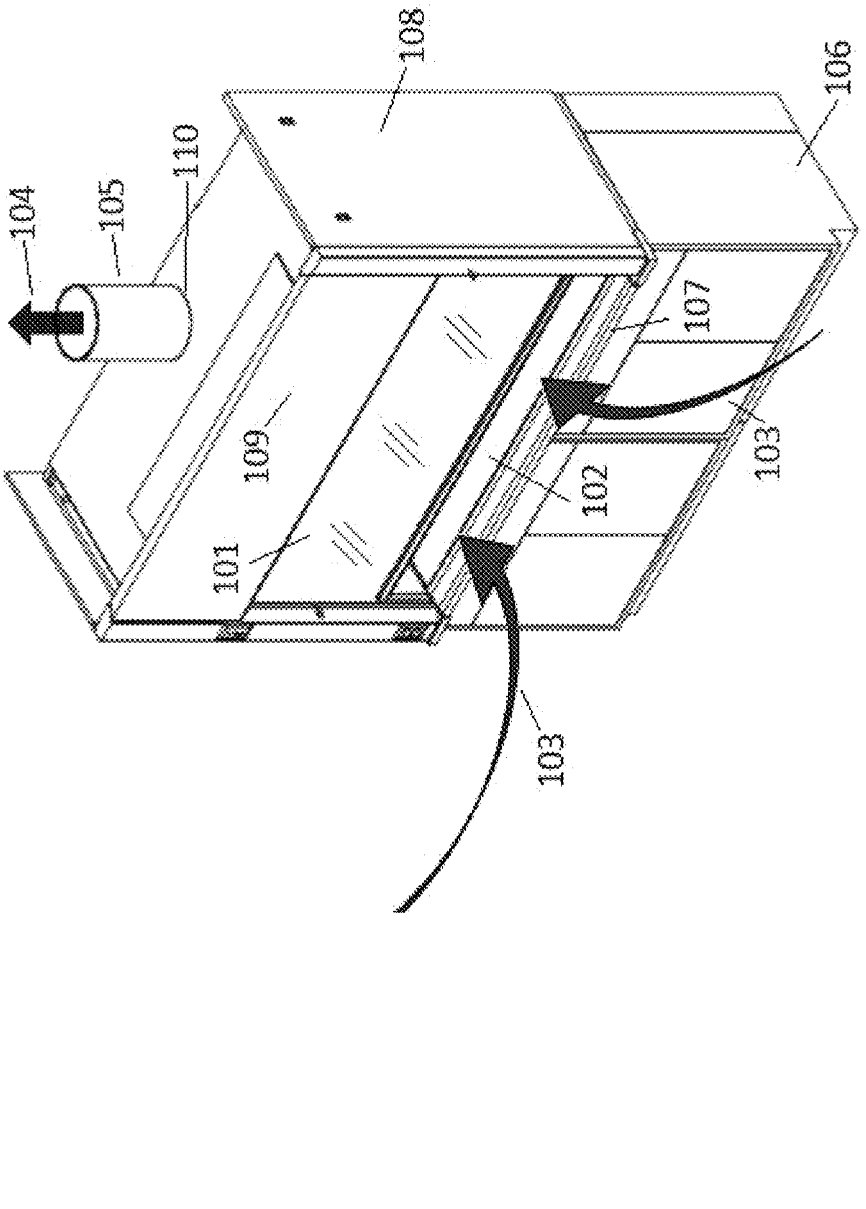
Figure 1 (Prior Art)
FIG. 1 illustrates a common fume hood configuration.
Figure 2:
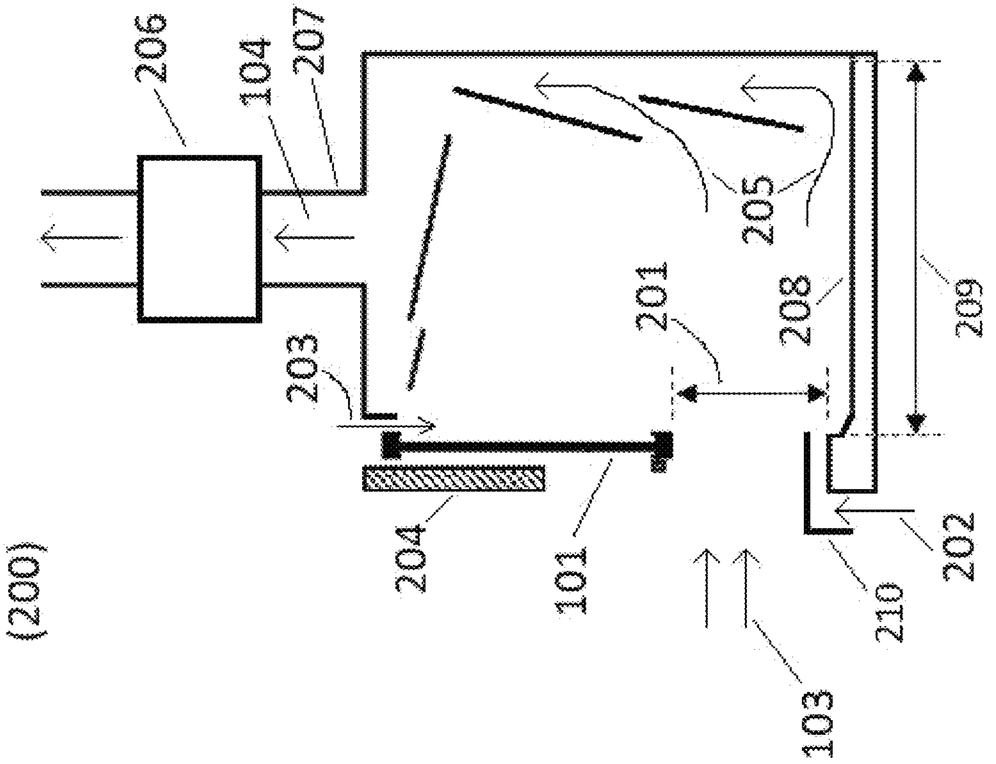
Figure 2 (Prior Art)
FIG. 2 illustrates a cutaway side of a fume hood system, which includes the hood and its exhaust control device.
Figure 3:
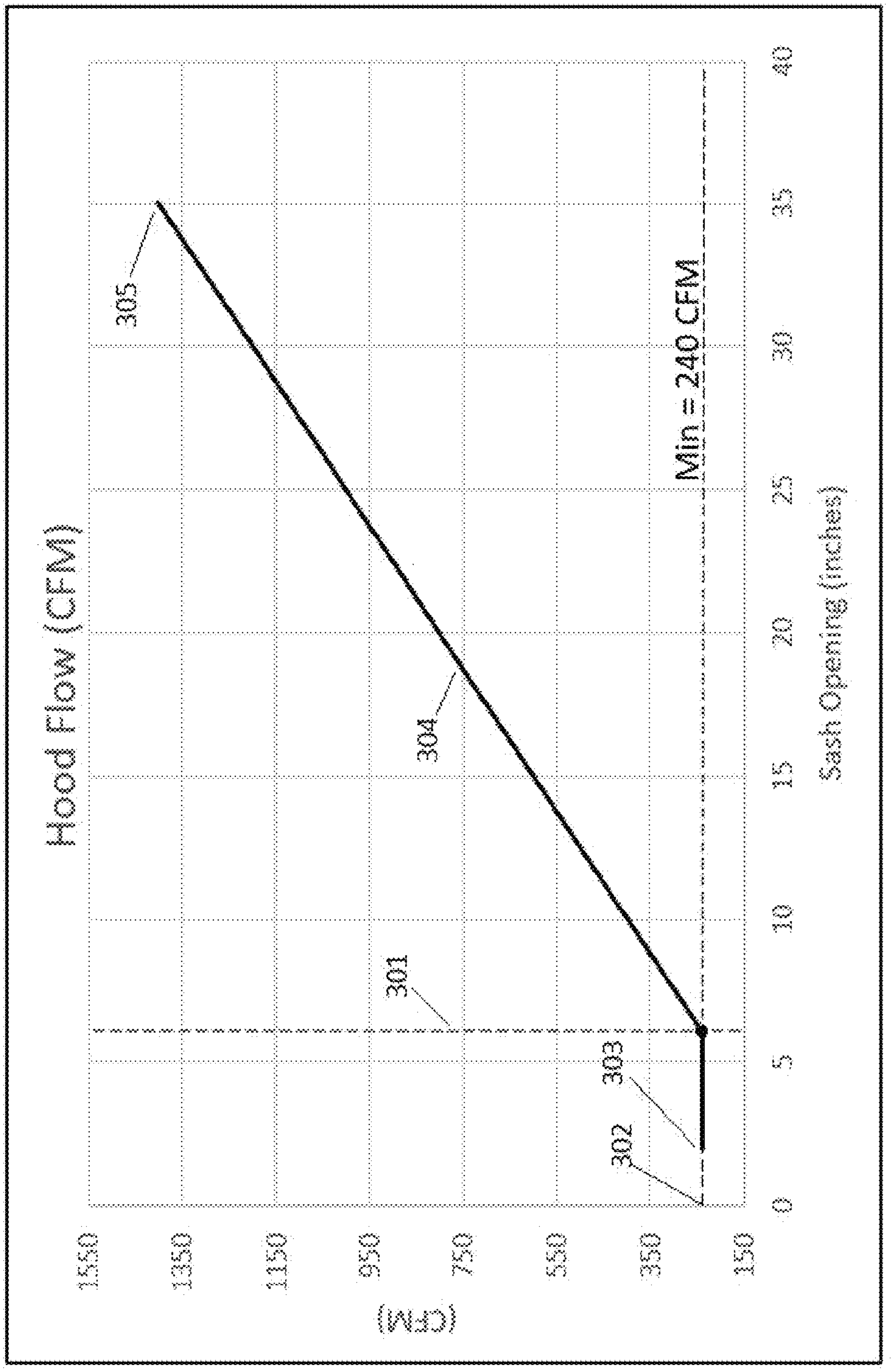
(Prior Art) Figure 3
FIG. 3 illustrates the operation of a VAV fume hood using example data from a common hood.
Figure 4:
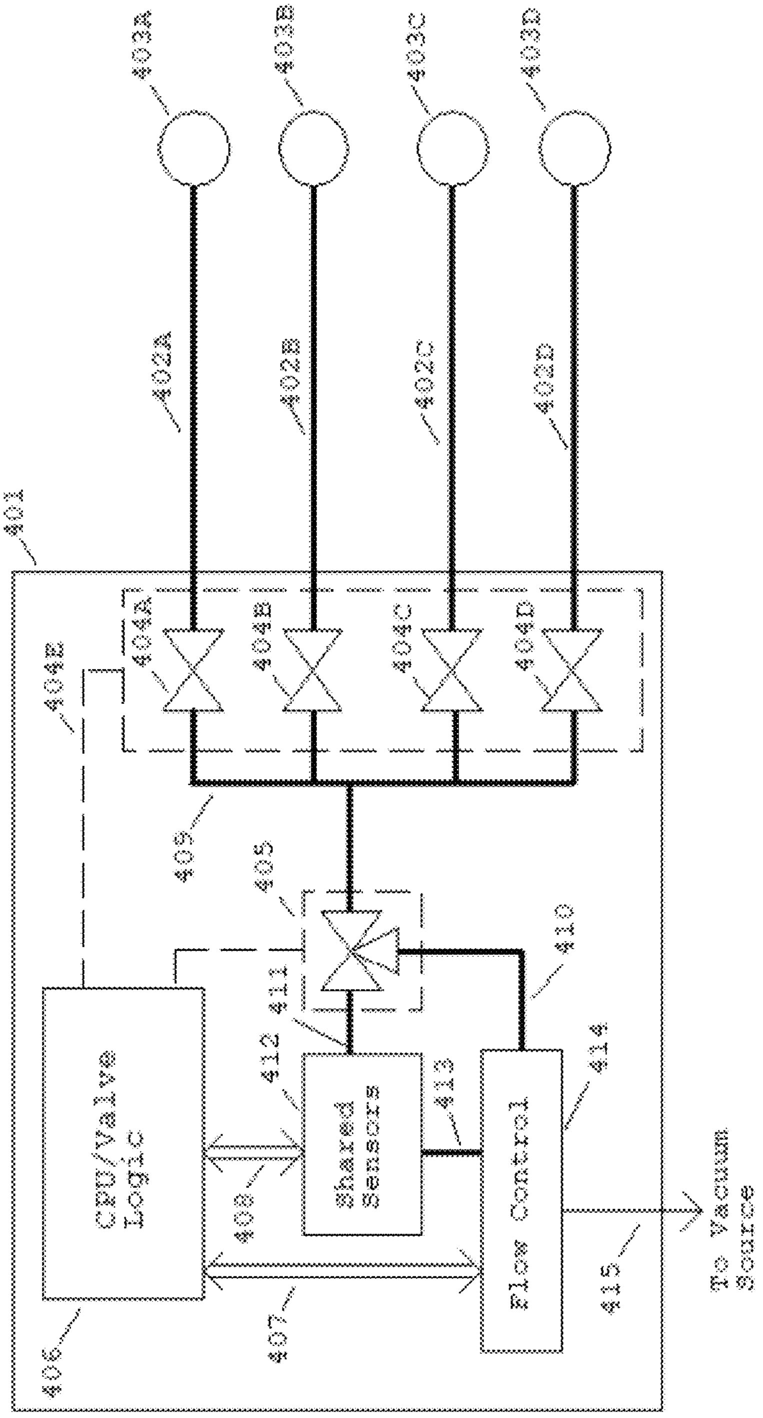
Figure 4 (Prior Art)
FIG. 4 illustrates a star-configured multipoint air sampling system.
Figure 5:
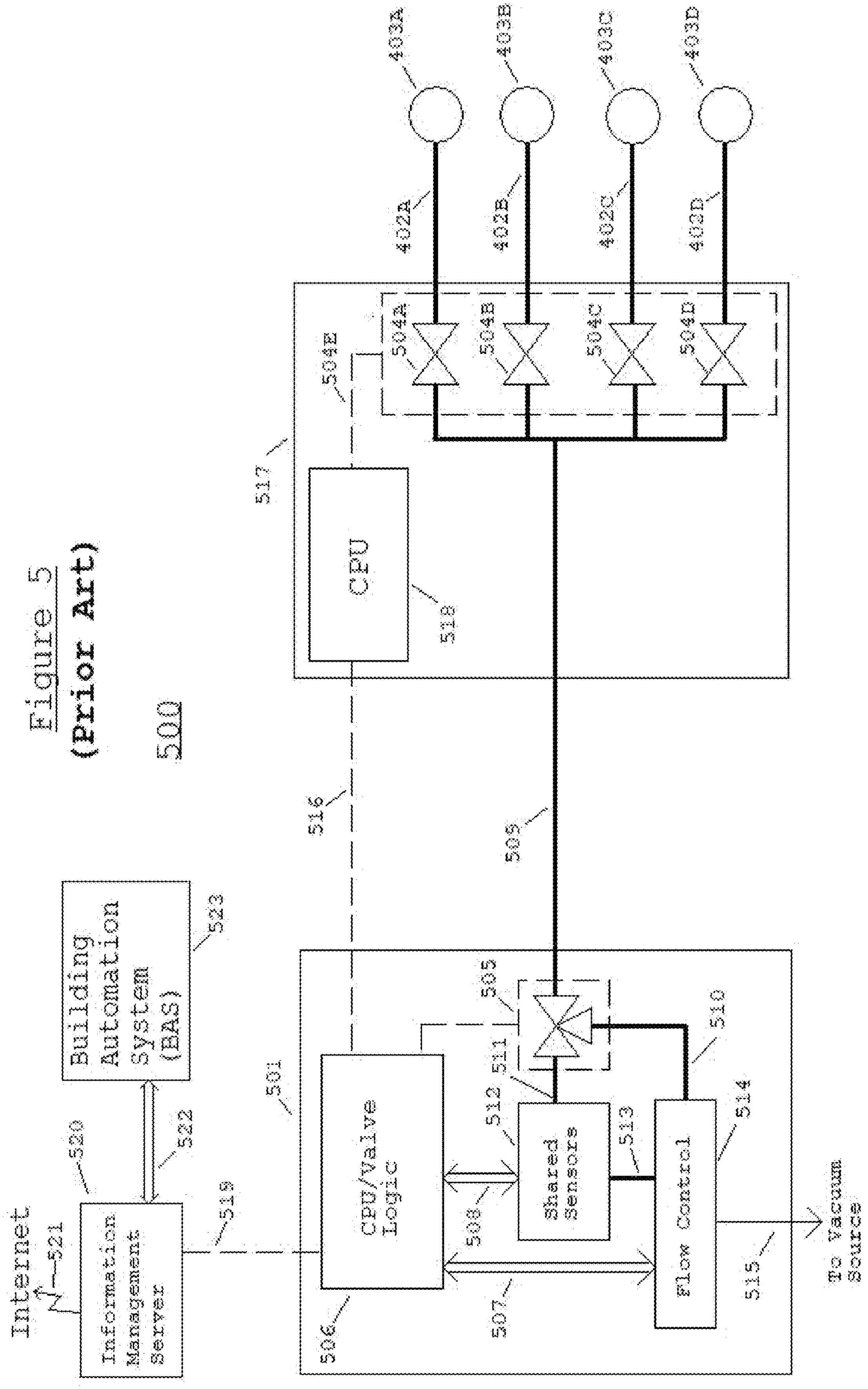
Figure 5 (Prior Art)
FIG. 5 illustrates a distributed configuration multipoint air sampling system.

The embodiments described herein provide improvements to VAV fume hood energy efficiency by enabling the automatic (without human intervention) reduction of a VAV fume hood's minimum airflow setting when, according to the disclosed systems, methods and apparatus, it has been determined that the hood is in an appropriate condition of non-use, such that lowering the minimum airflow setting presents substantially little or no risk to lab occupants. Embodiments include methods and systems which apply hood condition monitoring criteria used to verify that, once the minimum airflow setting of the VAV fume hood has been reduced or placed in a state of setback using the automatic methods disclosed herein, that the VAV fume hood continues to remain in an appropriate state of non-use and, if not, the minimum flow setting is automatically no longer reduced. While in-use, an appropriate minimum airflow setting for a VAV fume hood may be, for example, a flow setting such as that outlined by ANSI Z9.5, such as but not limited to 375 ACH, as has been discussed. As has also been discussed, VAV fume hood leakage may add significantly to the required hood minimum airflow requirement and, therefore, many hoods may require much higher air change rates when in use. In embodiments disclosed herein, the terms "VAV fume hood", which was described previously in detail, and "fume hood" or "hood" shall be used interchangeably to describe a VAV fume hood. When, according to the disclosed methods it has been determined that the hood is in an appropriate condition of non-use the fume hood minimum airflow setting may be reduced by a substantial amount that may be as low as the lowest airflow setting that the fume hood airflow controls may deliver, which may result in a dramatic energy reduction. When it has been determined that the fume hood is in an appropriate state of non-use, the system and methods described provide one or more minimum flow setback signals to the fume hood controls, in order to enable the minimum air flow setback, resulting in the reduction in the fume hood minimum airflow setting. Generally, an appropriate condition of non-use is one in which, based on the methods of this disclosure, users are not accessing the fume hood's interior and that a lowering of minimum hood flow can be permitted because of reduced containment requirements. In embodiments, the fume hood controls which receive the one or more minimum flow setback signals may include any component of a fume hood control system or other system in communication with the fume hood control system that either directly or indirectly controls or manipulates the air flow valve or damper or other flow device used to regulate the airflow through the fume hood. In an embodiment, the minimum flow setback signal may be applied to a fume hood monitor or any other device which is in communication with the hood controls. In another embodiment, the minimum flow setback signal may be applied to the Building Automation System (BAS) which either directly or indirectly controls the airflow device. In another embodiment, the minimum flow setback signal may be applied to the hood controls which directly control or manipulate the airflow device. Herein, the lowering of minimum hood flow, according to the disclosed methods, may be referred to as "enabling fume hood minimum flow setback". Also, when it has been determined that the hood is in a condition of use, according to the disclosed methods, the hood's minimum air flow setting will not be or will no longer be reduced and, therefore fume hood minimum flow setback shall be disabled. Note that even though a lab occupant may not be present at a hood, embodiments may determine that the hood is in a state of use because a determination has been made that it is not or may not be safe to reduce the hood's minimum ventilation at that time. The disclosed methods may be applied to determine the usage state of a hood with a substantial degree of reliability and ease of implementation. Generally, the disclosed embodiments provide fume hood condition monitoring, assessment, reporting and control functions which may be applied to reliably determine the usage state of a fume hood and, when appropriate conditions exist, reduce a fume hood's minimum airflow setting. In some embodiments, an automatic reduction of a fume hood's minimum airflow setting may be implemented, even if chemicals are present within the fume hood, as long as the chemicals and other equipment are placed within locations of the hood that are outside of what's described below as an equipment free zone; wherein the equipment free zone may comprise a portion of the internal volume of the fume hood while permitting storage of equipment in locations outside of the equipment free zone. Providing hooding minimum flow setback without the requirement that the hood be emptied of its equipment is a highly valuable aspect of the teachings of this disclosure. As is described further below, in embodiments and optimal equipment free zone size may be chosen which both accommodates well behaved airflow patterns near the hood sash for containment purposes and storage space towards the rear of the hood during periods where the hood is not in use.

Embodiments described herein utilize a novel equipment detector which is used to analyze a zone within a hood to establish an equipment free zone within a hood, as a minimum flow setback requirement. In embodiments the terms "equipment detector" and "object detector" shall be used interchangeably. Some of the embodiments described herein utilize a novel multipoint air sampling system combined with other methods of determining the usage condition of a fume hood to implement a fume hood minimum flow setback function when it has been determined that the hood is in an appropriate condition of non-use. As described herein, embodiments which include a multipoint air sampling system provide a determination of contaminant status to directly measure if a fume hood is contaminated. In other disclosed embodiments which may not include multipoint air sampling embodiments, novel methods are described which incorporate the monitoring of several hood conditions to reliably determine when a hood is in an appropriate condition of non-use to implement a minimum flow setback function. In embodiments which do not include a measurement of contaminant status, a mandatory hood flushing time is required although, generally, some hood flushing time is preferred in embodiments. In further embodiments, the fume hood monitoring system and methods of this disclosure incorporates analysis, reporting and notification functions which determine the fume hood energy savings performance provided by the disclosed minimum flow setback methods as they are applied to one or a plurality of hoods, and identifies opportunities for performance improvement. The said analysis, reporting and notification functions provide a method of addressing human behavioral aspects associated with the operation of a fume hood in a safe and energy efficient manner by, for example, providing informational feedback to lab occupants relating to aspects of fume hood usage. Further inventive aspects of this disclosure involve fume hood minimum flow reductions in a phased manner, based on a duration of time over which the fume hood has been in a determined condition of non-use.

Included within embodiments described herein is a novel approach which enables the active sensing of one or more fume hoods using a multipoint air sampling system to significantly improve safety while reducing fume hood minimum flows and achieving energy savings and improved lab sustainability. Within this disclosure the terms “airflow” and “flow” will be used interchangeably. The function of reducing the minimum flow of a fume hood based on the teachings of the disclosed embodiments shall herein be referred to as fume hood minimum flow setback or, interchangeably, minimum flow setback. The minimum flow of a fume hood that is reduced by minimum flow setback may be any conceivable minimum flow that a fume hood is set to. For example, the fume hood minimum flow may be a value that is higher or lower than the fume hood minimum airflow specified by ANSI Z9.5. The flow rate that results when a fume hood is in a state of minimum flow setback shall herein be referred to as the minimum flow setback flow rate or, interchangeably, minimum flow setback flow, or minimum flow setback CFM. Embodiments incorporate contaminant sensing functions provided by a multipoint air sampling system to establish the contaminant status of a fume hood combined with one or more non-contaminant usage conditions, a flushing period, and one or more indications of sensor integrity to provide a determination of whether the minimum airflow of the fume hood may be reduced and, providing a signal which is indicative of the determination of whether the minimum airflow may be reduced.

In the past, it has generally been impractical to apply chemical and other sensing to monitor fume hood contaminant levels for several reasons. First, contaminant levels at a fume hood may at times reach extremely high concentrations, often exceeding those concentrations found in a normal healthy breathing environment by many orders of magnitude. As a result of these high contaminant levels, sensors used for contaminant detection may foul and drift in their calibration very quickly, making the sensor unreliable. For example, a conventional PID sensor that is continuously exposed to contaminants within a fume hood may drift significantly in a matter of days. In manifolded lab exhaust systems, the most common type of lab exhaust system, contaminant concentrations at the exhaust duct 207 of a hood may, for example, be 20 to 50 times higher than contaminant levels found in the airstream at the exhaust fan serving that and other hoods in the system. For example, the airstream at the exhaust fan may be the airstream to which the system described within commonly assigned U.S. patent application Ser. No. 16/141,109 (filed on Sep. 25, 2018), would be applied. Therefore, the immediate environment within and flowing from a fume hood may at times be the most contaminated and harsh environment seen in the lab facility. There are severe practical limitations, for example, with what Barrette et al. describes as a system which includes a fume sensor placed inside the fume hood enclosure used to detect chemical fumes, as any possible sensor technology in the art of chemical detection will not perform well for long when continuously exposed in such an environment due to the intensity and continuous nature of contaminant exposure possible in such an environment.

Another factor which has impacted the feasibility of applying chemical and other sensing to monitor fume hood contaminant levels is the general maintenance and calibration of discrete sensor technologies that would be used for this purpose. Most individual sensors for example would require some form of periodic calibration and service (such as cleaning for example), especially when exposed to such environments as the fume hood environment. Most sensors for this purpose should be calibrated every 6-8 months yet, within typical laboratory facilities there may be several dozen to several hundred or more fume hoods. So, the field labor required to support such an application of discrete sensors applied to each hood may be significant. Further, the type of compounds that one may want to detect in a fume hood can vary extensively. Therefore, in some applications, multiple sensors may be required to sense fume hood contaminants. For example, a PID sensor may be used to sense the majority of fume hood organic compounds, such as Volatile Organic Compounds (VOC’s) however; in other cases where for example certain acids may be used within a fume hood in addition to VOC’s, then an acid sensor may additionally be required. Therefore, if one were to apply these two discrete sensors per fume hood, the calibration and maintenance costs as well as the first cost of the sensors will be higher in comparison to the use of a multipoint air sampling system in accordance with the teachings of embodiments described herein.

The sensor protective system disclosed within the above-referenced U.S. application Ser. No. 16/141,109 provides a significant improvement over continuous monitoring systems (such as U.S. Pat. No. 6,125,710, for example) however, it is not well suited for fume hood monitoring applications because its sensor protective operation uses system-based isolation to isolate its one or more sensors from high contaminant concentrations. System-based isolation results in the one or more sensors 412 or 512 of the multipoint air sampling system being isolated from all monitored locations 403A, 403B, 403C, 403D if sensed contaminant levels from any 403 location exceed a predetermined action threshold. In an embodiment, the active sensing of one or more fume hoods using a multipoint air sampling system utilizes a sensor protective operation that includes a zone-based isolation function, described further below.

Figure 6:
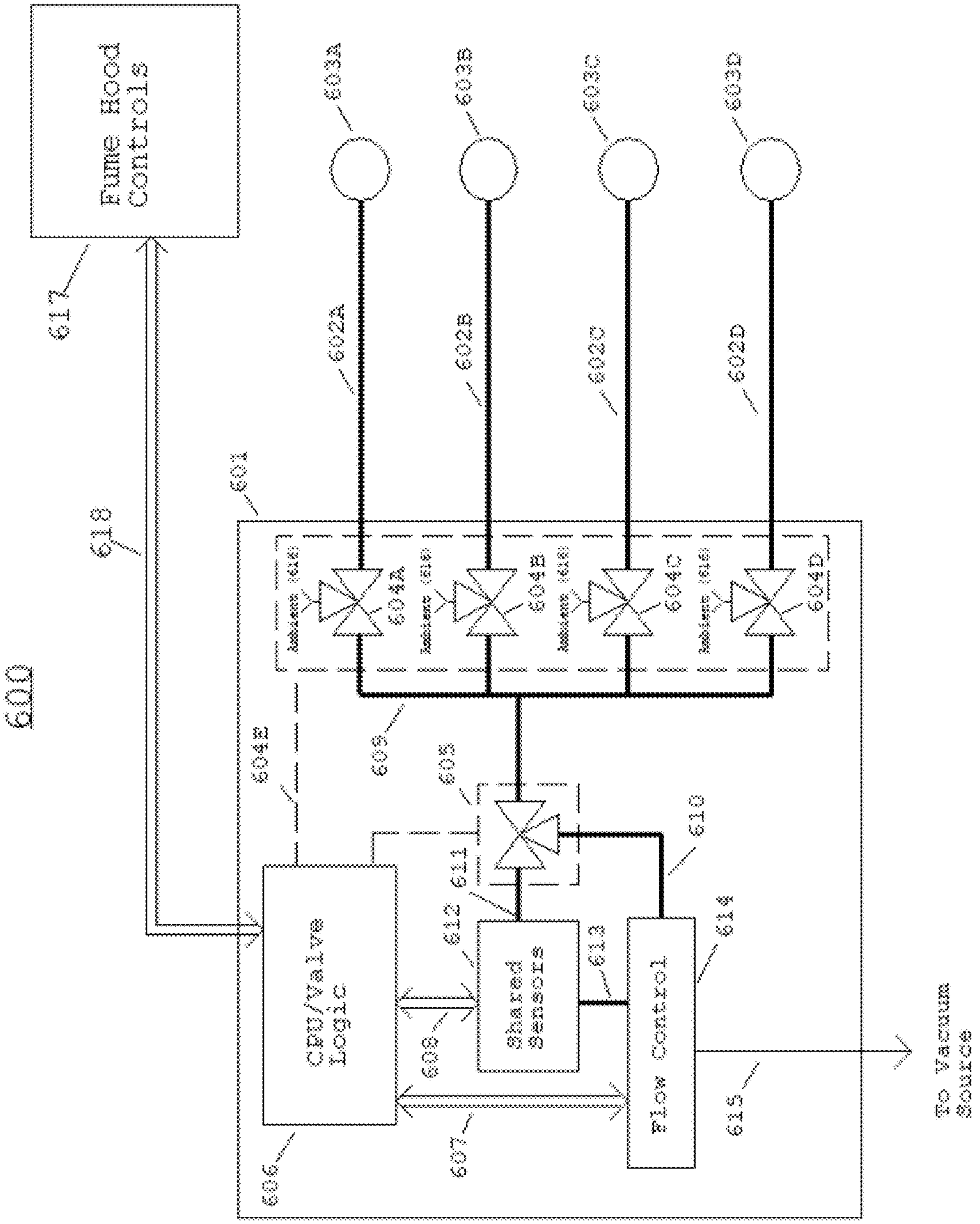
FIG. 6 illustrates a star configured embodiment of a multipoint air sampling system that is equipped to provide a zone-based isolation function.

FIG. 6 illustrates a star configured embodiment of a multipoint air sampling system which is equipped to provide a zone-based isolation function. Those experienced in the art will recognize that the star configured embodiment 600 could easily be extended to a distributed configuration multipoint air sampling, to which embodiments described herein also apply, by relocating valves 604 to an enclosure or location other than enclosure 601 and extending tubing backbone 609 to the then distributed valves 604. Whereas the multipoint air sampling system embodiments described in the above-referenced U.S. application Ser. No. 16/141,109 provide a system-based isolation function, the system 600 is equipped to assess contaminant concentrations (herein interchangeably referred to as contaminant levels) sensed from each zone 603A, 603B, 603C, 603D and to isolate shared sensors 612 only from those zones in which the measured contaminant level exceeds a predetermined value. In embodiments, each zone 603A, 603B, 603C, 603D may be locations within a fume hood or within the exhaust duct connected to each fume hood, and some zones may be other locations within the lab or building.

As embodiments, the sensing of contaminant levels from each zone 603A, 603B, 603C, 603D involves an at least two-part sequence for each zone, a first purge step followed by a second sensing step, as implemented using CPU/Valve Logic 606. CPU/Valve Logic 606 may comprise any CPU device, including but not limited to a microcontroller and associated electronics, an embedded computer, a remotely located computer, a programmable logic controller, the fume hood exhaust flow controls, the laboratory controls, or the building automation system. For example, starting with zone 603A, which may be a fume hood location, a first purge step involves opening the flow path of three-way valve 604A between tubing 602A and tubing backbone 609. This is accomplished while valves 604B, 604C, and 604D are set so that the flow path between their zones 603B, 603C, 603D are closed to 609. Three-way valve 605 is actuated by 606 so that the flow path between backbone 609 and flow controller 614 is open, thus allowing air to be drawn from zone 603A, through tubing 602A, through valve 604A, through backbone 609, through valve 605, through flow control 614, and out to the vacuum source. The purge flow rate is set to a value that is high enough to quickly (typically less than 30 seconds for example) fill the flow path between the zone and valve 605. In practice, a wide range of airflow rates may be suitable for the purge function ranging, for example, between 10 liters per minute and 20 liters per minute. The purging portion of the sampling sequence may be timed by CPU 606 based on knowledge of the distance between each zone 603 and the enclosure 601, the purge flow rate, and the physical dimensions of the tubing 602. Once the purge state is complete, CPU 606 then initiates the sensing portion of the sequence for zone 603A by switching valve 605 so that backbone 604 is in fluid communication with shared sensors 612, enabling air to flow at a lower flow rate than the purge flow from zone 603A, through tubing 602A, through valve 604A, through backbone 609, through valve 605, through connection 611, through shared sensors 612, through connection 613, and through flow control 614 to the vacuum source. As an embodiment, this sensing step may be at a flow rate through the sensors 612, as controlled by flow controller 614, that is low enough to not create excessive pressure drop across the sensors 612. Typically, for example, the flow rate through 612 during the sensing step may be but is not limited to between 1 and 2 liters per minute. The duration of the sensing step will be in accordance with the response time of the slowest responding of the one or more sensors 612. For example, if sensors 612 is comprised of a single sensor that is a PID sensor, the sensing step may be but is not limited to a duration of 20 seconds. At the end of the sensing step, CPU 606 will read the sensed values of the one or more sensors 612 through connection 608. If any of the sensed values from one or more sensors 612, as it applies to zone 603A, exceed a predetermined action level then, as a sensor protective embodiment described herein, zone 603A will be removed from the zone sampling sequence for a predetermined period of time (thus placing the zone into sensor protective mode) so that sensors 612 will not be exposed to high contaminant levels from that zone. In one embodiment, the predetermined period (herein the protective mode period) that a zone is placed into sensor protective mode is between 15 and 30 minutes. As a tubing flushing embodiment, valves 604 are three-way valves wherein one valve port on each valve 604 is in fluid communication with ambient air 616 and, for each connected zone during the period where the flow path between tubing 602 and backbone 609 is closed, tubing 602 will thereby be in fluid communication with ambient air 616 through valve 604. As an embodiment, tubing 602 is connected to a fume hood location, such as the exhaust duct connecting to the fume hood. The exhaust duct is always negatively pressurized with respect to ambient and, therefore, a beneficial flushing action is provided which clears any contaminants from tubing 602 as air flow from ambient 616 through valve 604 through tubing 602 to the negatively pressurized exhaust duct which is zone 603. When tubing 602 is connected to a duct, such as an exhaust duct, tubing 602 will couple to a probe device (herein duct probe) which has a hollow interior, penetrates the duct, enabling the air within the duct to be in fluid communication with the inside of tubing 602, allowing air samples to be taken from within the duct and, when a flushing action is provide, enabling air to be conveyed from the inside of 602 to the duct.

As a further description of the sampling sequence involving multipoint air sampling system 600, once the purge sequence followed by the sensing sequence for zone 603A has been completed, the system 600 will continue its operation by next activating a purge sequence for zone 603B, using valve 604B, followed by a sensing sequence for zone 603B, followed by a determination by CPU 606 of whether contaminant levels from zone 603B exceed predetermined action levels and, if the contaminant levels do exceed the action levels, then zone 603B will be removed from the zone sampling sequence for a predetermined period of time so that sensors 612 will not be exposed to high contaminant levels from that zone. The sampling sequence for 600 will then continue for zone 603C and then for 603D, following which, the sampling cycle will begin again with the first zone in the sequence which is not temporarily disabled for purposes of sensor protection. For example, following the sequence in which zone 603D is sensed, if zone 603A is temporarily disabled for sensor protective purposes but zone 603B is not disabled, then the next zone to be sampled will again be zone 603B.

Figure 7A:
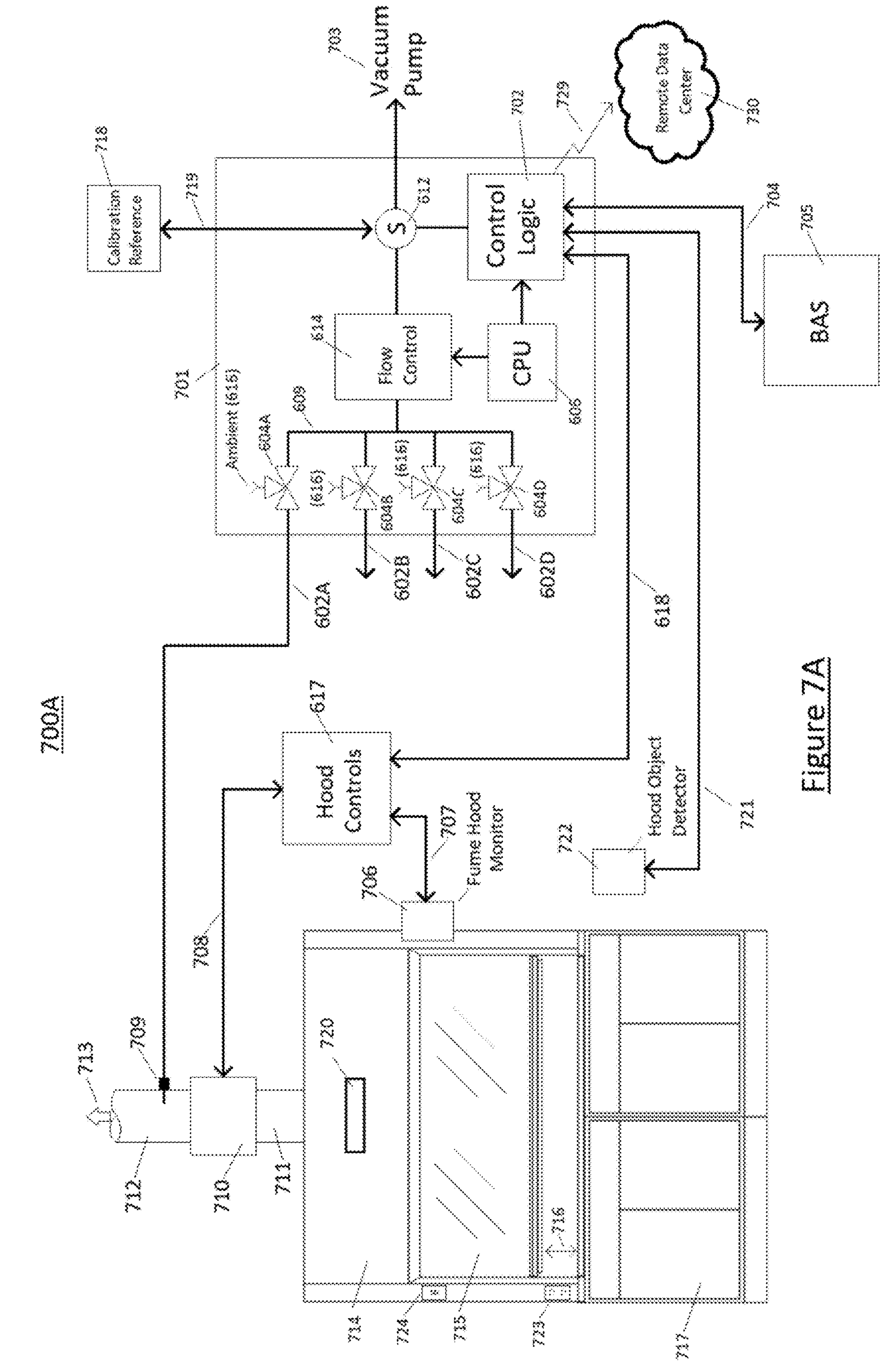
FIG. 7A illustrates an embodiment of a fume hood that is monitored by a multipoint air sampling system.
Figure 7B:
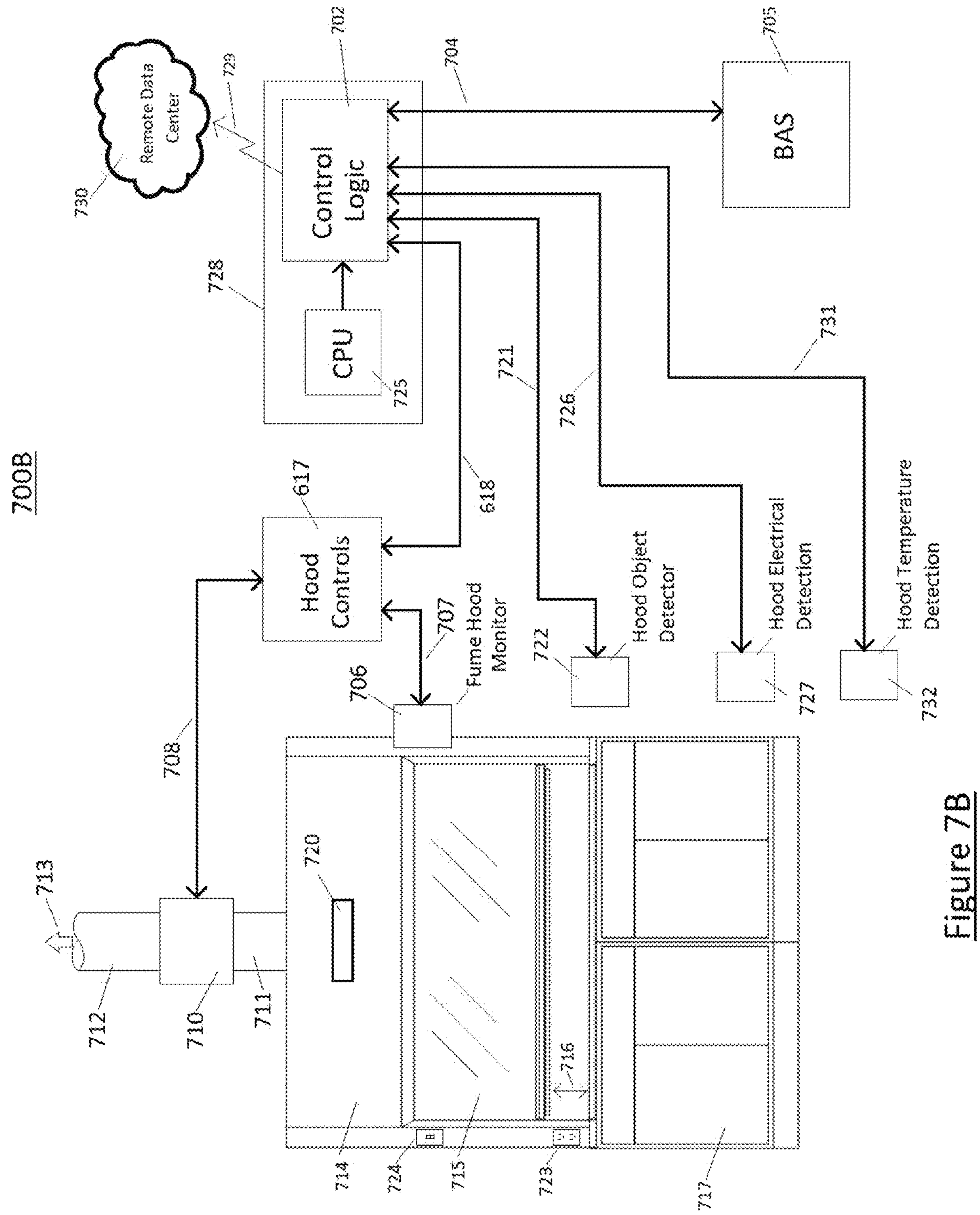
FIG. 7B illustrates an embodiment of a fume hood that is monitored based on only non-contaminant usage conditions.

FIG. 7A illustrates a VAV fume hood 714 which is monitored by a multipoint air sampling system 701, which is interfaced with the fume hood controls 617 to implement minimum flow setback embodiments. An alternate embodiment is shown in FIG. 7B, which supports minimum flow setback embodiments without a multipoint air sampling system, as will be discussed further. As an embodiment 700A, the location 712 (a portion of the exhaust duct through which air exits the hood 714) is monitored by system 701 through duct probe 709. Probe 709 is rigidly mounted to duct 712 and, the portion of the probe which is exposed to the exhaust air on the interior of duct 712 is made from a material such as but not limited to stainless steel, which is robust against the corrosive gases which may be given off from the hood and therefore may be present within airstream 713. In FIG. 7A, duct probe 709 is located downstream of flow control device 710. Flow device 710 may include but is not limited to any type of damper or venturi valve. For example, device 710 may be but is not limited to a pressure independent venturi valve, such as any of the airflow valves manufactured by Phoenix Controls of Acton Massachusetts. As a further example, device 710 may be but is not limited to a pressure independent flow valve such as that described within U.S. application Ser. No. 13/238,155, submitted herein by reference. In yet a further example, device 710 may be any one of the airflow valves manufactured by Accutrol, LLC of Monroe, Connecticut. In embodiments, duct probe 709 may be located upstream of flow control device 710, such as duct 711, or probe 709 may be located any distance downstream of flow device 710 as long as the air flowing through the duct at the mounting location is substantially comprised of air which is being exhausted from fume hood 714. For example, the duct probe 709 should not be located downstream of a point in the exhaust ductwork where the air from hood 714 has been allowed to comingle with nonnegligible amounts of air from other fume hoods, lab, or office locations. Barrette et al. describes the placement of a chemical fume sensor within an enclosure of the fume hood and the enclosure is depicted diagrammatically as being the interior of a fume hood. In embodiments, such as that shown in FIG. 7A a sampling location where the multipoint air sampling system 701 is applied to establish a hood's 714 contaminant status shall at least include one exhaust duct location associated with the hood. One reason for monitoring hood contaminants within the exhaust duct and not exclusively within the hood is that contaminants which are emitted within a hood 714 do not become well mixed with the air entering the hood sash opening 716 until the airflow has reached and even traveled some distance within the immediate duct outlet 711 of the hood. As a result, if air samples are taken strictly from within hood 714 to determine overall contaminant levels, the concentration of contaminants measured by the one or more sensors 612 may not be a reliable measurement of the hood's contaminant status. As an alternate embodiment, duct probe 710 may be integrated within the flow control device 710. A benefit of incorporating duct probe 709 within airflow control device 710 is that it eases the field installation of a multipoint air sampling system 701 where the exhaust flow device 710 is equipped to support tubing connections such as 602A.

FIGS. 7A and 7B further includes VAV hood controls 617 which may provide a variety of functions related to fume hood sash 715 position sensing, the control of airflow device 710, an interface to occupancy sensor 720, an interface to fume hood monitor 706 and, as an embodiment, an interface to minimum flow setback control logic 702. Within FIG. 7A, setback control logic is contained within multipoint air sampling system 701 while, in FIG. 7B setback control logic 702 may be contained within a separate module 728, as will be described further below. In embodiments, control logic 702 will include both logic and any necessary electronics required to convey output signals to interface with hood controls 617 or BAS 705. In application, portions of the hood controls 617 may reside with the airflow control device 710. For example, a portion of the hood controls 617 may be the electronic controls used to position or regulate control device 710, which may be but is not limited to a damper, iris damper, venturi valve, or other valve device. The electronic controls used to position or regulate control device 710, may be physically mounted on device 710. Any portion of hood controls 617 may also be held within fume hood monitor 706, the Building Automation System (BAS) 705, or may be provided by control logic 702.

In embodiments, control logic 702 may be connected to remote data center 730, which 730 may provide any combination of data storage, user interface, configuration and logic functions which may be supportive of the minimum flow setback application to VAV hood 714. Connection 729 to remote data center 730 may be any form of physical or wireless connection to the Internet, such as an Internet of Things (IoT) communication. The remote data center 730 may provide but is not limited to providing methods of determining and communicating setback performance conditions.

The position of a hood's sash 716 which defines the open area of a sash may be determined using sash sensing equipment. Sash sensor examples are disclosed within U.S. Pat. Nos. 4,893,551, 5,117,746, 6,137,403 and 6,561,892. Although hood 714 is illustrated as having one vertically moving sash 715, embodiments described herein apply to hoods having any sash configuration including but not limited to sash configurations involving any number of vertical moving sashes, any number of horizontal moving sashes, or any combination of vertically and horizontally moving sashes. For example, U.S. Pat. No. 6,137,403 describes sash sensing apparatus for several horizontal, vertical and combination sash arrangements. Typically, the resultant signal from one or more sash sensor devices applied to a hood such as 714 is monitored by either the hood monitor 706 directly or some portion of the hood controls 617 to create a flow command signal in order to command the flow device 710 to deliver the required fume hood flow 713. As has been described, fume hood leakage can significantly influence how much total exhaust airflow, such as 713 is required to maintain a desired face velocity at the hood opening, such as 716. Hoods which have more complex sash arrangements where there are multiple horizontal, vertical or combination sashes, will also have more leakage due to gaps between sashes. Aspects of the embodiments described herein may be particularly beneficial in saving energy when minimum flow setback is applied to more leaky fume hoods due to the fact that when these types of hoods are not in use the hood's total airflow, such as 713, may be disproportionally reduced because the flow component due to leakage may be completely eliminated during setback as compared to a hood which may have less overall leakage. For example, with some larger hoods such as but not limited to walk in hoods, there may be upwards to 200 CFM or more leakage flow that can be completely eliminated when minimum flow setback is applied according to embodiments of this disclosure.

Figure 8A:
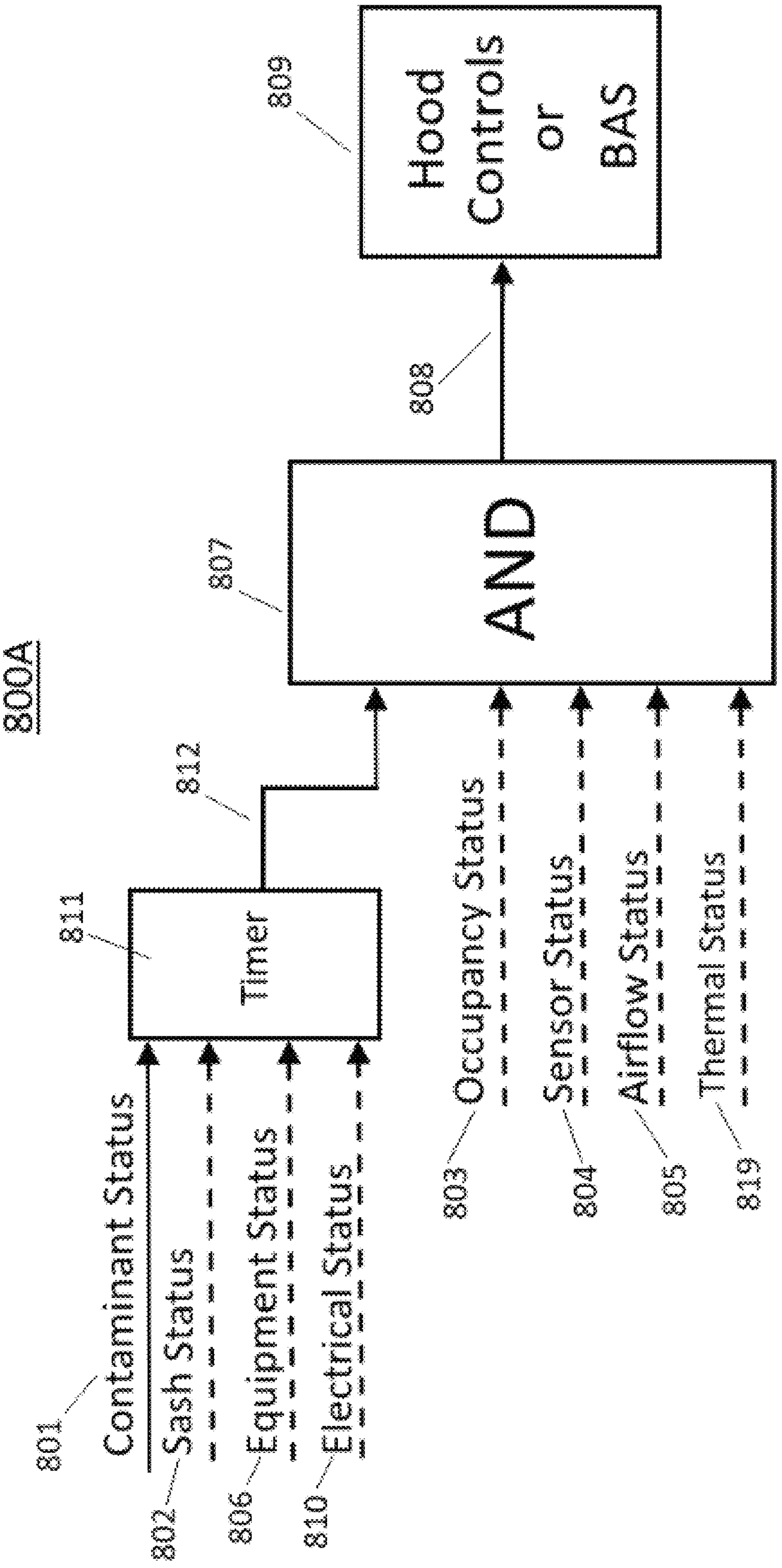
FIG. 8A illustrates a process for rendering fume hood minimum flow setback.
Figure 8B:
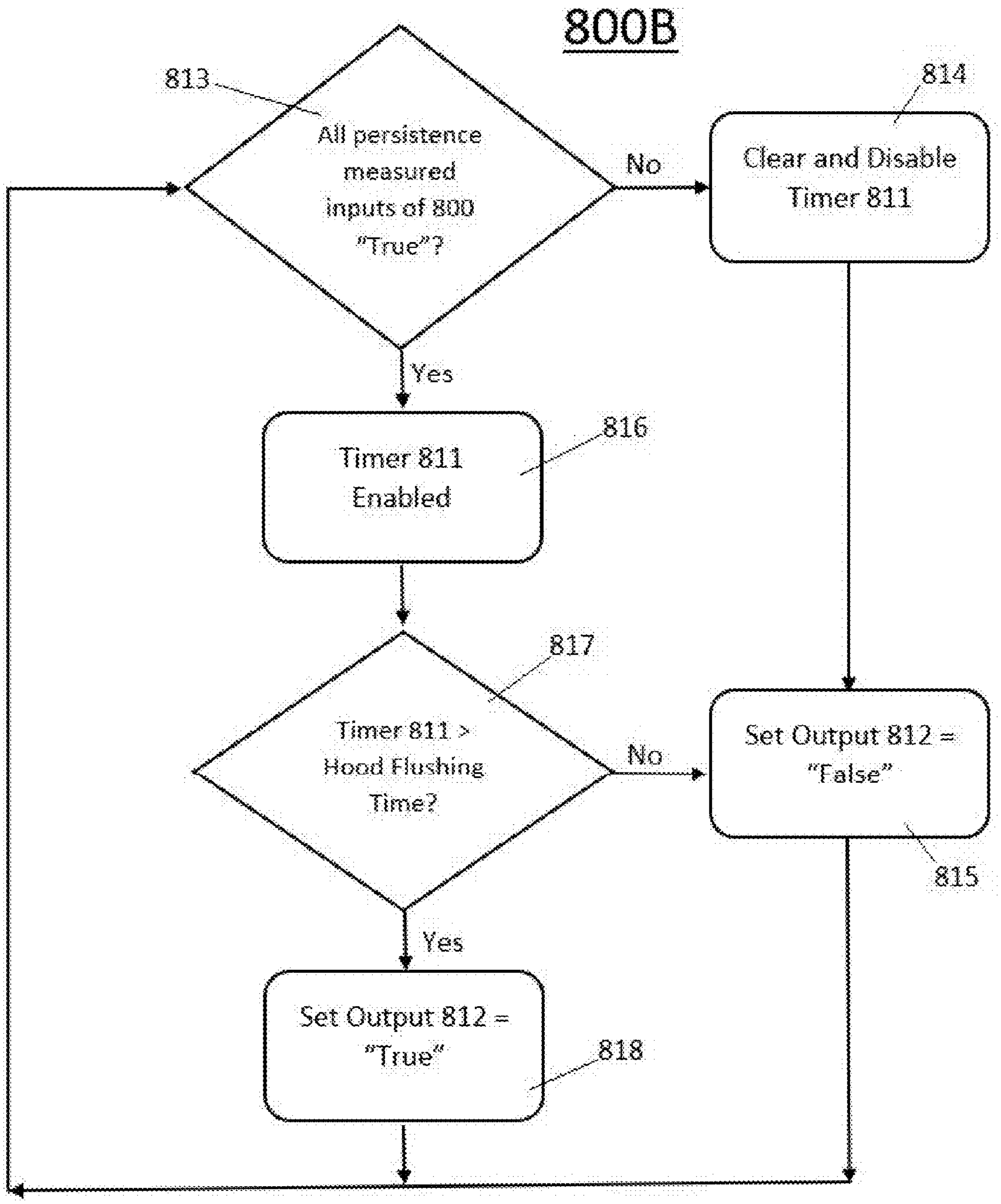
FIG. 8B illustrates a process for applying a hood flushing time before enabling hood minimum flow setback.

Embodiments of minimum flow setback incorporate one or more setback criteria which determine if the minimum airflow of a fume hood may be reduced. In embodiments, the setback criteria for minimum flow setback may include one or more contaminant indications along with one or more non-contaminant usage conditions and may include one or more indications of system integrity to determine if the fume hood 714 should be placed into a state of minimum flow setback by way of the minimum flow setback signal. As embodiments, control logic 702 provides a minimum flow setback signal which is acted upon by hood controls 617 which setback signal may be communicated directly through connection 618 or indirectly through connection 704 to the BAS which, as an alternate embodiment, may be in communication with hood controls 617. In one embodiment, the minimum flow setback signal is a binary signal including but not limited to relay contacts or a binary voltage or current signal which commands the hood controls 617 to a minimum flow setback state, wherein the minimum airflow of the fume hood is reduced when the minimum flow setback criteria have been satisfied. In other embodiments, the connection 618 between control logic 702 and hood controls 617 is a digital network and the minimum flow setback signal may be a digital signal which is communicated over a digital network. FIGS. 8A and 8B further illustrate the logic used as embodiments to render minimum flow setback or to, more generally, control the minimum airflow setting of a fume hood. The logic of FIG. 8A and FIG. 8B is performed by control logic 702 which may reside within multipoint air sampling system enclosure 701, within fume hood controls 617, within module 728, within remote data center 730, or within BAS 705.

The logic 800A of FIG. 8A which is performed within 702 incorporates embodiments of minimum flow setback logic for a hood 714. The logic 800A may include several criteria which must prove true for the minimum flow setback state to be enabled. FIG. 8B details the logic of timer 811 of 800A. The "AND" logic depicted in 807 is based on the objective that embodiments require that all the chosen criteria be true, for logical output 808 to be true and for minimum flow setback to be enabled. The output 808 directly determines the state of the setback signal provided by the control logic 702 to hood controls 617, using any of the connections between 702 and 617 as described above. The logic of 800A is performed separately for each hood 714 monitored by a zone of the multipoint air sampling system 701 or, alternatively by module 728 which assesses the hood condition based on non-contaminant parameters.

In embodiments where logic 800A is applied to the multipoint air sampling system approach 701, 800A includes a requisite contaminant status criterion 801 in which a "true" condition signifies that contaminants are not present. Contaminant status 801 is based upon contaminant levels as measured by the one or more sensors 612 of the multipoint air sampling system as compared to predetermined action levels for each of the parameters, wherein measured values for all sensed parameters must be lower than the action levels assigned to each parameter in order for the contaminant status to be signified as true. In separate embodiments, a contaminant status assessment using a multipoint air sampling system may not be required, as will be discussed further below. In embodiments, a persistence criterion provided by timer 811 may be applied to each of the inputs 801, 802, 806, 810 as an added measure to ensure that the hood 714 is relatively free from contaminants before enabling minimum flow setback. Herein, the inputs 801, 802, 806, 810 may be referred to as persistence measured parameters. When a persistence criterion is applied to contaminant status 801 one or more measured contaminant levels associated with the hood 714 must each be less than their respective action levels, as measured by one or more sensors 612, for a predetermined period of time (herein "hood flushing time") before contaminant status 801 will be set to true. In applications, the said action levels may be set based upon the toxic limit value or odor threshold of the most toxic or odiferous compound that is intended for use within hood 714. If the sensor 612 is a PID sensor that is calibrated on isobutylene with a 10.6 eV lamp, a suitable action level may be but not limited to between 0.2 ppm and 2 ppm, as isobutylene. A hood flushing time may be important in cases where, for example, compounds may continue to offgas from the hood's interior at low or difficult to detect levels. Thus, with this embodiment which employs the persistence criterion, a hood will be flushed for a defined period of time before it is allowed to enter a state of minimum flow setback. The hood flushing time criterion is established using timer 811 which also may incorporate sash status 802, equipment status 806, and electrical status 810 which are described further below. For each of the possible parameters 801, 802, 806, 810, a timed AND function is applied by 811, whereby 812 will only be set to "true" when each of the parameters 801, 802, 806, 810 have been in a true state for a predetermined hood flushing time set within timer 811. Embodiments may include any combination of 801, 802, 806, 810. Embodiments may include a hood flushing time that is of any practical duration, from minutes to hours to days, based on the nature of the hood usage and the condition monitoring approach chosen, based on the teachings of this disclosure. One of the advantages of the multipoint air sampling system approach of 700A over the approach of 700B is that it may allow for relatively short fume hood flushing times applied to 811, which can increase the energy saving potential provided by embodiment 700A because, with shorter flushing times, the hood 714 will be in a state of minimum flow setback for longer periods. For example, in some applications, where a PID sensor is used as sensor 612 and system 700A is applied to monitor hoods in which only organic chemistry is used, then the fume hood flushing time of 811 may be set to a short period such as for example 20-30 minutes where, alternatively, for the approach of 700B the required fume hood flushing time may be on the order of 2 or more hours because approach 700B does not directly monitor the contaminant status of hood 714. In other applications, the system of 700B may be chosen over that of 700A due to the simplicity and potentially lower cost of 700B. For example, in some applications a very broad range of chemicals, such as but not limited to a range of different acids and other inorganic compounds may be used within a hood 714, such that the required sensor 612 may necessitate a plurality of sensors that adds to the cost and complexity of 700A when compared to 700B in that case. In other applications, due to the compounds used within fume hood 714, no practical sensor 612 may be available where certain exotic or high-risk compounds are used within 714. For example, if phosgene gas is used in 714, this may be problematic for multipoint air sampling system approach of 700A, since sensors for detecting this gas tend to not be reliable. This example would not preclude the use of 700A however, in this example, one may choose to configure the hood flushing time 811 to a much longer period that may be like the approach of 700B. However, in this case it may be more economic to use the approach of 700B, which is described further below.

In embodiments, when contaminant status 801 (along with possible other inputs 802, 806, 810) is true (signifying that contaminants are not present) the timer 811 is enabled and, for the timer to remain enabled, at least contaminant status 801 must continue to be in the true state without interruption for a period equivalent to the desired hood flushing time, following which output 812 will be set to true which is at least one of the conditions required for AND logic 807 to provide an output 808 that is true in order to place hood 714 into minimum flow setback. Note that, in embodiments timer 811 may also be configured so that it requires a true condition be present for sash status 802, equipment status 806, and electrical status 810 for the duration of the timed period established in 811 for 812 to be true. As will be discussed further below, the condition where sash status criterion 802 is true is when the sash is defined as closed. The condition where the equipment presence criterion is true is when equipment is not detected within a defined zone within the hood, again as described further below. The condition where the fume hood electrical status criterion 810 is true is when the level of electrical current that is drawn by the hood 714 due to lighting or other electrical loads associated with an active hood is below a predetermined threshold value, as described further below. In embodiments, if any of the configured inputs to timer 811 are not maintained as true, the timer 811 will immediately reset, causing signal 812 and therefore the minimum flow setback output 808 to be set to false. This immediately results in minimum flow setback being disabled for the fume hood 714.

FIG. 8B further details aspects of the timer 811 logic. Timer 811 may support any combination of persistence measured parameters including contaminant status 801, sash status 802, equipment status 806 and electrical status 810. As has been described, logic 811 ensures that the parameters 801, 802, 806, 810 are logically "true" for a period of time equivalent to a chosen hood flushing time before setting logical output 812 to "true" to enable hood minimum flow setback. Logic 813 of 800B determines that all persistence measured parameters are "true" on an instantaneous basis each time through the logical loop of 800B. If any of the applied persistence measured parameters 801, 802, 806, 810 are "false" when 813 is computed then, via 814, the timer of 811 is cleared and disabled and, via 815, output 812 will be set to "false" to ensure that minimum flow setback is not activated. It should be noted that the logic of 800A and 800B can be adjusted to support any combination of the persistence measured inputs (801, 802, 806, 810) or momentary inputs (803, 804, 805, 819) based on those which are selected for use. Continuing with the description of 813, if all of the applied persistence measured parameters 801, 802, 806, 810 are "true" when 813 is computed then, via logic 816 the timer of 811 is enabled or, if already enabled, will be allowed to continue to count. The timer of 811 is a counter or time keeping method that may include any practical method of measuring a duration of time. As an example, the timer of 811 may be but is not limited to being incorporated within the workings of the CPU or microcontroller or microprocessor held within 728 for embodiments of 700B or held within 701 of 700A. As alternate embodiments, the timer 811 may operate within the BAS or within the hood controls 617, or within the fume hood monitor 706. Following the timer enabling or continued enabling of 816, logic 817 determines if the count which has accrued within timer 811 exceeds the desired hood flushing time. As embodiments, the hood flushing time is a field adjustable setting held within 701, 728, the BAS 705, fume hood controls 617, or fume hood monitor 706. In one embodiment, the hood flushing time may be a parameter that is set using a potentiometer that is monitored by the CPU of 728 or 701. In another embodiment, the hood flushing time may be a parameter that is stored in memory that is readable by the CPU 725 or 606. For example, the systems 701 and 728 may use configuration software, such as but not limited to a desktop application, mobile application, embedded web server, or web-based software connected to data center 730 that is used by field technicians to set configuration parameters, such as but not limited to the hood flushing time value. Continuing further with the description of logic 817, if the accrued value of time within 811 does not exceed the hood flushing time the, via logic 815, the output 812 is set to "false", which ensures that at that point in time hood minimum flow setback will not be enabled. If, however, via logic 817 it is determined that the timer value 811 is greater than the hood flushing time then, via logic 818, output 812 will be set to logical "true". When 812 is logical "true", hood minimum flow setback may be enabled by setting 808 to "true", under the condition that all used momentary inputs 803, 804, and 805 are in a "true" state.

In embodiments, when contaminant status 801 becomes false for fume hood 714, thus signifying that contaminants are present in the hood, the zone of valve 604A is temporarily removed from the sampling sequence of system 700 for a sensor protective period, thus placing that zone into sensor protective mode. While in sensor protective mode the port of 604A which connects to backbone 609 is isolated from tubing 602A and the port of 604A which connects to ambient air 616 is placed in fluid communication with tubing 602A, thus allowing a flushing path between ambient 616 through 604A, through tubing 602A, through probe 709 and into the interior of duct 712 which is held at a negative pressure with respect to ambient 616.

The sash status criterion 802 involves a determination of whether the sash 715 is in a defined closed position wherein if sash 715 is closed the sash status 802 is set to true. In one embodiment, a sash 715 is defined as closed if the sash opening 716 is at the VAV sash threshold or less. For example, fume hoods such as 714 are often configured to have a VAV sash threshold which correlates to a 6-inch opening. However, embodiments include any practical value for the VAV sash threshold. Also, sash opening may alternatively be defined in terms of the open area of the sash and not strictly based on a horizontal or vertical distance measurement. Therefore, any practical system of units applied to determine sash opening are within the scope of embodiments described herein. As was discussed above, the opening of a sash 715 may be measured using sash sensing equipment that is applied to sash 715. This produces a signal which is monitored by either the hood monitor 706 directly or some portion of the hood controls 617 to create a flow command signal in order to command the flow device 710 to deliver the required fume hood flow 713. In one embodiment, hood controls 617 which is in communication with the sash sensor signal, uses the sash sensor signal to determine if the hood sash 715 is in a position that is less than the VAV sash threshold and 617 communicates this condition to control logic 702, which uses this as sash status 802. In this embodiment, hood controls 617 may provide a binary signal to logic 702 as an indication of weather sash 715 is open or closed; the binary signal includes but is not limited to a signal that may be in the form of a binary voltage, binary current, relay contacts, or a digital signal that is communicated over a network.

In an embodiment, hood controls 617 provides a signal which is indicative of sash opening 716 to control logic 702 to establish the sash status 802. In this embodiment logic 702 uses the signal that is indicative of sash opening to establish when the sash is open based upon a predetermined threshold that is configured within logic 702 for sash status 802. In some embodiments, sash status 802 may be omitted. For example, some lab exhaust hoods, such as canopy hoods or snorkel exhausts would benefit from minimum flow setback, however, such exhausts do not include a sash and, therefore, sash sensing would not be provided.

Although in embodiments hood controls 617 may be used to provide a measure of sash opening 716 to establish sash status 802, embodiments are not limited to this approach. Embodiments may include methods of determining sash opening 716 which may be independent of hood controls 617. In a further embodiment the measurement of sash opening 716 to establish sash status 802 may be determined by (using electronics which are independent of 617 or 706) monitoring the signal that is received from the one or more sash sensors applied to hood 714 that is connected to hood controls 617 or monitor 706. In many applications, for example, the sash sensor signal associated with opening 716 is a resistive signal such as that from a potentiometer; wherein the resistive signal may vary directly or, in some cases, inversely with the sash opening 716. This resistive signal is usually monitored by monitor 706 or controls 617 by applying a low-level current using an electronic current source. The electronic current source applied to the resistive sash sensor produces a sash sensor voltage which varies as the sash sensor resistance varies as sash opening 716 varies. The sash sensor voltage of this example may, as an embodiment, be monitored by any electronic module which may be independent of controls 617 or monitor 706 to produce a sash status 802.

In embodiments, sash status 802 may be based on any possible method of determining opening 716 of sash 715. For example, sash status 802 may be but is not limited to be determined by a proximity switch that is mounted on hood 714 in such a way that the proximity switch will open or close when sash opening 716 exceeds aa predetermined value that is considered to be "open", wherein the sash status 802, as determined by the opening or closing of the proximity switch will be set to logical "false".

In embodiments, sash status 802 may be based on any method of directly or indirectly determining opening 716 of sash 715. In one embodiment, the sash opening 716 may be determined indirectly using what is known in the art as sidewall sensing. Sidewall sensing incorporates methods of measuring small pressure differences between a hood 714 interior and the lab space that surrounds the hood 714, using a flow measuring device such as but not limited to a hot wire anemometer that is inserted in a tube that is in fluid communication between the hood 714 interior and the hood 714 exterior wherein, as the pressure differential between the hood 714 interior and 714 exterior increases, the airflow rate through said tube increases and is measured by the said flow measuring device to provide an indication of the said pressure differential. Sidewall sensing may be used as an indication of the airflow rate through opening 716 or as a method of indirectly measuring opening 716. An example of a product which uses sidewall sensing to sense sash opening is the FHC50 Fume Hood Controller, manufactured by TSI Incorporated of Shoreview Minnesota.

As depicted in 800A, in addition to the possible persistence measured status parameters 801, 802, 806 and 810 which must remain true for a fume hood flushing period 811, the logic 800A incorporates several possible momentary parameters, including: occupancy status 803, sensor status 804, airflow status 805, and thermal status 819. These parameters (when used) 803, 804, 805, 819 only cause the minimum flow setback output 808 to be false when any of 803, 804, 805, 819 is false but, as soon as all of the utilized inputs 803, 804, 805, 819 are set to true (while 812 is true) output 808 will be set to true and the minimum flow setback condition will be enabled. This is described further below.

Embodiments of the occupancy status criterion 803 involve a determination of whether personnel are present within a defined area associated with hood 714. In these embodiments of 803, when occupancy is not detected, occupancy status 803 is set to true. In these embodiments, this ensures that hood 714 will only be placed into minimum flow setback when occupants are not present. In one embodiment, an occupancy sensor 720 is used to sense occupancy presence, which may include temporary presence or motion, within an immediate area in front of the hood 714 as the defined area. In this embodiment, occupancy sensor 720 may be in communication with hood controls 617 which provides a signal that is representative of the occupancy to control logic 702 to determine 803. In another embodiment, an occupancy sensor is applied for the entire room within which hood 714 resides to determine the occupancy status 803. In a further embodiment, occupancy for a defined area associated with hood 714 is an assumed occupancy that is based upon a time schedule. The time schedule may be incorporated within control logic 702, building automation system 705, or hood controls 617. For example, in this embodiment of using a time schedule to determine the state of 803, minimum flow setback according to the teachings of the embodiments described herein may be enabled only during certain times of the day such as for example evening hours and weekend hours. In another embodiment, occupancy for a defined area associated with hood 714 is an assumed occupancy that is based upon a method of sensing if the lights are on within the defined area (such as the lab space for example in which the hood 714 resides) and to assume the defined area is unoccupied when the lights are off. Also, the scope of the embodiments described herein includes any combination of hood occupancy embodiments, including but not limited to the simultaneous application of a time schedule, room occupancy or hood occupancy to determine the state of occupancy status 803.

Embodiments of sensor status 804 which pertain only to multipoint air sampling system embodiments 700A, may involve several criteria which indicate that the multipoint air sampling system is operating without fault as a requirement for minimum flow setback. This may include but is not limited to a verification of proper zone level operation of the multipoint air sampling system such as for example that the zone valve such as 604A is not leaking, or that backbone 609 is of good integrity, which may be determined via an automated leak test for example that is performed by logic 702. Verification may also include an indication of the integrity of the vacuum pump 703, using a vacuum sensor for example to verify that proper vacuum is present so that the multipoint air sampling system may properly take air samples from monitored locations such as 713. A further criterion to indicate that the multipoint air sampling system is operating without fault may include a verification that the one or more sensors 612 are not operating beyond their calibration date.

Embodiments of airflow status 805 pertain to a method of preventing or disabling the minimum flow setback of a hood 714 if operational faults or alarm conditions are present within the fume hood controls 617 pertaining to the hood. There are a number of operational faults which may occur with fume hood controls 617 and when a fault or alarm is presented by 617, it is an indication that there is something wrong with the controls 617 or that some condition is present with the airflow device 710 that is creating a safety issue at hood 714. Such a condition may be, for example, that a requisite amount of static pressure is not present within duct 712 to enable flow device 710 to deliver the airflow necessary to keep the hood 714 safe. For example, an alarm condition could be an indication that the airflow through hood 714 is low, resulting in low face velocities at the hood opening 716. In these scenarios, setting back the hood via minimum flow setback would be unwise and could potentially exacerbate a safety issue. In this embodiment, a signal that is indicative of the alarm status of the hood controls 617 is conveyed to control logic 702, wherein if an alarm condition is not present within hood controls 617, airflow status 805 is set to true and if an alarm condition is present then airflow status 805 is set to false.

Embodiments of thermal status 819 pertain to methods of determining that a fume hood 714 may be in active use based on methods of temperature measurements of locations within the hood 714; wherein the said temperature measurements are compared to a predetermined temperature value, above which predetermined temperature value, the logical status of thermal status 819 is set to false, signifying that the fume hood 714 may be in use. In some embodiments, thermal status 819 may be used as an alternative to electrical status 810. In other embodiments, thermal status 819 may be applied in a complementary or redundant fashion to electrical status 810. A more detailed description of thermal status 819 embodiments is described further below.

Embodiments of equipment status 806 pertain to methods of inhibiting the minimum flow setback of a hood 714 under certain equipment usage conditions within the hood. Jacob describes a fume hood controller with detection apparatus that adjusts flow as a function of the presence and location of objects in the hood. However, as was previously explained, this approach does not address whether elevated contaminant levels are present when no object big enough to be detected by the light arrays described by Jacob are present and does not account for spills of chemicals prior to the evacuation of the fume hood of its equipment. This poses a serious potential danger to lab occupants if the fume hood flow is reduced solely because there is no equipment present within the hood, as there may in many cases be chemical residue left within the hood, due to spills and adsorptive affects. As has also been described, it is often the case that fume hoods remain loaded with equipment after use because it can be a nuisance and a productivity issue to remove all equipment after use. It is also an issue of human behavior for individuals to be required to remove all equipment from a fume hood after use if there is no clear or understood benefit by the user to do so. The latter may be addressed through embodiments of instructive signage, which is described further below.

In embodiments, a sensing apparatus for detecting objects within a fume hood is used to provide an object presence signal to render an equipment status 806 as a parameter for implementing minimum flow setback. Within this disclosure, the sensing apparatus used to detect objects and provide an object presence signal may be referred to as an object detector or an object sensor, interchangeably. In this embodiment, the equipment status term 806 is based on the object presence signal which inhibits the minimum flow setback of the fume hood when objects are present within a defined region of the fume hood 714 and which enables a fume hood flushing period via timer 811 to be activated as objects are no longer detected within the defined region and other minimum flow setback criteria are met. In embodiments, equipment status term 806 is logically true when objects are not detected as indicated by the object presence signal. In embodiments of 700A, the combination of active sensing from a multipoint air sampling system and an object detection method provides an added level of safety to the active sensing embodiments that is valuable to applications where highly toxic or odiferous compounds may be used in the fume hood. This added level of safety is provided partially due to there being a lower probability that a spill of a chemical occurring while the hood is in minimum flow setback by ensuring that no objects are present within a defined region of the hood, including vessels containing chemicals when the hood is placed into minimum flow setback. In preferred embodiments of 700B, where active sensing and a contaminant status 801 are not used, equipment status 806 is included. Embodiments for detecting objects within a fume hood to render an equipment status 806 include any possible method of object detection to provide an object presence signal, including but not limited to any form of light-based transmitter and detector pairs, light emitting arrays and detector array pairs, an optical phased array, time of flight sensor technologies, any optical triangulation method, CCD and complementary metal oxide semiconductor (CMOS) cameras, pressure detection mats, one or more RADAR sensors, any form of computer vision or machine vision approach, and ultrasonic sensing technologies. Some embodiments of rendering equipment status 806 may include, but is not limited to, methods of capturing and analyzing a digital image of at least a portion of an equipment free zone within hood 714.

Embodiments for detecting objects within a fume hood to render an equipment status 806 further include methods involving 3D depth sensing technology involving the transmission of structured light patterns onto objects within a defined region of the hood 714 and analyzing distortions of the structured light pattern to calculate object position data. U.S. Pat. Appl. 2015/0062558 A1, which is incorporated herein by reference, describes examples of structured light methods for 3D depth sensing involving the combination of time-of-flight sensing and structured light imaging. Approaches such as but not limited to this may be suitable for use in providing object detection to provide an equipment status 806.

Embodiments of fume hood electrical status 810 pertain to methods of inhibiting the minimum flow setback of a hood 714 under certain conditions where electrical energy is actively being supplied to the hood 714. In embodiments, the electrical status 810 may include any combination of electrical energy supplied to lighting within hood 714 or to power any electrical equipment that may be in operation when hood 714 is in use. For example, the hood 714 lighting may be activated by a switch 724 located on the hood 714 and the said electrical equipment may be powered through an outlet 723 on the hood 714. In an alternate embodiment, electrical status 810 may be based solely on a measurement of electrical energy supplied to power hood equipment other than lighting within hood 714. The switch 724 and outlet 723 may be located anywhere on the hood 714 and there may comprise multiples of switch 724 and 723 on a hood 714. A factor which may limit the effectiveness of contaminant status 801 is the ability of the one or more sensors 612 to detect chemical emissions from some types of compounds which may be used within a fume hood. For example, in embodiments when only a PID sensor is used as sensors 612, contaminant status 801 may not be responsive to certain types of acids which may be used in hood 714. In some cases, this may not be an issue because many acids have a low vapor pressure and, therefore, do not readily produce high vapor concentrations and therefore may be a low exposure risk to lab occupants when there is a spill. However, in other cases, a fume hood 714 may intentionally be used to contain a process in which an acid is heated or boiled, such as what's known in the art as acid digestion in which an acid is used to dissolve a substance such as, but not limited to, metals into a solution. In such a case, an acid may be heated using an electrical hot plate or some other electrical heat source to accelerate the digestion process. In embodiments, electrical heat sources include but are not limited to electrical hot plates. In the process of heating the acid, the acid's vapor pressure will be elevated, which means the compound's airborne vapor concentrations will be elevated, which may create an exposure risk for occupants if the hood 714 in which the acid is being heated is operating at a reduced minimum airflow rate. In most cases when hot plates, such as that described in this example, are used in a fume hood they receive their electrical power from an outlet, such as 723 that is provided on the fume hood. Therefore, embodiments of electrical status 810 may incorporate methods of measuring the electrical energy supplied to the hood and, in doing so, enables a determination of whether a hot plate is in operation or not. For example, typically in North America, fume hoods are connected to a common 110 VAC circuit to power both the fume hood's lighting and the one or more outlets which the hood may be equipped with. In one embodiment, the electrical status 810 may incorporate a method of measuring the current flow within the hood's circuit using a clamp-on current transformer or CT, or using some other suitable method of measuring the current that flows through the hood's electrical circuit wherein, when a current is present which is indicative of an activated hot plate, electrical status 810 is set to false. For example, a common hot plate may draw 6 amps of current at 110 VAC, while the lighting in a fume hood may draw 1 amp of current wherein, a module 727 may be configured to sense the output of a CT to signify that hood 714 is electrically active when a current value near 6 amps is detected. Because the current draw of a typical hot plate varies from one model to the next, in a preferred embodiment, the electrical threshold setting within 727 may be adjustable to support a wide range of equipment. In embodiments, the electrical status 810 may be determined by a module 727, which may, in one embodiment, be used to measure one or more electrical sensor outputs (such as that of current transformers) to determine the magnitude of the electrical energy used by hood 714 to determine if 714 is electrically active. In another embodiment, module 727 may be used to determine if hood 714 is electrically active by interfacing with a binary signal, such as but not limited to a signal from a relay or a binary voltage signal presented by another device (such as a current transformer with a binary output) which monitors the electrical energy delivered to hood 714. The determination by 727 of whether or not hood 714 is electrically active is conveyed to control logic 702 through communication 726, which 726 includes any method of signal communications. As 810 is set to false (signifying that hood 714 is electrically active), minimum flow setback will be disabled. Similarly, in an embodiment, current flow through the hood's electrical circuit may be monitored and when a current is present that is indicative of a light that is turned on in the hood, electrical status 810 may be set to false. Embodiments of electrical status 810 include any combination of monitoring fume hood lighting or hood equipment power. In some cases, electrical power to a hood's equipment may be provided through a hard-wired circuit in addition to or instead of through an outlet such as 723. For example, some fume hoods may contain heating or stirring equipment, or other equipment such as analytical equipment which may or may not be connected to an outlet such as 723 or which may be provided with electrical power via a hardwired connection or even a wireless power connection, such as an inductive coil, in which the monitoring of such electrical circuits may be provided as a method of determining electrical status 810. In embodiments, module 727 may be integrated within any type of controller and may, in some embodiments, not be a standalone module. This is the case for all the modules 722, 727, and 732 shown in 700B. In one embodiment, the circuitry used to provide the functions of hood object detector 722, electrical detection 727, hood temperature detection 732 and logic 702 are integrated within one circuit assembly.

Embodiments of electrical status 810 are not limited to monitoring the electrical power associated with a hood's lighting or hot plate use but may include any combination of electrical equipment used within a fume hood. For example, electrical status 810 may be determined but is not limited to the power drawn by: any type of analytical equipment including a gas chromatograph, high performance liquid chromatograph (HPLC), spectrometers, titrators, particle size analyzer or particle counter, elemental analyzers, rheometers, chemical detection equipment, robotic equipment, magnetic and other stirring equipment, compressors and vacuum equipment, centrifuge equipment, and any type of heating equipment such as hot plates, microwave equipment, lamps and other heating equipment.

In some fume hood applications, a fume hood 714 may be equipped with a combustible gas source for purposes of operating a Bunsen burner or some other gas fired heat source. Such gas sources may include but are not limited to propane, natural gas, butane, methane, liquified petroleum gas, or some other combustible gas or mixture thereof. Generally, when a fume hood is equipped with a combustible gas source a gas control valve, such as but not limited to control valve 2205 of FIG. 22, may be incorporated within the hood 714 as a method of delivering the combustible gas to provide a heat source and to interrupt or shut off the gas when not in use. When a combustible gas source is in use within a fume hood 714, it is usually for purposes of providing a heat source (such as but not limited to the operation of a Bunsen burner) to elevate the temperature of a compound or chemicals used within hood 714, like the function of a hot plate. Embodiments include methods of establishing gas status when a fume hood 714 is equipped with a combustible gas source. When 714 is equipped with a gas source, it is highly desirable to determine if the gas source is in use and if so, as an embodiment, to signify that the hood 714 may be in a state of use. Embodiments of providing a gas status may include any method of detecting gas flow of a combustible gas source to a fume hood 714 as a method of determining that a fume hood 714 may be in a state of use. Such gas flow detection embodiments may be provided in addition to or in combination with embodiments of electrical status 810. As an example, gas status embodiments may include any form of gas flow measurement through valve 2205, including but not limited to pressure sensing, acoustical based flow detection, rotameter, vortex shedding, hot wire anemometry, vane anemometry, mass flow measurement, belometry-based methods, or any other practical method of detecting gas flow. U.S. Provisional Appl. No. 62/834,526, which is incorporated herein by reference, describes a field calibration reference suitable for a multipoint air sampling system. The field calibration reference incorporates a permeation source which may generate a calibration gas for many months or even years without being depleted, thereby enabling a recurrent verification of the calibration of the one or more sensors disposed within the multipoint air sampling system. This enables various methods of sensor fault detection and notifications for service, as well as an evidence log as some of the features.

As one embodiment, the calibration reference 718 is a permeation source that is used to verify the integrity of the one or more sensors 612 as one of the criteria for setting sensor status 804 to logical true, thereby enabling fume hood minimum flow setback.

Embodiments of FIG. 7B include methods of hood condition monitoring for the purpose of providing minimum flow setback without using the contaminant status 801 or sensor status 804. As has been described, there may be cases where it may not be possible to detect all the possible contaminants which may be contained within hood 714. In such cases, as a safeguard, using 700A the hood flushing time set within 811 may be increased to allow hood 714 to be flushed with clean air for a longer period of, for example, several hours versus several minutes to ensure that any chemical spills have been evaporated and vapors have been removed through airflow 713 before the hood 714 is placed in a state of minimum flow setback. In such scenarios, however, it may be more cost effective to use the approach of 700B to monitor the usage status of hood 714. 700B incorporates control logic 702, which is identical to logic 702 within 700B, except there is no interface to a multipoint air sampling system. Likewise, the control logic 702 within 700B omits contaminant status 801 and sensor status 804 as setback criteria. As shown in 700B, logic 702 may be contained within a module 728, along with a CPU 725 which is in communication with 702. In other embodiments, logic 702 may be performed within the BAS 705, a remote data center 730, or within hood controls 617, or fume hood monitor 706. In a further embodiment, logic 702 may be performed within hood object detector 722. In yet a further embodiment, elements of hood electrical detection 727 may be contained within module 728 which also performs logic 702. Embodiments of 700B may incorporate sash status 802, equipment status 806, electrical status 810, occupancy status 803, thermal status 819 and airflow status 805. As is discussed further below, hood temperature detection 732 is used to determine a hood thermal status 819 which can be important in some hood configurations, especially when the hood 714 is equipped with some form of gas ignition source. In embodiments of 700B, when the hood 714 is not equipped with a gas ignition source for equipment, such as Bunsen burners, it may not be necessary to include a thermal status 819, as long as a hood electrical status 810 is included. Embodiments of hood electrical status 810 involves methods of detecting electricity use within 714. Electrical detection may be performed within module 727, which may include electronics used to measure electrical sensor outputs, such as but not limited to any number of current transformers measuring power to hood 714. The result of whether electricity is present or not is conveyed between module 727 and control logic 702. Hood electrical status 810 provides an effective way to determine that a fume hood 714 is thermally active when an electrical heat source, such as but not limited to a hot plate, is in use. However, as is described further below, when a hood 714 is equipped with a gas ignition source, embodiments of thermal status 819 provide an effective way to detect when the hood 714 is thermally active. Information which indicates if 714 is or is not thermally active is conveyed between hood temperature detection logic 732 and control logic 702 via connection 726, which may include any form of analog or digital communications.

In embodiments of 700B, the usage condition of a hood 714, may be reliably determined for any conceivable hood application. However, as has been discussed, applications of 700B generally require longer hood flushing periods in 811, over that of 700A. This is because embodiments of 700B do not include methods 801 of detecting contaminants within the hood 714. Therefore, a conservative flushing time 811 is applied in 700B which anticipates a worst-case spill condition within hood 714. In embodiments of 700B, a flushing time of 2 or more hours may be used in timer 811.

Embodiments may include methods of controlling the minimum airflow setting of a fume hood using at least a first and second phase of setback and may further include any number of phases of setback, which progress based upon a timed sequence. Providing multiple timed phases of minimum flow setback can result in significant improvements to fume hood energy savings by taking advantage of the fact that the longer a fume hood remains in a state of minimum flow setback (based upon the disclosed embodiments) the less likely it is that the fume hood is a contaminant risk to lab personnel due to chemical spills or vapor emissions within the hood. Therefore, in embodiments, using timed phases of setback makes it possible to either further increase the amount by which a fume hood's minimum flow is reduced via setback or one or more of the criteria for minimum flow setback may be relaxed or eliminated using multiple timed phases of setback. In embodiments described herein, timed phases which follow a first phase of minimum flow setback may be referred to as conditions of enhance minimum flow setback (EMFS), as described further below.

In embodiments involving at least a first and second phase of minimum flow setback may include a variable minimum flow setback function to enable the hood to achieve a more pronounced reduction in airflow rate, herein enhanced minimum flow setback (EMFS), based on a timed function. In this embodiment, once the criteria for minimum flow setback has been met, including any combination of contaminant status criterion 801 sash status 802, occupancy status 803, sensor status 804, airflow status 805, electrical status 810, and equipment status 806, the airflow rate of the fume hood 714 will initially be reduced to a first phase of reduced hood minimum flow value and then, over a period of time the hood minimum flow value may be further reduced in a second or more phase of setback as long as the criteria for minimum flow setback in 800A continues to persist. In embodiments the period required to transition from the onset of minimum flow setback to a fully reduced minimum flow via enhanced minimum flow setback may range from several hours to several days. This approach of enhanced minimum flow setback allows a fume hood's airflow to be more significantly reduced beyond the first reduced hood flow value where, over time, a higher degree of certainty is established that the hood is not in use or contaminated, based on the persistence of the minimum flow setback condition. In embodiments of enhanced minimum flow setback, the hood's airflow may either be reduced in a continuous manner or in one or a plurality of steps, based upon the persistence of the minimum flow setback condition.

Figure 9A:
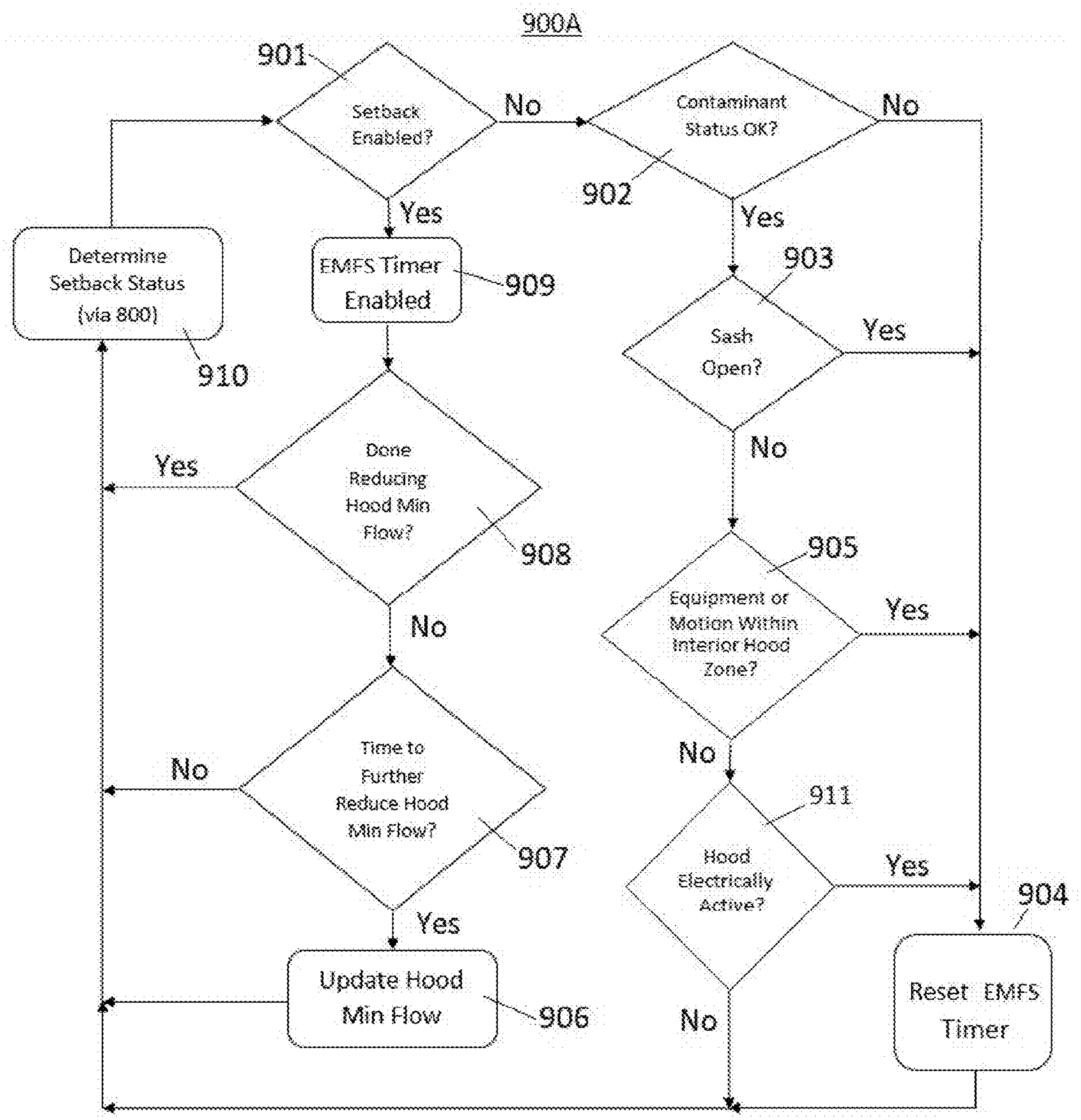
FIG. 9A illustrates a process for rendering fume hood minimum flow setback.

It is common that one or more fume hoods within a lab may not be used for extended periods of time, even though the lab may be frequently occupied by personnel, including locations which are in front of the one or more unused fume hoods. In such cases a state of enhanced minimum flow setback would seldom occur, if it is required that the one or more fume hoods or the lab persistently be in an unoccupied state (occupancy status requirement 803) in order for the one or more unused fume hoods to enter a state of enhanced minimum flow setback. However, a measurement of occupancy in front of a hood or surrounding lab space serves as an indication of the potential for a fume hood to be used and is not an indication that there is a potential that something has changed with the contaminant status inside a given hood. In an embodiment, the persistence of occupancy status criteria 803, sensor status 804 and airflow status 805 are not factored in determining the status of enhanced minimum flow setback. FIG. 9A illustrates the logic used to implement this embodiment, which starts with the logic 800A that determines if minimum flow setback shall be enabled based on output signal 808, as previously discussed. Logic 900A may be performed within control logic 702. Referring to 900A, if minimum flow setback is enabled, as evaluated by decision block 901, then a timer 909 (enhanced minimum flow setback timer, herein EMFS timer) is enabled if it is not already enabled. The EMFS timer in 909 is the timer used to evaluate when further reductions in hood minimum flow shall be implemented beyond the initial reduction in hood minimum flow that takes place when the hood is initially placed into minimum flow setback. In this embodiment 900A when enhanced minimum flow setback is included the EMFS timer in 909 is enabled as minimum flow setback is first enabled. If the fume hood flow has been reduced to a maximum specified value while in enhanced minimum flow setback, as determined by logic element 908, then the logic 900A will loop back to once again perform logic 800A and the next iteration of 900A will begin. If the flow has not been fully reduced while in the enhanced minimum flow setback state, as determined by 908, then logic element 907 will assess if the minimum flow setback condition has been persistent for a long enough period to further reduce the airflow 713 through fume hood 714. If so, then the hood minimum flow will be updated via logic 906. If logic element 901 determines that hood 714 is not in a state of minimum flow setback then the logic elements 902, 903, and 905 are used to assess if there's a potential that something has changed that could affect the contaminant status inside hood 714. This is first assessed directly by logic 902 which evaluates the contaminant status 801 to see if contaminants are present. If contaminants are present within the hood 714 as determined by contaminant 801 then, via logic 904, the EMFS timer will be reset. Similarly, if contaminant status 801 evaluates as noncontaminated, then logic element 903 evaluates if the sash 715 is open and, if so, the EMFS timer will be reset by element 904. Logic element 905 may be incorporated to evaluate if equipment is present within the hood or if there is motion (described further below) according to criterion 806 if used and, if so, then the EMFS timer will be cleared via 904. If, before resetting the EMFS timer via 904, the hood 714 was operating in an enhanced minimum flow setback state then, when logic 800A again reactivates minimum flow setback, the hood 714 will not immediately be returned to its original enhanced minimum flow setback conditions. This is because, when the EMFS timer is reset, it signifies to the control logic 702 that the hood may be contaminated and therefore that it is not safe to place it into a deep setback state.

The logic of 900A supports the function of enabling the hood controls, such as 617, to temporarily switch out of a state of enhanced minimum flow setback due to temporary changes in occupancy 803, sensor status 804, or airflow status 805, as long as the contaminant status 801 and sash status 802 do not change. As an example scenario, assume a fume hood 714 which initially operates at an air change rate of 160 ACH when it is not in minimum flow setback and its sash 715 is fully closed, but initially some contaminant levels are present within the hood. Continuing further with this example, after the fume hood 714 has been used, its sash 715 may be in a closed position, no occupancy may be detected by sensor 720 after some period of time and, after some period of time, contaminant levels as measured by the one or more sensors 612 may reduce to values less than an action level. This scenario may result in minimum flow setback being enabled by logic 800A which, as an example, may result in a hood minimum flow reduction implemented through hood controls 617 that results in the hood initially operating for example at 140 ACH while in minimum flow setback. Continuing further with this example, the logic 900A may additionally reduce the minimum airflow of hood 714 so that, for example, after several days of operation without the sash 715 being opened or without sensors 612 detecting contaminant levels above predetermined action levels, hood 714 is placed into a state of enhanced minimum flow setback (EMFS) whereby, for example, the minimum flow through hood 714 is further reduced so that the hood now operates at 100 ACH. While in this EMFS state, if occupant sensor 720 then detects someone in front of the hood 714, logic 800A which is in communication with hood controls 617 will immediately switch controls 617 out of minimum flow setback and, assuming the sash 716, hood 714 will once again operate at 160 ACH. Continuing with this example, assuming the occupant steps away from the front of the hood and occupancy sensor 720 no longer detects occupancy, according to logic 900A, assuming the sash 715 has remained closed and contaminant levels as seen by sensors 612 remain at levels lower than predetermined action levels, then the fume hood 714 will return to its original EMFS state and hood 714 will once again operate at 100 ACH.

As an example of relaxing or eliminating setback criteria using a phased approach, while in a first phase of setback, the minimum flow setback of a hood may be temporarily interrupted as the hood becomes occupied, using a determination of occupancy status 803 as described in embodiments of 800A. However, as an embodiment, once the period associated with the first phase of setback has expired, in a second phase of setback the setback logic of 800A may then omit occupancy status 803 as a criterion for setback. In this example, the first phase of setback may have a period that is set to any duration but most commonly, the period of the first phase of setback may be between 0.5 and 4 hours, depending on the choice of embodiments 700A or 700B. During this first phase, when an occupant is present at the fume hood of this example and all other applicable setback criteria of 800A are met, the minimum flow setback condition will be temporarily interrupted and the fume hood will operate at a non-reduced minimum airflow value. Further, in this example, once the fume hood setback condition has entered a second phase of setback, occupancy may no longer affect the fume hood's minimum flow setback condition. The value of eliminating the fume hood setback occupancy criterion 803 in the second phase of setback is that, in this embodiment, it enables the fume hood of this example to remain in a minimum flow setback state (assuming all other setback criteria of 800A are met) even when the lab area surrounding this fume hood is occupied. Thus, this enables the fume hood of this example to continue to operate at a reduced minimum airflow level to save energy, even though the lab is occupied. In this example, the first phase of setback provides an added level of safety by incorporating occupancy status 803 as a setback criterion, which prevents any chemical fumes that may be present within the fume hood during this early time of setback from escaping the fume hood due to occupant motion in front of the fume hood, by operating the hood at a higher flow rate while occupied.

Figure 9B:
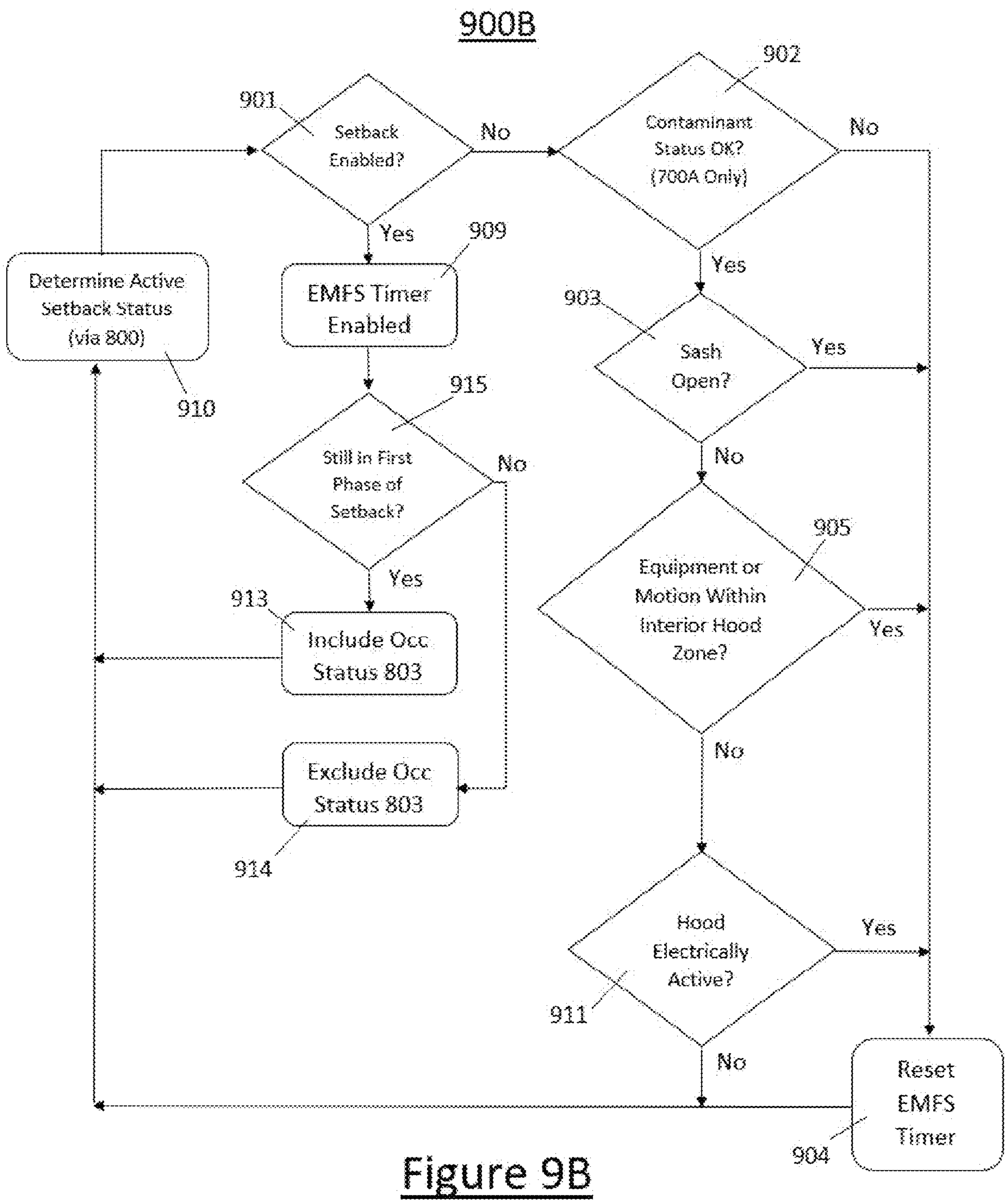
FIG. 9B illustrates another process for rendering fume hood minimum flow setback.

FIG. 9B further illustrates embodiments of relaxing or eliminating setback criteria using a phased approach. The logic shown in FIG. 9B incorporates similar logic as that for the enhanced minimum flow setback of 900A; however, in embodiments of 900B instead of changing the magnitude of the hood flow setback, one or more momentary criteria for maintaining hood minimum flow setback are changed over time. As has been discussed, the momentary criteria may include occupancy status 803, sensor status 804, and airflow status 805. The logic illustrated in 900B eliminates the occupancy status criterion 803, when the hood 714 has been in a state of minimum flow setback for a predetermined period. Other embodiments may include any combination of momentary criteria 803, 804, 805. Similar to 900A, logic block 901 determines if minimum flow setback has been enabled and, if so, the enhanced minimum flow setback (EMFS) timer is enabled or maintained in an enabled state via logic 909. The EMFS timer accrues a count which is representative of the time duration over which the hood 714 has been in a minimum flow setback state. Logic 912 then determines if the count which has accrued within the EMFS timer exceeds the predetermined time duration associated with the first phase of setback. The time duration associated with the first phase of setback (herein phase 1 period) may be a parameter that is set within system 701 (when a multipoint air sampling system is used) or it may be set within module 728, the BAS 705, hood controls 617, a remote data center 730, or fume hood monitor 706. If the count accrued by the EMFS timer of 909 exceeds the predetermined phase 1 period the, via logic 914, occupancy status 803 is then excluded from the momentary criteria which is evaluated by logic 807 to determine if hood minimum flow setback may be activated or remain activated. If the evaluation of logic 912 determines that the count accrued within the EMFS timer is less than the phase 1 period then, via logic 913, occupancy status 803 continues to be included with the momentary criteria for setback. The remaining logic of 900B is identical to 900A. If the hood 714 in not in a state of minimum flow setback as determined by logic 800 and evaluated by logic 901, then each of the persistence measured inputs (801, 802, 806, 810) are evaluated via logic 902, 903, 905, and 911, respectively; and if any of 801, 802, 806, 810 prove false, then the EMFS timer is reset in 904. Practically, the latter logic test prevents errors in the duration of the first phase of minimum flow setback by ensuring that the EMFS timer is cleared anytime any of the persistence measured inputs (801, 802, 806, 810) transitions to a logical false state. For example, if the hood of 714 is first in a state of minimum flow setback and one of the selected criteria of 900B is sash status 802, following which a lab occupant were to then open the sash 715 to a point where the hood 714 is now considered to be open (sash status 802 is "false") then minimum flow setback would immediately be disabled, resulting in logic 901 to evaluate to "no" and logic 903 to evaluate to "yes" which resets the EMFS time via 904.

As one of the discussed embodiments, to enable minimum flow setback the control logic 702, which may reside within multipoint air sampling system 701 or module 728, may provide a setback signal to hood controls 617 and the setback signal may be a binary signal including but not limited to relay contacts or a binary voltage or current signal that is provided via connection 618, or the setback signal may be a digital signal that is communicated over a digital network via connection 618. In an embodiment in which both minimum flow setback and enhanced minimum flow setback are provided includes but is not limited to a first binary signal to enable minimum flow setback and a second binary signal to enable enhanced minimum flow setback. In this embodiment, both the first and second binary signals may be but are not limited to binary voltages or current signals, or the binary states may be in the form of digital signals communicated over a network through connection 618 to hood controls 617. In other embodiments, the first and second setback signals may be communicated to hood controls 617 via the BAS 705. In this embodiment, involving a first and second setback signal for minimum flow setback and enhanced minimum flow setback, the hood controls 617 must be preconfigured using software or hardware settings within 617 to determine what minimum flow the device 710 must be set to when either the hood controls 617 is commanded into minimum flow setback or 617 is commanded into enhanced minimum flow setback.

As an alternate embodiment, control logic 702 provides a signal to hood controls 617 which combines an indication of minimum flow setback and enhanced minimum flow setback. In one embodiment, a signal from control logic 702 may be a voltage, current or digital signal which conveys one of three states to fume hood controls 617, including the states of non-setback, minimum flow setback, and enhanced minimum flow setback. In this embodiment of conveying one of three states to fume hood controls 617, the signal may for example be a three-level voltage signal such as for example 0 volts, 5 volts, and 10 volts to signify non-setback, minimum flow setback, and enhanced minimum flow setback.

Figure 10:
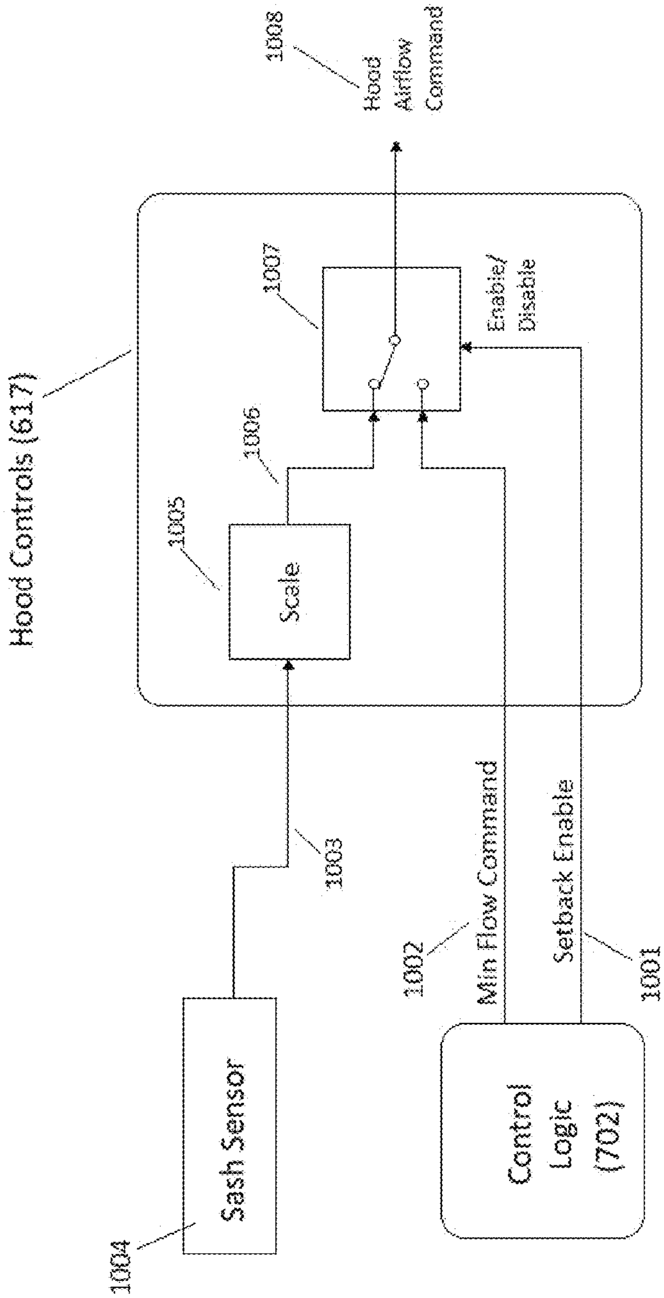
FIG. 10 illustrates an interface between control logic of a multipoint air sampling system and a setback enable signal.

An embodiment of signals for minimum flow setback involves, a first binary signal from control logic 702 that may be used to enable minimum flow setback or enhanced minimum flow setback and a second signal that is a minimum airflow command signal which may be used to command fume hood controls 617 to the desired airflow. This embodiment is illustrated in FIG. 10. FIG. 10 shows an interface between control logic 702 of multipoint air sampling system 701 which includes a min airflow command 1002 and a setback enable signal 1001, which are used in this embodiment to support minimum flow setback and enhanced minimum flow setback of fume hood 714. When signal 1001 is set to logical True, minimum flow setback for hood 714 shall be enabled. When signal 1001 is set to logical False, minimum flow setback for hood 714 shall be disabled. Elements 1005 and 1007 shown in FIG. 10 are portions of the logic and electronics held within hood controls 617, and switch 1007 is a specific element of this embodiment. It should be clear that, although FIG. 10 only shows elements 1005 and 1007 within hood controls 617, that this is being illustrated this way in order to simplify the description of 1000, and that it's not intended to imply that elements 1005 and 1007 are the only elements of hood controls 617. Switch 1007 is used to implement a selection function whereby, if the setback enable signal 1001 is set to logical True (such as when in minimum flow setback or enhanced minimum flow setback), then the minimum flow command 1002 is selected as the hood airflow command 1008. Airflow command 1008 is the airflow rate that device 710 is controlled to. If the signal 1001 is set to logical False, then the scaled sash sensor signal 1006 is selected as the hood airflow command 1008. Sash sensor 1004 is the sensor or system of sensors used to measure the sash opening 716. Sensor 1004 outputs a signal 1003 which is a measurement that is proportional to the open area of the sash. The signal 1003 can be representative of the open area of any combination of sash arrangements. For example, signal 1003 may represent the combined measurement of sash opening from one or a plurality of vertical moving sashes, one or a plurality of horizontal moving sashed, and one or a plurality of any combination of horizontal and vertical moving sashes. As shown, the sash sensor 1004 normally interfaces directly with hood controls 617. In some cases, a portion of hood controls 617 will reside in monitor 706, as discussed and if so, this would also be considered as part of this embodiment. The configuration of FIG. 10 provides the most amount of flexibility when it comes to applying minimum flow setback to fume hood 714, as it allows the fume hood's minimum flow to be set and then varied over time as logic 702 implements the enhanced minimum flow setback mode.

The fume hood monitor 706 at least provides an indication of the status of the fume hood. More specifically, some form of fume hood monitor is required by the National Fire Protection Association® (NFPA®), the Occupational Safety and Health Administration (OSHA®) and is specified within ANSI Z9.5-2012. Generally, the hood monitor 706 must provide an indication of fume hood flow or face velocity as well as an alarm indication relating to conditions where the hood's airflow or face velocity are incorrect. In one embodiment, control logic 702 communicates with hood controls 617 which is in communication with monitor 706, to indicate the contaminant status of the fume hood 714 so that the status may be displayed by the user interface of the monitor 706. Such an indication of contaminant status may include but is not limited to a summary of which of the contaminants that are monitored by sensors 612 appear in concentrations higher than predetermined action levels which may be programmed into system 701. In another embodiment, monitor 706 may display the raw data from sensors 612 on the user interface of 706. In a further embodiment, monitor 706 displays if the hood 714 is in minimum flow setback or enhanced minimum flow setback. Although if a lab occupant stands in front of the hood 714, setback will be disabled, it can be useful to lab occupants and facility maintenance personnel to see from distance that the hood 714 is indeed going into a state of minimum flow setback or enhanced minimum flow setback. In another embodiment, monitor 706 displays minimum flow setback statistics. The minimum flow setback statistics may include the percentage of time that the hood 714 is in a state of minimum flow setback or enhanced minimum flow setback. The minimum flow setback statistics may include the average airflow reduction associated with minimum flow setback or enhanced minimum flow setback as it applies to hood 714.

Figure 11:
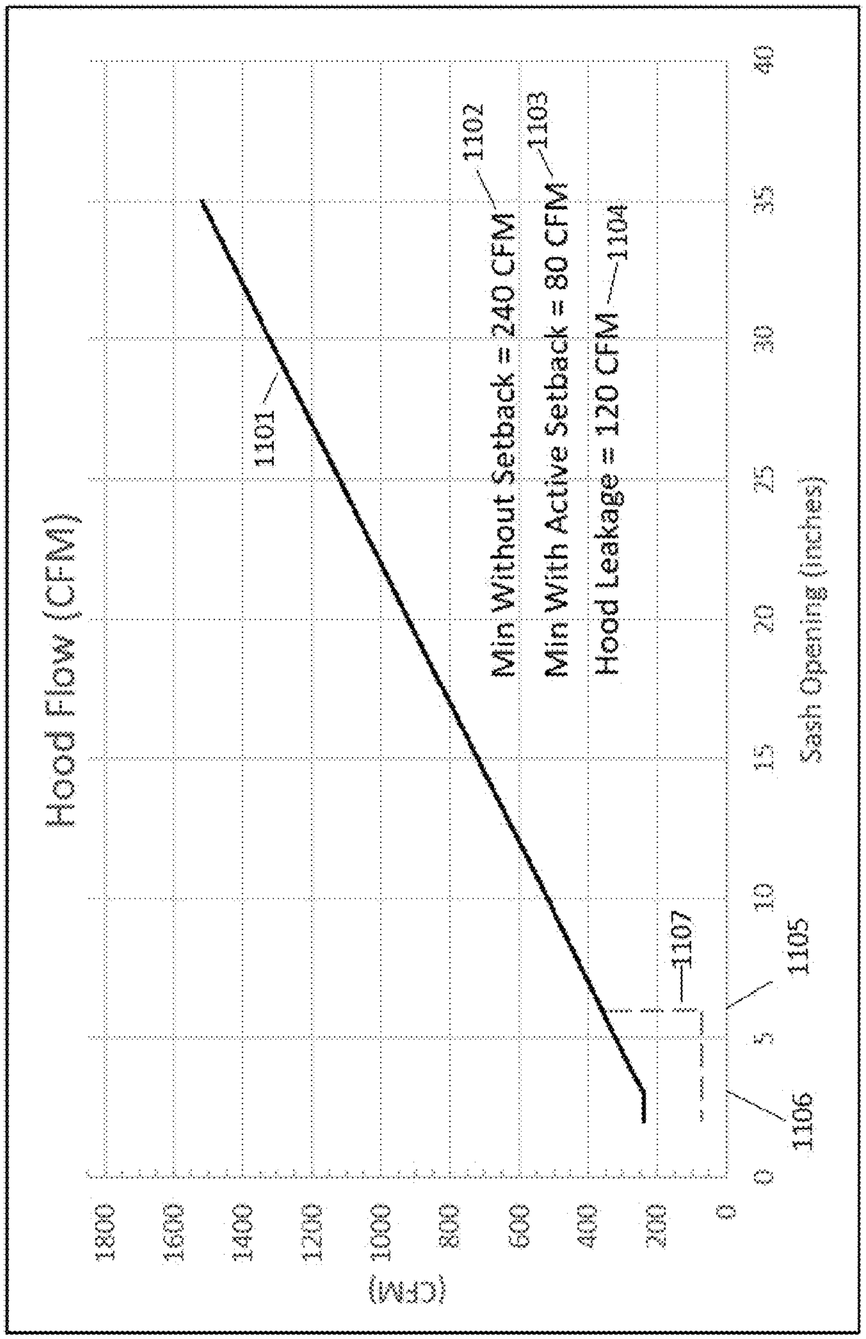
FIG. 11 illustrates a flow versus sash position for a fume hood and an internal volume.

In many cases, due to fume hood leakage, the fume hood minimum airflow defined by ANSI Z9.5-2012 is lower than the airflow rate that results when the hood's sash is placed at a 6-inch opening. As has been discussed, a 6-inch opening is commonly identified as the edge of a hood's constant volume range 301. (The edge of a hood's constant volume range was also described above as the VAV sash threshold.) As a result, in order to save energy, a fume hood system may be configured with a reduced VAV sash threshold, often reducing the boundary of the constant volume range 301 down to only a few inches. For example, it's not uncommon to reduce the constant volume boundary 301 to a 3" sash opening or less. Sometimes, because of hood leakage, the constant volume range is eliminated altogether. This reduced constant volume range can make it difficult to define when the hood is truly closed. Also, these low settings can go beyond the mechanical adjustment resolution of the sash, which may easily spring open beyond its constant volume range, when the range is small due to issue with sash stiction and vibrational issues that will cause the sash to "walk" upwards over time. In one embodiment, the sash status criterion 802 is set to a sash opening value that is higher than the VAV sash threshold of the hood 714. This embodiment may significantly improve the reliability with which minimum flow setback is implemented by allowing the hood 714 to enter minimum flow setback, assuming other criteria in 800A are satisfied, even though the sash 715 may not be closed to its constant volume range. This embodiment is also important for fume hoods which may have sash obstructions, such as hoses or other hood apparatus which may interfere with the sash 715 from being closed to its constant volume range. This embodiment is illustrated in FIG. 11, which shows the flow versus sash position for a 6-foot wide VAV fume hood having 120 CFM of leakage, and an internal volume of 40 cubic feet. Curve 1101 illustrates the sash position versus airflow relationship while the fume hood is not in a state of minimum flow setback. To compensate for the 120 CFM of hood leakage, the constant volume range of this hood is set to a 3-inch opening 1106. The dashed curve 1107 illustrates the hood's flow rate when it is placed into minimum flow setback where, in this case it has been chosen to set back the hood to 120 ACH, when in minimum flow setback. For a 40 cubic foot hood, as described, this correlates to a flow rate of 80 CFM while the hood is in minimum flow setback. In accordance with this embodiment, the sash status criterion 802 (the maximum sash opening where minimum flow setback is enabled) in this example is set to a sash opening value 1105 of 6-inches that is higher than the constant volume sash opening 1106 which, in this case is only 3-inches. In the example of FIG. 11, 6 inches was chosen as the maximum sash (herein the setback sash threshold) opening beyond which sash status criterion 802 is not satisfied to enable minimum flow setback. It should be recognized that this embodiment supports any practical value for setback sash threshold and that setback sash threshold is not exclusively based on the distance of the sash opening but, as an alternate embodiment may also be defined as the open area of the sash opening. Likewise, constant volume range as defined by the VAV sash threshold, as it pertains to sash position may refer to either a distance or area measurement. In embodiments, a sash status is based upon the setback sash threshold which is greater than the variable air volume sash threshold of the fume hood.

Figure 12:
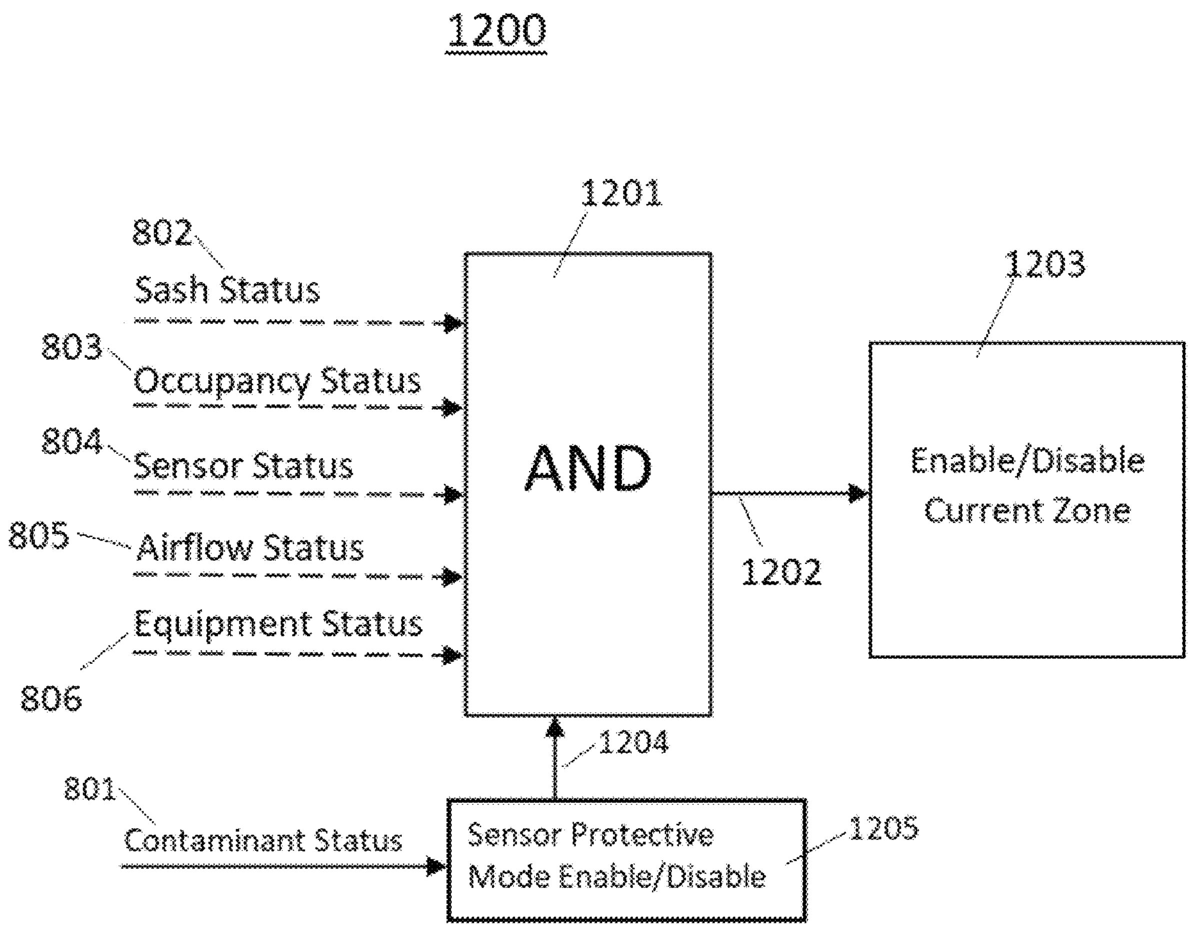
FIG. 12 illustrates logic for implementing fume hood minimum flow setback.

In embodiments, one or more non-contaminant usage conditions at fume hood 714 determine if the one or more zones of multipoint air sampling system 700 (which are assigned to monitor the fume hood) are enabled. This function is illustrated within FIG. 12 which incorporates logic block 1201, which may provide a logical AND function to any combination of non-contaminant usage criteria including sash status 802, occupancy status 803, sensor status 804, airflow status 805 and equipment status 806. AND function 1201 additionally incorporates an indication of sensor protective mode 1204 and provides a logical output 1202 of true or false (based on the ANDing of the true or false conditions of 802, 803, 804, 805, 806, and 1204) which is applied to enable or disable the one or more multipoint air sampling system zones associated with the hood to which the non-contaminant usage conditions pertain. In some embodiments, multiple zones of a multipoint air sampling system will be utilized, in order to provide a minimum flow setback function, as is described in more detail below. In embodiments, logic 1200 may be performed by control logic 702. Logic 1200 may disable the current zone of the multipoint air sampling system if any one of the criteria 802, 803, 804, 805 and 806 prove false. The condition where contaminant status 801 proves false is a special case (where contaminants above a predetermined action threshold are detected) resulting in the sensor protective mode which has already been described. When contaminant status 801 is false, logic 1205 latches its output 1204 to a false state for a predetermined period that is equivalent to the protective mode period, which was previously described. Therefore, because of the AND logic of 1201, as output 1204 is maintained as false for the protective mode period, output 1202 will be held at a false state for the protective mode period which, in turn, causes the current one or more zones to which the contaminant status 801 pertains to be disabled via logic 1203.

There are two benefits to disabling a zone when one or more non-contaminant usage criteria (802, 803, 804, 805, 806) prove false. First, by disabling the zone under this condition, this embodiment decreases the potential exposure of the one or more sensors held within the multipoint air sampling system and thus helps to reduce sensor fouling which promotes less sensor drift and improves sensor field life. Second when a zone is temporarily removed from the sampling sequence, the cycle time of the multipoint air sampling system is reduced and therefore the system's 700 speed of response to detect contaminants which may be present in other hoods which may presently be in a state of minimum flow setback improves. This second benefit may be important for example in partially occupied labs with multiple monitored hoods where a portion of the hoods are in a state of minimum flow setback and yet other hoods are used by lab occupants. By more rapidly monitoring the contaminant levels in these actively setback hoods, it provides a higher level of safety for the lab occupants. As an example, if a hood 714 is in use, sash status 802 may be set to false (because the hood's sash 715 is open) and, based on the logic of 800A, the hood 714 cannot be placed into minimum flow setback when the sash 715 is open. Therefore, there is no value to sensing contaminant levels in hood 714 when in this condition and, because of logic 1200 due to sash status 802 being currently false, output 1202 will be false and the zone associated with hood 714 will be disabled.

Light detection and ranging (LIDAR) sensing technology is increasingly being applied to high volume applications, such as for example autonomous and semi-autonomous vehicles, for fast and reliable object detection. LIDAR is also increasingly being used in low-cost drone products and other applications such as 3D scanning and mobile phone applications. LIDAR is also being used extensively in outdoor safety applications, such as on heavy moving equipment such as forklifts and other machinery for collision avoidance. One manufacturer of such collision avoidance LIDAR systems is SICK AG of Waldkirch Germany. Because of the expanded areas of use, the sensing reliability has improved substantially, especially as LIDAR is being used in life safety applications. Also, the cost of some LIDAR systems has dropped substantially where, less than 15 years ago, a LIDAR system with 3D imaging capabilities may cost tens of thousands of dollars where, now some systems can be purchased for less than a thousand dollars. As an embodiment, a LIDAR system is used to scan a specified region within a fume hood to create an object presence signal as an equipment status parameter 806 for implementing minimum flow setback. One of the advantages of LIDAR sensing is that it provides both excellent detection angle (enabling the sensor to "see" everything within the hood) and good resolution (down to ¼ inch or less). Because of these sensing attributes with LIDAR, although it is more expensive than other object detection technologies, as one embodiment, the LIDAR sensor additionally is used to measure sash opening 716 to create a sash signal that is monitored by either the hood monitor 706 directly or some portion of the hood controls 617 to create a flow command signal in order to command the flow device 710 to deliver the required fume hood flow 713. Thus, in this embodiment a LIDAR sensor may both provide object detection and function as the sash sensor for hood 714.

Figure 13:
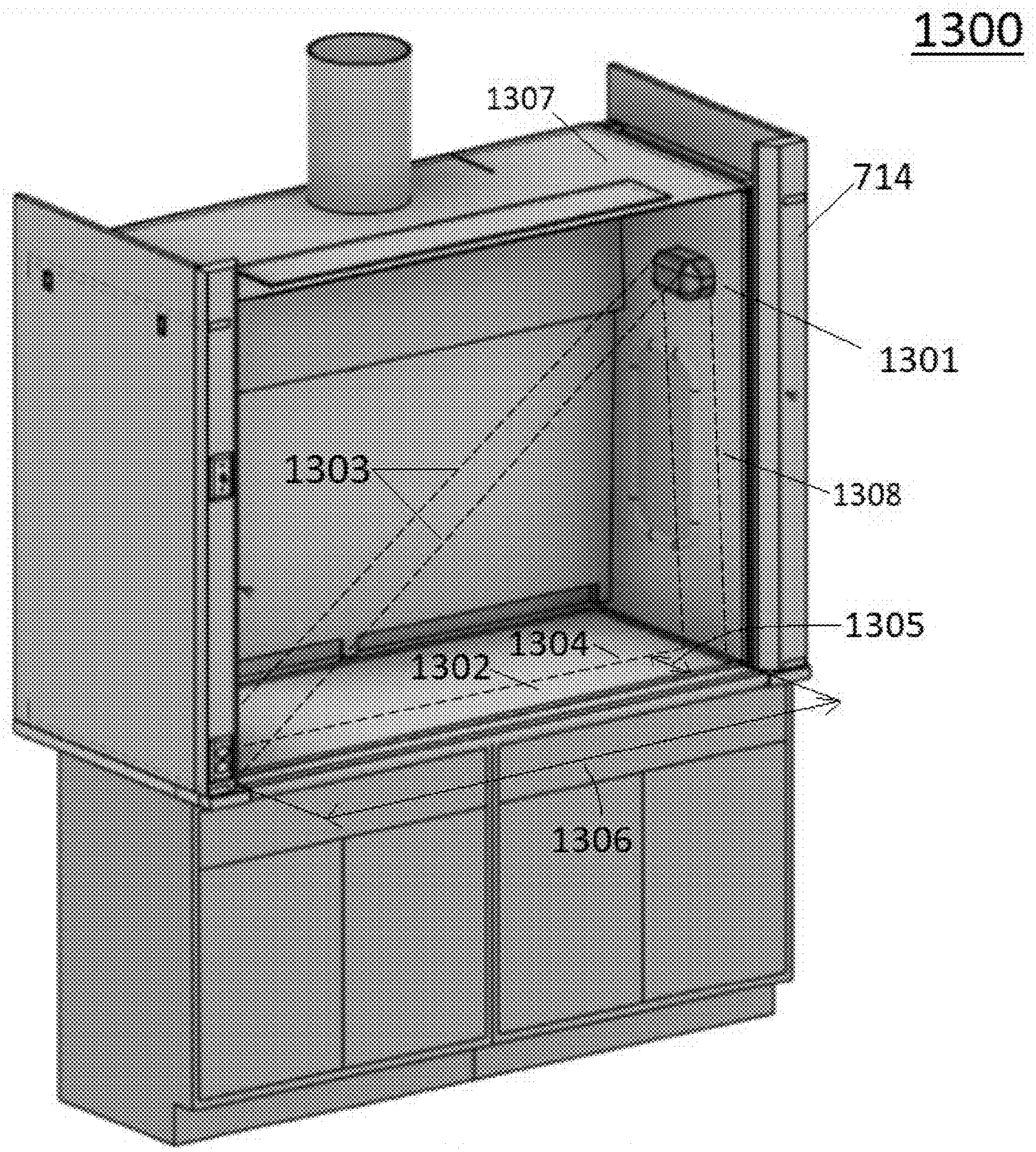
FIG. 13 illustrates a fume hood which includes an object detection sensor.

FIG. 13 illustrates a fume hood which includes an object detection sensor 1301 which is used to detect objects within a region above a specified area 1302, forming a defined zone above the fume hood work surface 208. Although FIG. 13 illustrates the placement of sensor 1301 on the upper right-hand side of the interior of the fume hood, sensor 1301 may be placed anywhere within the hood. Herein, the defined zone of 1303 shall include the area of 1302 and regions above the area of 1302 that sensor 1301 is adjusted to sense. This includes any portion of the interior fume hood height up to the interior top of 1307 of hood 714. In embodiments, the vertical height 1308 of the zone 1303 may not be uniform across the width 1306. The area above 1304 forms the rear edge or boundary of the area 1302. In embodiments, this rear boundary 1304 of area 1302 may form a straight line, or the rear boundary 1304 may be of any curved shape. Herein, rear boundary 1304 may be referred to as the rear boundary of the equipment free zone. The front boundary of the area 1302 is formed by the intersection of the rear edge of sash 715 and the hood work surface 208 when the sash is fully closed. Thus, the depth 1305 of the area of 1302 is the distance from the rear edge of sash 715 where it meets the work surface 208 to rear boundary 1304. Herein, the depth 1305 may also be referred to as the equipment free zone depth. Likewise, the equipment free zone width 1306 may be equivalent the inner width of the hood 714 work surface 208. In applications, width 1306 may be roughly equal to the width of the sash 715. The shape of the defined zone 1303 may be any volumetric shape and this shape may depend on the type of sensor 1301 and where it is located within hood 714, as well as the shape of the area 1302. Within this disclosure, the defined zone of 1303, defined zone 1303, and zone of 1303 shall be used interchangeably. Also, the volumetric shape of zone 1303 may be referred to as the equipment free zone, as it is the defined zone that must be free of equipment to satisfy the equipment status 806 requirement for minimum flow setback, as is discussed further below. In applications, the sensor 1301 may be calibrated so that, although it may detect objects outside of the defined zone of 1303, it is able to discern the presence of objects which are within the defined zone of 1303. Further, in embodiments the region above a specified area 1302 shall include any volume of space within the fume hood 714 above the surface formed by a specified area 1302 on the hood work surface 208. The region above a specified area 1302 which forms a defined zone of 1303 may vary based on the sensing capabilities of object sensor 1301 and its position within hood 714. Although the zone 1303 that is illustrated in FIG. 13 forms a rectangular base pyramid, the shape of the sensed zone 1303 by sensor 1301 may be of any shape including but not limited to: conical, cylindrical, sliced cylindrical, cubical, spherical, semi-spherical, or any other conceivable volumetric shape. (The fume hood sash 715 has been omitted from FIG. 13 so the sensor 1301 may be clearly illustrated.) Sensor 1301 may include any type of practical object detection including but not limited to: a LIDAR system, a CMOS based imaging system, a CCD based imaging system, an infrared based detection system, RADAR or millimeter wave based technologies, or an ultrasonic or light-based time of flight system. In the embodiment of 1300, the specified area 1302 includes any portion of the fume hood's 714 work surface 208. In a preferred embodiment, the specified area 1302 comprises but is not limited to the approximate interior width of the hood's 714 work surface 208 (approximately the width of sash 715), and further comprises but is not limited to an approximate depth 1305 of 6 to 10 inches behind the sash 715. Generally, embodiments include a defined zone 1303 that is a portion of the internal volume of the hood 714 having a sufficient zone depth 305, such as but not limited to 6 to 10 inches, behind the sash 715 to ensure stable airflow while also providing sufficient room in locations outside of 1303 to store equipment used within the hood. By limiting the size of the equipment free zone, even hoods which contain large amounts of equipment may safely benefit from fume hood minimum flow setback embodiments.

LIDAR is a form of optical time of flight system based on using a laser as a light source that is applied to perform a ranging or distance measurement function. LIDAR systems generally involve a laser light source at a fixed point whose light beam is often deflected using one or more mirrors which cause the light beam to be rotated around at least a vertical axis or rotated through a predetermined yaw or angular distance, while distance measurements are performed for each angular position of the laser based upon an established angular resolution. As the light beam travels to a point within the detection field and then travels back to the location of the laser, an optical detector that is also fixed detects the light and a time of flight measurement is performed to measure the distance to the remote point in the detection field. With LIDAR systems that are rotated around just one axis, ranging may be provided over a 2-dimentional plane or area that is swept by the laser. To achieve ranging through a 3-dimentional volume, the laser's pitch is varied in addition to its yaw. Up until recent years, LIDAR sensing technology has been extremely expensive and complicated to work with, due in part to the computational power required to process data from these systems, which may have to process tens of thousands of points of data every second, especially in vehicular applications where object detection must occur within a fraction of a second due to vehicle speed for life safety. Also, with vehicular LIDAR applications data must not only be processed but also saved to maintain a dynamic map known as a point cloud and this process can be memory and processor or GPU intensive. The time of flight technology used in LIDAR is an ultra-high speed electronics technology that determines how far a point on an object is from the optical light source based on the amount of time it takes for an optical return signal to be received compared to the speed of light. Over recent years the cost and complexity of such time of flight-based measurements has been reduced significantly, as much of the required electronics is now embedded within commercially available integrated circuits. Nevertheless, LIDAR systems continue to be complex to operate, due to CPU requirements and the software involved to integrate these systems. Embodiments of optical time of flight systems may also use light sources (such as light emitting diodes or LED's) other than lasers for ranging applications at reduced cost with the tradeoff being sensing resolution as compared to a laser-based approach. In one embodiment, an infrared LED light source is used as the light source for the optical time of flight system, serving as sensor 1301.

As has been discussed, one of the disadvantages of applying object detection as a method of reducing a hood's airflow (such as that described by Jacob) is that it can be a nuisance and a productivity issue to remove all experimental apparatus and other equipment after hood use, and in many cases it is not feasible to remove all equipment. For example, it is common to permanently store beaker stands and shelving within a fume hood and it is often not feasible, or it would be highly inconvenient to remove such equipment after use. Further, lab occupants are not focused on the operation of fume hood controls but on their research and the removal or positioning of hood equipment is not an understood priority and would usually go unaddressed. Nevertheless, many research institutions and other lab facilities are committed to energy conservation for both economic and social reasons and most lab occupants would embrace energy conservation measures if it does not negatively affect their work. Embodiments described herein provide visual guidance to the user of the fume hood which enables the user to optimize the placement of equipment outside of a defined zone to reduce a fume hood's energy use and improve safety through minimum flow setback. When minimum airflow rates are established for a fume hood an objective is to ensure that the fume hood will operate effectively at providing containment of compound vapors from spills and evaporation from containers such as but not limited to beakers and other vessels. The most critical area for a fume hood's operation is in locations just behind the hood's sash 715, where low airflow velocities can result in a loss of fume hood containment. As beakers and other containers are placed towards the back of a fume hood there is a lower likelihood that containment of vapors from the beakers within the hood 714 will be lost due to stagnation, eddy currents, or other airflow factors at the sash.

Figure 14:
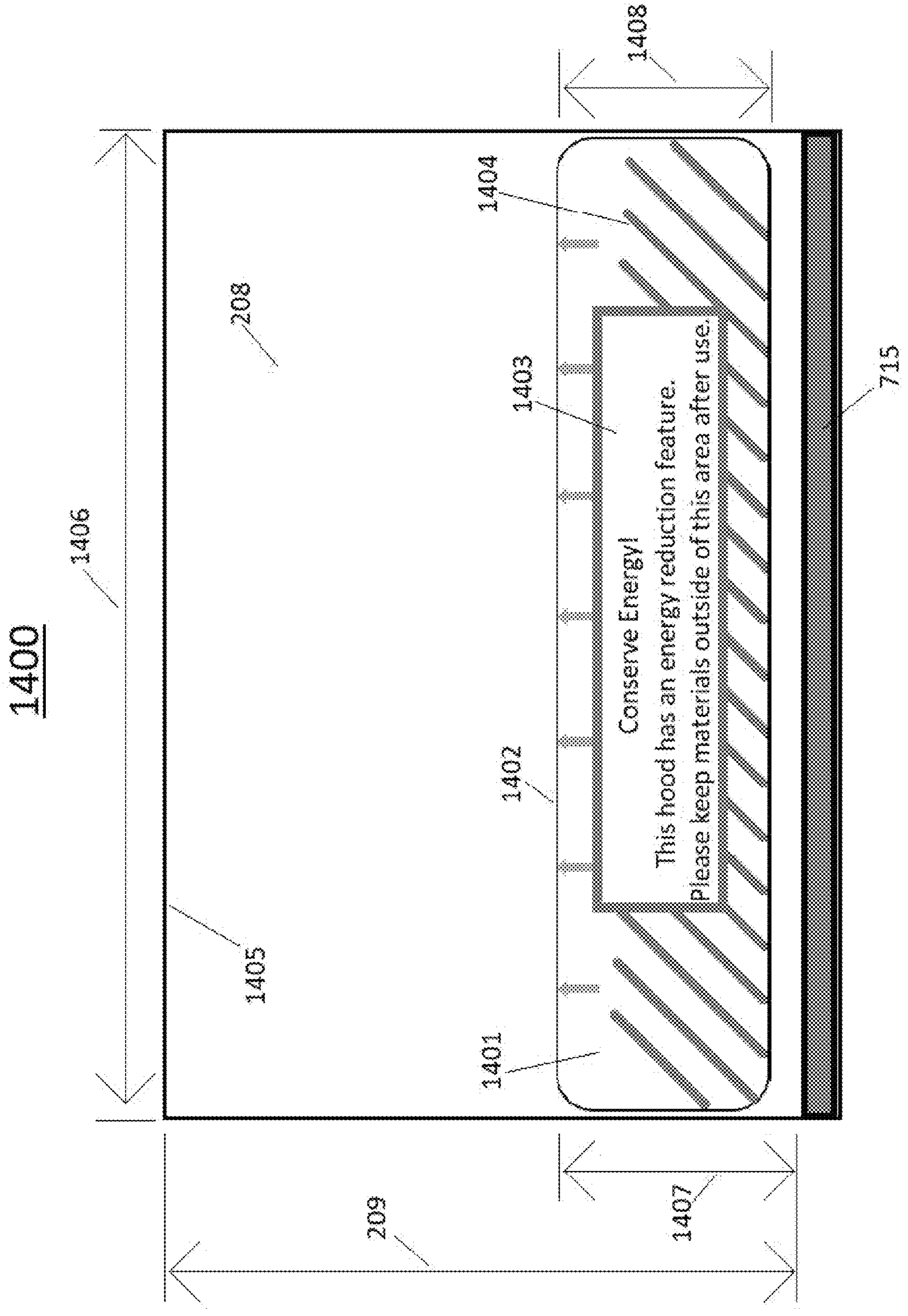
FIG. 14 illustrates a work surface of a hood on which motivational instructional signage is placed.

In embodiments, the contents of a hood 714 may be organized with the aid of visual signage to enable optimal energy performance using minimum flow setback when the hood is not in use. Although in many cases, the removal of all equipment from a hood may not be feasible, it is usually possible to organize a hood's work surface 208 so that equipment is placed towards the back of the hood and away from the hood's sash 715. However, this requires motivation by the user of the hood. FIG. 14 illustrates an embodiment which includes a hood's work surface 208 on which motivational instructional signage 1401 is placed which defines an area where users should not leave materials after using the fume hood. Embodiments combine active sensing of hood contaminants using a multipoint air sampling system 700 which is in communication with an object detection sensor 1301 that senses a defined zone of 1302 within the hood which is defined to the hood's user via instructional signage 1401 to enable hood flow reductions when the hood is not in use. In embodiments, the sensor 1301 may, with some practical tolerance, be calibrated to detect objects within a zone which is defined by the physical area of signage 1401, or that is formed by an edge of instructional signage; wherein the said practical tolerance is determined by the detection accuracy of the sensor 1301. In embodiments, the said practical tolerance may be, but is not limited to, ¾ inch measurement accuracy. The signage includes a message 1403 which can be any possible message which serves to instruct and motivate the user. In embodiments, the signage 1401 may have a depth 1408 that is any percentage of the depth 1407 from the sash 715 of the defined area that is to be void of equipment as one of the conditions 806 to enable minimum flow setback. The portion of the work surface 208 which is intended to be clear of equipment after the fume hood 714 has been used is based roughly on the dimensions of 1407 and the work surface width 1406. Therefore, instructional signage 1401 may be smaller than the intended portion of the work surface 208 that is intended to be clear of equipment after fume hood 714 use. In embodiments, the edge 1402 of instructional signage 1401 may form a demarcation line that separates the equipment free zone defined by 1401 and the rest of the work surface 208. Edge 1402 may form a straight line, or edge 1402 may be of any curved shape. In embodiments, the signage 1401 may be made of any practical material that is suitable for use in the fume hood 714 environment so that the material of 1401 will be robust against the chemicals used in the hood. For example, signage 1401 may be made from but is not limited to a vinyl material, printed paper that is laminated with plastic such as polyethylene or mylar, or signage 1401 may be made from printed plastic of any kind, including polyethylene, or a fluoropolymer such as Kynar®, or Teflon® as examples. In embodiments, the signage 1401 may be adhered to the work surface 208 using a suitable adhesive or, the signage 1401 may itself have an adhesive backing to it which allows it 1401 to be adhered to the work surface 208.

In embodiments, the instructional signage 1401 may be in the form of a chemically resistive mat, such as but not limited to a mat made of a suitable material which has signage, including text 1403, silkscreened on one side to form the top side of the mat. This mat, herein instructional mat, may be adhered to the surface 208 however, in some embodiments this would not be necessary if the mat is made of rubber or some similar material that tends to maintain a stationary position on most surfaces 208. In embodiments, the instructional mat may include one or more conductive coils embedded within the mat that forms a loop which envelopes a substantial portion of the mat's surface area to detect the presence of a tag which is placed on equipment such as the vessels or other equipment which hold the chemicals which are used within the hood in which the mat is placed. The one or more coils may serve as an inductive coil whose inductance changes when one or more of the vessels with the tags are placed within the area of the one or more coils which is substantially the area of the mat. The inductive change while in the presence of a tag serves as an indication of presence of equipment with the mat's area. In another embodiment employing an oscillator circuit, the one or more coils may serve as search coils which are electrically driven using some form of an electronic oscillator such as but not limited to a beat frequency oscillator which the oscillator and one or more coils are tuned to the condition where no objects with the tags are present within the area of the mat. In this search coil embodiment, any equipment having the tag that is place within the mats' area causes a detuning of the oscillator circuit which serves as an indicator that equipment is present with in the instructional mat's area and thus may be used as an indication of equipment status 806.

In embodiments, the tags which are placed on lab equipment such as the chemical vessels may include but are not limited to a metallic material. In an embodiment, the tags may include a metallic material which is chemically resistive, such as but not limited to brass, stainless steel alloys, and nickel alloys. In other embodiments, the tag may include a printed antenna or an RFID tag.

In embodiments, object detection sensor 1301 may include any form of imaging sensor. In one embodiment, sensor 1301 is a digital camera which is based upon a CMOS image sensor which incorporates a novel active lighting feature described further below. Over recent years, CMOS based cameras have become the technology of choice for many kinds of imaging systems because of their very good resolution, good performance in low light conditions, and relatively low power as compared to older CCD based cameras. Both CMOS and CCD based approaches operate within visible wavelengths and generally, imaging becomes unreliable in light levels which are lower than that which can be seen by the human eye. This means that, in order to utilize such CMOS or CCD approaches, lighting is required. However, in embodiments, it is not necessary to keep the fume hood 714 illuminated for the sake of applying sensor 1301 when it is a CMOS or CCD imaging sensor. In embodiments in which 1301 is a CCD or CMOS image sensor, 1301 includes an active lighting feature which incorporates a light which temporarily illuminates the defined zone 1302 within the hood 714, as defined by signage 1401 once the sash 715 is placed in a defined closed position wherein, during this temporary illumination the image sensor 1301 captures an image to determine if the defined zone 1302 is clear of equipment. This embodiment makes use of the fact that, once the sash 715 is closed, only one image needs to be taken of 1302 to verify that equipment is not present and that following the taking of the image, the illumination source within this embodiment of 1301 can be turned off. Using the approach of this embodiment enables the fume hood 714 to be light free after use, which saves energy both in terms of the energy associated with the illumination source and the sensor 1301. Further, this approach is advantageous with many labs which may require low light levels during long periods of time, as this may be a requirement with certain types of material dating and biology labs. Also, many labs which are involved with animal research must be dark for extended periods of time, especially in studies involving rodents.

Figure 15:
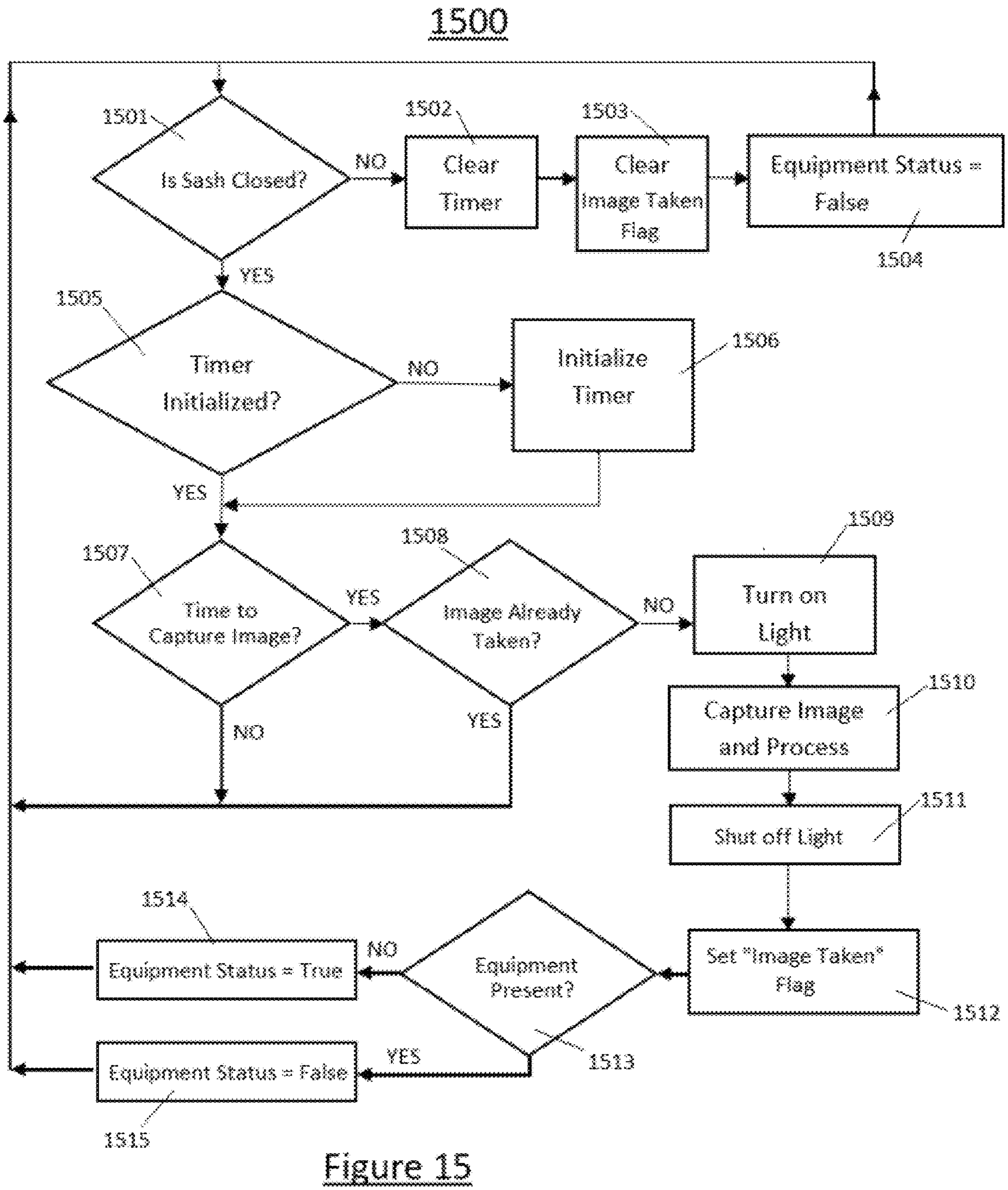
FIG. 15 illustrates logic for operating an imaging sensor.

FIG. 15 illustrates the logic for operating an imaging sensor with the active lighting feature of this disclosure (such as a CCD or CMOS sensor), as object detection sensor 1301. Logic 1500 illustrates a recurring loop that is performed in software partially by control logic 702 for each fume hood instance in system 700 which includes object detection. In addition, a portion of logic 1500 is performed by sensor 1301, as discussed below. For ease of understanding, the following description is of logic 1500 as it is applied to hood 714. At the beginning of this recurring loop, logic block 1501 evaluates if the hood's sash 715 is closed, based on the sash status 802. Because, in this embodiment, the purpose for object sensor 1301 is to provide enabling criterion 806, to support minimum flow setback, hood 714 object detection is only performed when the hood is closed. Therefore, in this embodiment, there is no value to activating the object detection sensor 1301 when the hood 714 is in an open state. If the sash 715 is closed, then logic 1505 evaluates whether a timer has been initialized which determines when an image shall be taken of the defined zone 1302 within the hood 714. If the timer of 1505 has not be initialized, then the logic 1500 progresses to logic element 1506, where the timer is initialized. The timer within logic 1506 is important, as it prevents images from being taken immediately, every time the sash 715 is closed, as doing so may become a nuisance to lab personnel, given that in embodiments a light on 1301 is turned on briefly each time an image is taken. As an embodiment, the timer value within 1506 is adjustable. In application this timer value 1506 may be set to any practical value. Typically, the timer value may be set but is not limited to a time value of between 1 and 10 minutes. Once the timer in logic 1506 is initialized, logic block 1507 determines if the timer has expired and, if it has, the logic 1500 branches to logic 1508 to verify if an image has been taken since the timer expired. If in 1507 the timer has not expired, then it is not time to take and image and the logic loops back to the start with logic 1501. If the timer has expired and an image has already been taken, then the logic 1500 loops back to the start 1501 as, in this embodiment, only one image is taken by sensor 1301 each time the sash 715 is closed. If the timer 1506 has expired and an image has not yet been taken, then the logic proceeds to logic 1509, which turns on a light associated with sensor 1301 to illuminate the defined zone 1302 within the hood 714. As an alternate embodiment, sensor 1301 incorporates a method (such as but not limited to a photocell) of measuring ambient light to evaluate if the light of logic 1509 is required. Following logic 1509, an image of region 1302 is captured by sensor 1301 via logic 1510, following which the light associated with sensor 1301 is turned off via 1511. FIG. 7 illustrates a hood object detector 722, which includes any possible object detectors including embodiments of sensor 1301 that is mounted within fume hood 714. In embodiments, logic 1509, 1510, and 1511 are performed by sensor 1301, following a command that is sent from control logic 702 over connection 721. Connection 721 may also serve as the connection over which logic 702 reads a signal indicative of object presence from all object sensor embodiments 722, including sensor 1301. Once the image has been taken via 1510 a flag ("image taken flag") is set within logic 702 to indicate that an image of region 1302 has been taken and the result is used to set equipment status 806 true or false, wherein a "true" indicates that objects are not present and a "false" is indicative that objects are present. This true or false state is indicated in logic blocks 1514 and 1515, respectively. At the beginning of logic 1500, if it is determined that the sash is open on hood 714 via logic 1501, then the timer associated with 1506 is cleared via 1502 and will remain cleared until at some point the sash 715 is again closed, wherein the timer is again initialized by 1506. While the sash 715, the "image taken" flag is kept cleared via 1503 and the equipment status 806 is maintained as false, via 1504.

In embodiments, including the application of any embodiment of object detection sensor used within hood 714, logic 702 may be used to provide a method of determining and communicating a setback performance condition. In one embodiment of determining and communicating a setback performance condition, logic 702 provides an energy waste indication which may be displayed locally at the fume hood 714. The energy waste indication relates to a condition at the hood 714, wherein following the condition where the fume hood sash 715 has been closed, equipment status 806 resolves to false. This condition where 806 resolves to false is the result of objects being detected within the region 1302 or that region defined by instructional signage 1401. This includes embodiments of sensor 1301, embodiments of an instructional mat having search coils, or any other method of providing object detection within a designated region within hood 714. The objective of the energy waste indication is to provide a reminder to lab occupants that equipment is improperly positioned within the fume hood 714 which will prevent minimum flow setback from being enabled within logic 800A. The energy waste indicator may be displayed by monitor 706 based on communication between 702 and hood controls 617 via connection 618, or indirectly by communicating through the BAS 705 which is in communication with the hood controls 617 which is connected to hood monitor 706. In another embodiment, object detector 722 or embodiments of sensor 1301 may incorporate a local display or indicator to signify energy waste including but not limited to: any type of character display, an LED, or a wireless connection such as to a mobile device. The local display may be physically connected to the object sensor 722 or 1301, or the local display may be separate from the sensor 722, 1301 and mounted locally on the fume hood 714 or in a location near 714. In this embodiment where an energy waste indication is provided through the sensor 722, 1301 the energy waste condition may be determined by control logic 702 and communicated via connection 721 to the object detection sensor 722, 711. In other embodiments, the energy waste indicator may include any form of local audible alarm which may announce when an energy waste condition is detected.

Figure 16:
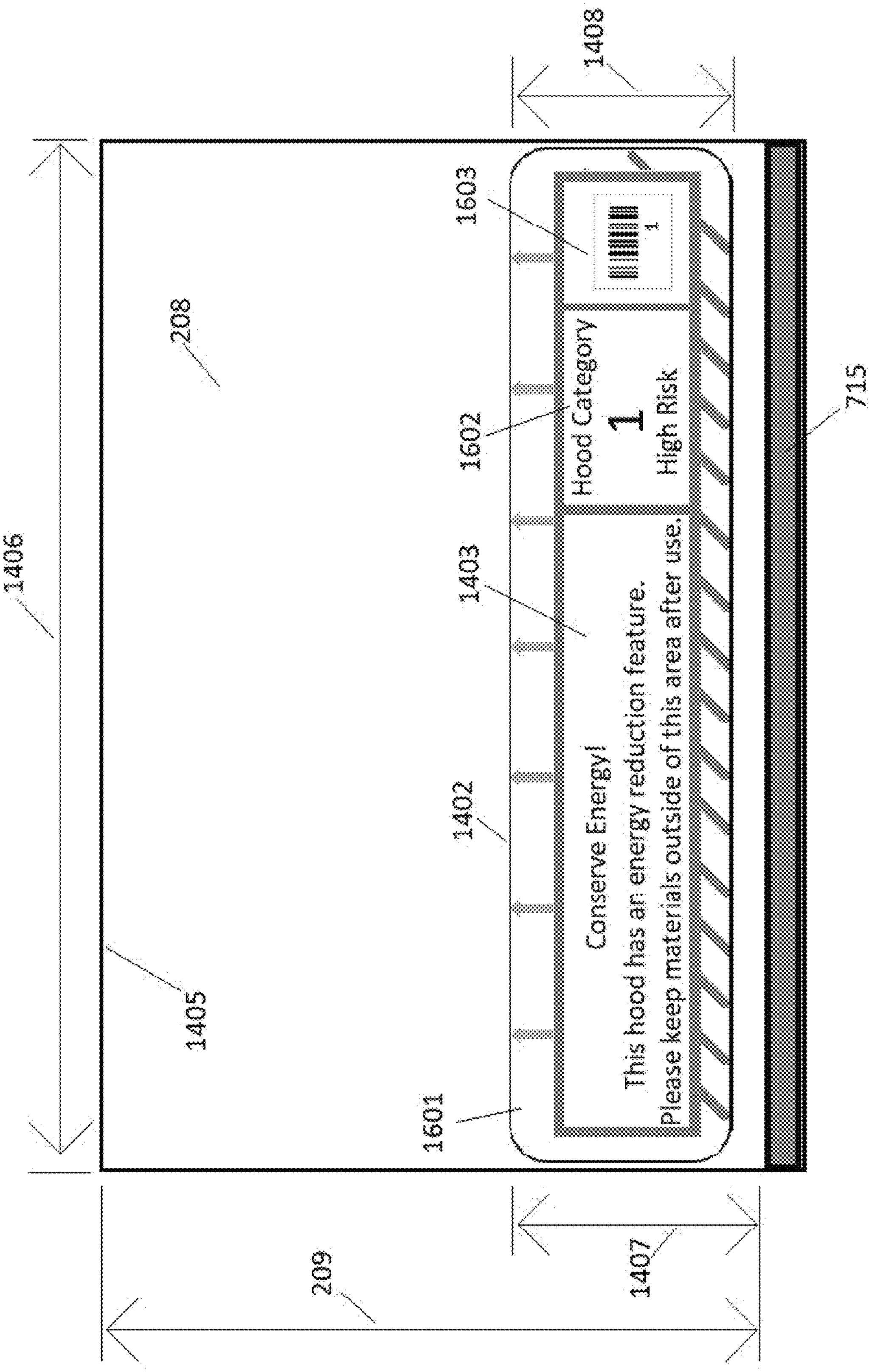
FIG. 16 illustrates an example of instructional signage.
Figure 17:
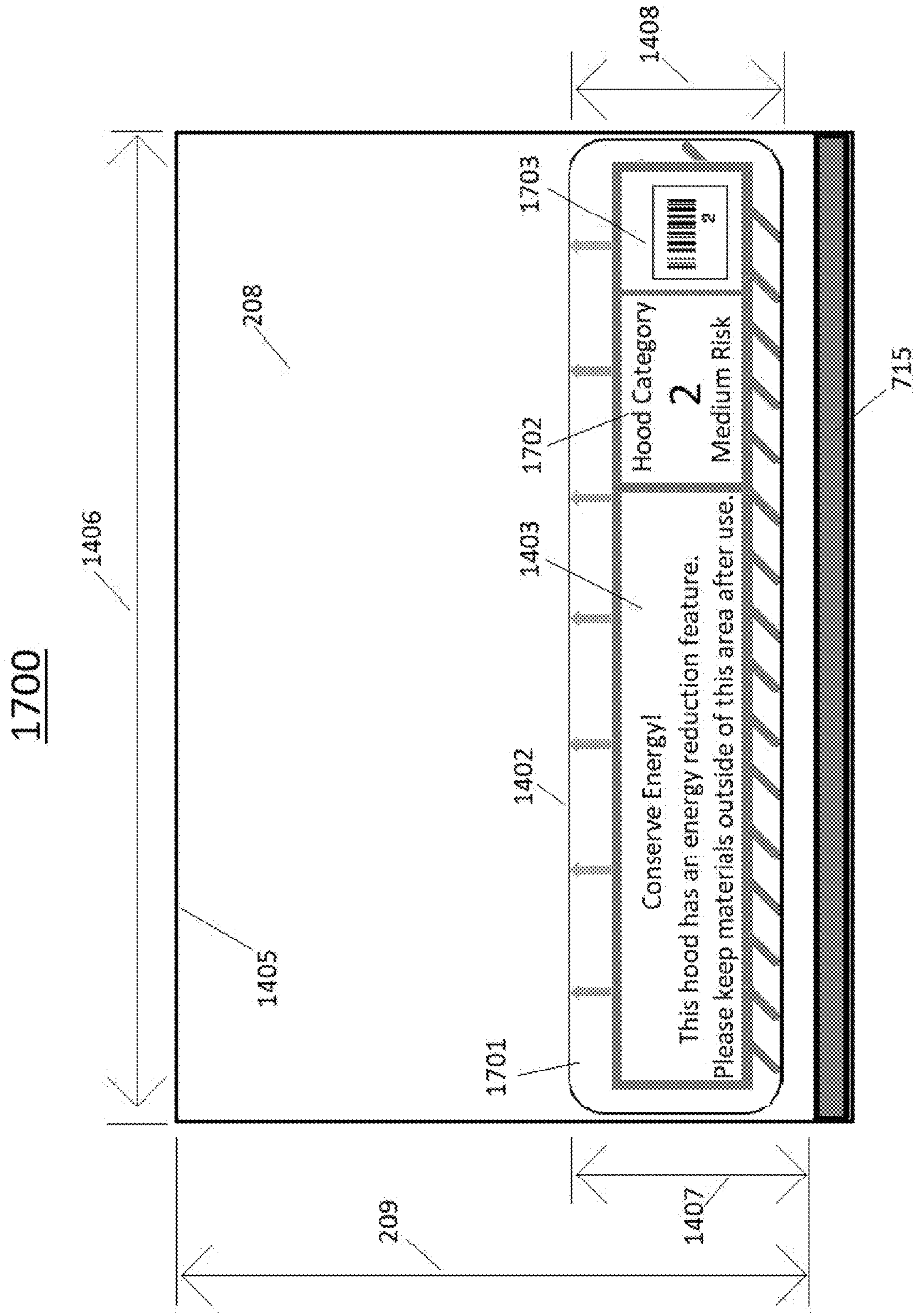
FIG. 17 illustrates another example of instructional signage.

In labs, specific fume hoods may be designated, either on a permanent or temporary basis, based upon a risk assessment of the toxicity or odor levels of compounds intended for use in the hood, as well as other physical properties of these compounds. In some cases, research or other work performed over a defined period of weeks or months may require a hood that is designated for use with higher risk compounds. These higher risk compounds may be ones which are highly toxic or odiferous. In embodiments, it may be desirable to disable minimum flow setback or to reduce a hood's minimum flows by a lessor amount when minimum flow setback is enabled, while the hood is designated for use with higher risk compounds. This treatment of the hood which has been designated for use with higher risk compounds may provide an added level of safety by operating the hood at higher airflow levels which can provide better minimum flow of contaminants and better hood containment. There may be many fume hoods in a lab room so, it is also desirable to clearly indicate to lab personnel which fume hoods have been designated for the use with the higher risk compounds. This is particularly important in labs which have multiple hoods with different designations. In embodiments, instructional signage 1401 incorporates elements which signify the fume hood's designation to both lab personnel and the hood's object detector 722, whereby the object detector 722 may influence the minimum airflow value that the hood is set to when minimum flow setback is enabled, based on the designation of the hood. In one embodiment, the method of indicating the fume hood's designation to lab personnel and object detector 722 may include a visible badge that is incorporated within instructive signage 1401, wherein the object detector 722 is a sensor 1301 that is an image sensor capable of reading one or more elements of the badge or a machine-readable element which relates to the hood's designation that is also conveyed by the badge. In an embodiment, the image sensor used to read one or more elements of the badge or a related machine-readable element of the badge, is a CMOS image sensor. FIGS. 16 and 17 illustrate two examples of instructional signage 1601 and 1701 which are implementations of signage embodiments incorporating the badge and a related machine-readable element. Instructional signage 1601 and 1701 each incorporates a badge 1602 and 1702, respectively, which each clearly display the hood's designation to lab personnel. In the example 1600 the designation is "Hood Category 1", which is described as "High Risk". In the example 1700 the designation is "Hood Category 2", which in this example is described as "Medium Risk". It should be clear that the examples of 1602 and 1702 are just examples and that scope of this embodiment include any suitable designation method. In one embodiment, the badge 1602, 1702 is readable by both lab occupants and the sensor 1301 which sensor 1301 supports image recognition or image processing capabilities to identify the hood's designation or, in the examples of 1602 and 1702 Hood Category. In an alternate embodiment the badge 1602, 1702 is readable by lab occupants and the instructional signage 1601, 1701 includes a separate machine-readable element 1603, 1703. Element 1603, 1703 may be any coded or non-coded identifier element, such as but not limited to barcode, Quick Response (QR) code, MaxiCode, Aztec code or any other scannable image. In an embodiment, element 1603, 1703 is a barcode. In embodiments, image sensor 1301 determines the hood's designation either by reading badge 1602, 1702 or by reading machine-readable element 1603, 1703.

Also, in embodiments, a hood's designation as indicated by badge 1602, 1702 and machine-readable element 1603, 1703 is not limited to a risk related designation. In one embodiment the designation signified by the badge 1602, 1702 and machine-readable element 1603, 1703 may be based upon a chemical characteristic of the one or more compounds intended for use in the hood. For example, tert-Butylthiol is a compound that is commonly used as an odorant for natural gas that requires caution when using any quantities in a lab setting, due to its extremely low odor threshold and not because of its toxicity. In an embodiment, a hood may be designated for use with odiferous compounds where, for example, the badge 1602, 1603 may display text such as "Odiferous Compounds". In embodiments, it may be valuable to designate a hood based on a physical property of odor (such as the aforementioned) to delineate hoods in which there is an odor risk versus a toxic risk for example. In other embodiments, it may be valuable to designate a hood based on other properties of chemicals which may be used in the hood such as but not limited to designations for acids, bases, volatile organic compounds, and other compound classifications including but not limited to physical properties of state. As an example of a designation based upon a physical property of state, in an embodiment, a hood may be designated for use with gases, which generally may be higher risk compounds.

In one embodiment, sensor 1301 determines the designation of the hood 714 to establish if minimum flow setback shall be disabled for the hood. As an example of this embodiment, when the instructional signage 1601 is applied to fume hood 714, the hood category of "1", which in this example signifies a hood with high risk, may be used by sensor 1301 to disable minimum flow setback (because this is a high-risk hood). In this example, the hood 714 may only temporarily be designated as a hood with code "1" or "high risk" for a limited period of time, perhaps a duration of a few weeks or months based on the needs of a project. Following this temporary hood designation as high risk, the lab manager (for example) may then reassign the hood 714's designation to "2" or "medium risk" by changing out the instructional signage 1601 to that of 1701, in which case the sensor 1301 will then recognize the fume hood 714 as the new designation of "2" to enable minimum flow setback when the area of the fume hood defined by 1701 is clear of equipment. In this embodiment, when sensor 1301 determines that minimum flow setback shall be disabled, it 1301 may do so by asserting to control logic 702 that equipment is present within the area defined by 1601, regardless of whether that is representative of the actual condition or not. This will cause equipment status 806 to be set to false, which in turn will prevent that hood 714 from being placed into minimum flow setback.

In another embodiment, the designation of the hood 714, as determined by sensor 1301 determines a selection of fume hood minimum airflow values which, for hood 714, are pre-programmed values which are dependent on the hood designation, signified by the signage 1601 or 1701 for example. In embodiments, the pre-programmed values may be values which are stored within sensor 1301 for hood 714, or they may be pre-programmed values which are stored within control logic 702 for hood 714. In embodiments, sensor 1301 (more generally described as sensor 722) may convey object presence and the fume hood minimum airflow value for hood 714 to logic 702 through communication 721. In another embodiment, sensor 1301 may convey object presence and the fume hood designation to logic 702.

In embodiments, any number of hood designations or hood categories may be supported and not just the two categories of "High Risk" and "Medium Risk" as shown in the examples of FIGS. 16 and 17. The methods of these embodiments provide a convenient way to reliably manage minimum airflow rates of hoods based on risk categories which are visible to lab occupants using an intuitive badging system such as 1602 and 1603 that is coupled to the control logic 702. In an example, to change the designation of a hood from "High Risk" to "Medium Risk", in embodiments the instructional signage 1601 with badge 1602 and machine-readable element 1603 may be changed to instructional signage 1701 with badge 1702 and machine-readable element 1703. In another embodiment badge 1602, 1702 and machine-readable element 1603, 1703 are removable for signage 1601, 1701, therefore enabling the hood 714 to be re-designated simply by applying new badges 1602, 1702 and machine-readable elements 1603, 1703.

Accidental exposure of lab occupants to contaminants often occurs due to limitations between the actual configuration of hoods and what lab occupants intend to use the hoods for. The teachings of embodiments described herein may result in significant reductions in accidental exposure cases while ensuring improved energy efficiency by lowering average fume hood minimum airflows through minimum flow setback.

Applying minimum flow setback to fume hoods in a lab space, according to the teachings of the embodiments described herein, requires special considerations for the layout of the multipoint air sampling system given the number of fume hoods that may be found in labs. In some labs, there may be only one fume hood. In others, there may be a dozen or more fume hoods, and therefore a dozen or more exhaust ducts 712 or 711 that the multipoint air sampling system may have to connect to. In labs which have a very high hood density, the ceilings above each hood can be very congested with controls wiring, ductwork, and other HVAC equipment such as exhaust control devices 710, and this can present challenges when interfacing hood controls 617 to a multipoint air sampling system. Also, the integrity of the multipoint air sampling system is crucial to safety at each fume hood. For example, in system 700 if tubing 602A is compromised in that there is a cut or leak in tubing 602A, then a portion of the air samples drawn through 602A from fume hood duct 712 will be diluted by the air from the environment which surrounds 602A. In most cases the tubing, such as 602A, is routed through the ceiling of the lab room in which the hoods 714 are housed. Such minimum flow of air samples from the exhaust 712 may result in unreliable readings by sensors 612, including contaminant readings which are lower than the actual contaminant concentrations within exhaust duct 712. If the minimum flow is significant enough it may result in hood 714 being placed into minimum flow setback even though dangerous contaminant levels may be present within the hood 714, potentially creating a hazardous condition for lab occupants.

Figure 18:
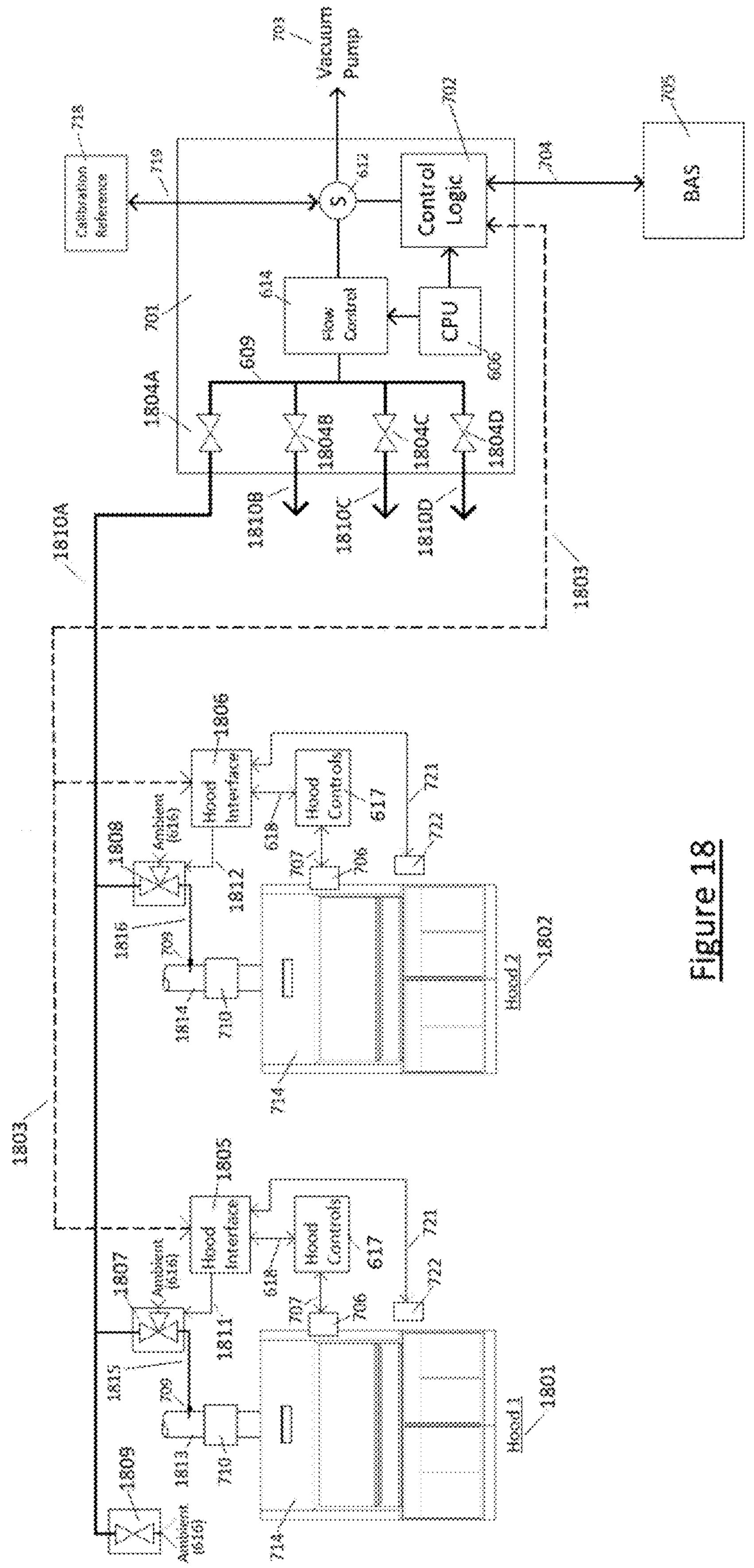
FIG. 18 illustrates a multipoint air sampling system used to provide fume hood minimum flow setback.

FIG. 18 illustrates an embodiment of a multipoint air sampling system that is applied to hoods in a lab environment to implement minimum flow setback. Illustrated in 1800 is a distributed configuration multipoint air sampling system, however, as has been described, embodiments apply to star-configured multipoint air sampling systems as well. Illustrated in 1800 is a method of providing periodic verification of the integrity of the air sampling path between a duct probe 709 and the sensors 612 of the multipoint air sampling system. The system 1800 illustrates a multipoint air sampling system which monitors two hoods 1801 and 1802 however, it should be clear that the system is not limited to monitoring only two hoods. In application, the system 1800 may be extended to monitor any number of hoods, but typically may monitor up to 24 hoods depending on the configuration of backbone 609. As compared to system 700, in system 1800 the zone valves 604 have been replaced with branch valves 1804 with the zone valves 1807 and 1808 located no more than a short distance from each fume hood exhaust probe 709. Note that in 1800, although only four branch valves are shown 1804A, 1804B, 1804C, 1804D, embodiments may involve any number of branch valves 1804. The connection between each valve 1807, 1808 and duct probes 709 may be via tubing 1815, 1816. The short distance between zone valves 1807 and 1808 and duct probes 709 on ducts 1813 and 1814 may be less than 5 feet; however, embodiments strive to minimize the distance of tubing 1815, 1816. In an embodiment, zone valves 1807 and 1808 are mounted directly to duct probes 709, thus eliminating tubing 1815, 1816. Minimizing or eliminating the distance between the zone valves and their respective duct probes 709 reduces the probability that leaks will develop (which may not be detectable) within the tubing 1815, 1816 between each due to damage that can arise relating to service and other activities that may occur in the ceiling above each hood over time. Also, the distance between the duct probes 709 and the zone valves 1807, 1808 is the most vulnerable segment of the system 1800 since it cannot be tested for leaks in an automated fashion on an ongoing basis. Valve 1809 is a two-way valve that, when closed, prevents fluid communication between ambient 616 and tubing 1810A. Each tubing 1810 forms a branch from backbone 609 and, therefore, tubing 1800 may be referred to as a branch herein. For example, tubing 1810A may be referred to as branch 1810A, herein. Valve 1809 (herein branch flushing valve or, interchangeably, flushing valve) is used to provide a flushing function that is described further below. Zone valves 1807 and 1808 are three-way valves in which their common ports are connected to tubing 1815, 1816 respectively or their common ports connect directly to duct probe 709. That means that, in one mode of 1807, 1808 when fluid communication is blocked between tubing 1810A and probes 709, fluid communication exits between ambient 616 and probes 709. Conversely, when valves 1807, 1808 are switched so that fluid communication exists between 1810A and 709, then fluid communication is interrupted between ambient 616 and 709. As an embodiment, zone valves 1807 and 1808, are placed at locations substantially adjacent to duct probes 709, to enable a method of performing a vacuum decay test by the multipoint air sampling system on the tubing 1810A to verify that no significant leaks are present in tubing 1810A which, with this approach tests the considerable majority of the distance between the duct probe 709 and sensors 612.

One aspect of the embodiment 1800 is that the multipoint air sampling system incorporates a hood interface module 1805 and 1806, that is applied to each fume hood 1801 and 1802 and which communicates with control logic 702 over network 1803. In embodiments, hood interface modules such as 1805 and 1806 are electronic modules which incorporate a printed circuit board (PCB) and some form of a CPU, such as but not limited to a microcontroller. Network 1803 may be any suitable network for data communications. In an embodiment, network 1803 is an RS485 network. The hood interface module 1805, 1806, also provides communication between control logic 702 and hood controls 617 as well as object detector 722 through connections 618 and 721, respectively. Each hood interface module 1805, 1806 additionally provides a connection to a zone valve 1807, 1808 through connection 1811, 1812 to control the state of 1807, 1808 based on commands from the multipoint air sampling system logic 702 over network 1803. In addition, a hood interface module may be used to control the state of flushing valve 1809, also based on commands from logic 702 over network 1803. In embodiments, a zone valve such as 1807 may be packaged within a common enclosure with the hood interface module 1805. In an embodiments one flushing valve 1809 may be provided for each tubing branch 1810. For example, in embodiments, a single flushing valve 1809 may be applied to branch 1810A, while a separate flushing valve may be applied to branch 1810B, and so on. In an additional embodiment, a zone valve such as 1807 along with a flushing valve 1809 may be packaged within a common enclosure with the hood interface module 1805.

In the art, a vacuum decay test performed on tubing involves a first step of blocking of any tubing inlets and then a second step of drawing of a vacuum on the tubing, following which involves a third step of sealing the tubing at the end of the tubing where the vacuum source is attached. The vacuum level or absolute pressure (herein pressure) within the tubing may then be measured as a fourth step at the time of the third step where the tubing was sealed. After some time period, usually of a few seconds to tens of seconds, the vacuum decay test then, as a fifth step, involves a measurement of the tubing pressure once again. As a sixth step, a comparison can then be made between the pressure measured in the tubing at the time in which the tubing was first sealed in step four and the pressure measured sometime later in step five to obtain an indication of how well sealed the tubing is. If there is a significant change in the tubing's pressure over a short period of time, then that may be indicative that significant leaks are present within the tubing. In the following embodiment of a vacuum decay test, it should be clear that the state of valves 1807, 1808, and 1809 are controlled by logic 702, which communicates to hood interface modules 1805, 1806. As an embodiment, a vacuum decay test on the tubing 1810A of system 1800 involves a first step of closing valves 1807 and 1808 so that there is no fluid communication between the interior of tubing 1810A and probes 709 and the first step also involves closing valve 1809 so that no fluid communication exists between 1810A and ambient 617. The vacuum decay test of this embodiment then follows with a second step of opening branch valve 1804A (while closing other valves 1804B, 1804C, and 1804D), so there is fluid communication between the interior of 1810A and backbone 609, which is also in fluid communication with flow control 614 wherein, flow control 614 draws a vacuum on tubing 1810A and then, as a third step, seals the combined fluid systems of 1810A, 1804A and 609 using a valve that's internal to 614. The vacuum decay test of this embodiment then follows with a fourth step of measuring the pressure within the combined fluid systems of 1810A, 1804A and 609, using a pressure sensor held within flow control 614, and the pressure measurement is recorded within control logic 702 or CPU 606. The vacuum decay test of this embodiment then follows with a fifth step of again measuring the pressure within the combined fluid systems of 1810A, 1804A and 609 some period of seconds or tens of seconds after the fourth step and recording the pressure measurement within control logic 702 or CPU 606. As a sixth step, the vacuum decay test of this embodiment then performs a comparison of the differences between the pressure measured in steps four and five to determine the presence of leaks in 1810A, from which a PASS or FAIL rating may be provided for that branch 1810A. As an embodiment, the vacuum decay test described above may be performed on a periodic basis. For example, the vacuum decay test may be performed every few hours, daily, or every few days based upon a programed schedule within 702. As an embodiment, the outcome of the vacuum decay test may contribute to the sensor status 804 where, for example if the vacuum decay test fails the sensor status 804 may be set to false which, based on the logic of 1200, disables minimum flow setback for all fume hoods 1801, 1802 on that branch 1810A. Note that the vacuum decay test of this embodiment not only verifies the integrity of tubing 1810A, but it also verifies that the valves 1807, 1808, 1809 are functioning as expected as, during the vacuum decay test, if any of these valves 1807, 1808, 1809 fail to close then the vacuum decay test will fail.

One of the benefits of the hood interface module 1805 is that it provides a convenient way to make the potentially numerous discrete connections between the hood controls 617, object detection sensor 722 and the multipoint air sampling system. This convenience is especially important where, in many cases, the information needed from the fume hood equipment 617, 722 is most easily made available only as analog or binary signals. For example, in many cases sash position, hood occupancy and alarm conditions will only be available at the fume hood 714 in the form of discrete analog or binary signals, and each of which requires a separate physical connection of a wire in order to read this information. Performing such connections within a lab having a high hood density would be problematic if, instead of distributed hood interface modules 1805, 1806 all these points had to be wired to one common central panel. In embodiments, hood interface module 1805, 1806 may also be used to convey outputs to the hood controls 617, such as a binary signal representing a command 808 to enable hood 714 to be placed into minimum flow setback. In another embodiment hood interface module 1805, 1806 may be used to provide a variable signal, such as but not limited to an analog voltage which is proportional command to the hood controls 617 from logic 702 of the minimum airflow value such as signal 1002 that the hood is to operate at based on the embodiments described herein.

In one embodiment, connection 721 between object detection sensor 722 and hood interface module 1805, 1806 is a digital network, such as but not limited to an RS485 network. This embodiment incorporating a digital network is particularly important to those embodiments in which object detection sensor 722, 1301 must not only convey object presence but also the designation of the fume hood 714 or the minimum flow associated with a fume hood's 714 designation. In another embodiment, object detection sensor 722 communicates directly over network 1803 to control logic 702.

In embodiments of 1800, flushing valve 1809 plays an important role in the zone-based sensor protection sequence that takes place when contaminant levels from hood 714 which are sensed via sensors 612 exceed a predetermined action level. In other embodiments, such as the star configured system of 600, a flushing function is provided by a zone valve such as 604A to tubing 602A, when the fluid communication between 602A and backbone 609 is interrupted, as fluid communication is established through 604A between ambient 616 and 602A in which air flows from 616 through 604A, through tubing 602A to the negative pressure of the exhaust of the zone 603A. This flushing action is important as it eliminates adsorbed compounds from the tubing 602A. In embodiments of the system of 1800, when contaminants are detected from a hood 714 which exceed a predetermined action level, the control logic 702 closes all zone valves 1807, 1808, and then opens flushing valve 1809 which, under the vacuum 703 of the multipoint air sampling system, air is pulled from ambient, through valve 1809, through the length of tubing 1810A and then through to vacuum pump 703. This flushing action involving valve 1809 may be for any practical period of time, from several seconds to many minutes. In an embodiment, this flushing action involving valve 1809 shall be for 30 seconds. Note that in embodiments, an added bypass valve may be provided within flow control 614, to allow the flushing action for tubing 1810A to occur in a manner that is simultaneous to sampling activities performed on the other branches 1810B, 1810C, 1810D. Note that once the branch 1810A has been flushed using flushing valve 1809, the system 1800 may continue to take samples from other hoods while the zone from which excessive contaminant levels was detected is temporarily removed from the sampling sequence using the zone-based isolation methods of embodiments described herein. When a zone valve, such as 1807 or 1808 is disconnected from branch 1810A so that any fluid communication between 1810A and probe 709 is interrupted, air will flow from a port on the zone valve 1807, 1808 through tubing 1815, 1816 (if the tubing is used), through probe 709 and into the negatively pressurized exhaust ducts 1813, 1814. This provides a flushing action that removes any adsorbed compounds from tubing 1815, 1816 and probe 709 so that when air sampling resumes for this node, the air samples will not be contaminated by absorbed compounds.

As embodiments, tubing 602 and 1810 for systems 600, 700, and 1800 may be made from a number of materials which are suitable for this purpose, including but not limited to: high density polyethylene (HDPE), Kynar®, and a number of fluoropolymers including Polytetrafluoroethylene (PTFE) and Polyvinylidene fluoride (PVDF). As an alternate embodiment, tubing 602, 1810 may be made from stainless steel, such as 308 or 316 stainless tubing. Stainless steel may be an appropriate choice of tubing in some cases since, even though it is expensive, it will perform better than even the lowest adsorbing plastics, such as PTFE. Especially in labs with high hood densities, overall tubing lengths of 602, 1819 may be relatively short making the use of stainless steel feasible. As an embodiment, the tubing is made from Kynar®, has an inner diameter of ⅛ of an inch and an outer diameter of ¼ inch.

In the art, thousands of different compounds may be used in hoods within a lab facility. This makes the flexibility of the shared sensor 612 approach of the embodiments advantageous for supporting the varying needs of chemical detection for minimum flow setback. For example, in some embodiments sensor 612 may only be a PID sensor as a PID may detect most of the compounds typically used in many types of labs. However, there are some compounds which cannot be detected by a PID, such as some acid vapors for example, in which case, in embodiments involving the use of acids within a fume hood 714, the sensor 612 may also incorporate one or more acid sensors, such as but not limited to electrochemical-based acids sensors for the specific acids to be detected. In embodiments sensor 612 may include any type of sensor, including but not limited to: any type of PID sensor having a lamp of any ionization energy, acid sensor, electrochemical sensor, metal oxide semiconductor sensor (MOS), particle detector, humidity sensor, photoacoustic sensor (PAS), any of various non-dispersive infrared (NDIR) sensors, flame ionization spectrometer (FIS), pulsed ionization spectrometer (PIS), and ion mobility spectrometer. As those experienced with chemical sensor technology will recognize, the application of such a range of chemical sensing technology to monitor hood contaminants would not be possible without the unique attributes of the disclosed embodiments.

In some labs, elevated contaminant levels may exist either periodically or on an ongoing basis within the breathing environment that is outside of a fume hood 714. In some cases these elevated contaminant levels outside of hood 714 may reach sufficient levels that the contaminant levels influence contaminant levels seen by sensors 612 whereby, even if no contaminants are released within fume hood 714 the contaminant status 801 of the fume hood will remain false, and the fume hood's minimum flows will not be set back via minimum flow setback. This effect of lab room contaminants interfering with accurate measurements of hood 714 born contaminants occurs because the lab air is substantially the air source flowing into the hood.

U.S. application Ser. No. 11/372,573 entitled "Dynamic Control of Dilution Ventilation in One-Pass, Critical Environments", which is incorporated herein by reference, describes a dilution ventilation control system for critical environments which environments are described as lab environments and vivarium environments. In the foregoing, exhaust devices such as fume hoods are described as special exhaust devices, which contrasts with general exhaust devices. In the art, general exhaust (which is usually manifolded with other exhausts leading to a common exhaust fan) usually connect directly to a lab room to maintain room pressurization. As labs are usually substantially free of contaminants, so too is the general exhaust which exhausts air from the lab space. The exception to this is when contaminant levels exist within the lab space. In U.S. application Ser. No. 11/372,573 a multipoint air sampling system is used to control ventilation levels in the lab based on the difference between contaminant levels in the lab and contaminant levels which are supplied to the lab via the lab supply air duct. The foregoing approach prevents labs from being over-ventilated due to contaminants which do not originate within the lab.

As an embodiment, a multipoint air sampling system is used to determine contaminant status 801 of hood 714 in a lab space based on the combination of a first contaminant measurement from the exhaust location 710, 711, or 712 of hood 714 subtracted from a second contaminant measurement of the breathing zone air within the room in which hood 714 resides. In one embodiment, the second contaminant measurement is accomplished using air measurements from the general exhaust of the lab space. The method of this embodiment provides a way to reject the influence that lab contaminants may have on the accuracy of contaminant measurements from a hood 714, thus improving the portion of time that the hood 714 minimum airflow may be reduced using minimum flow setback.

Figure 19:
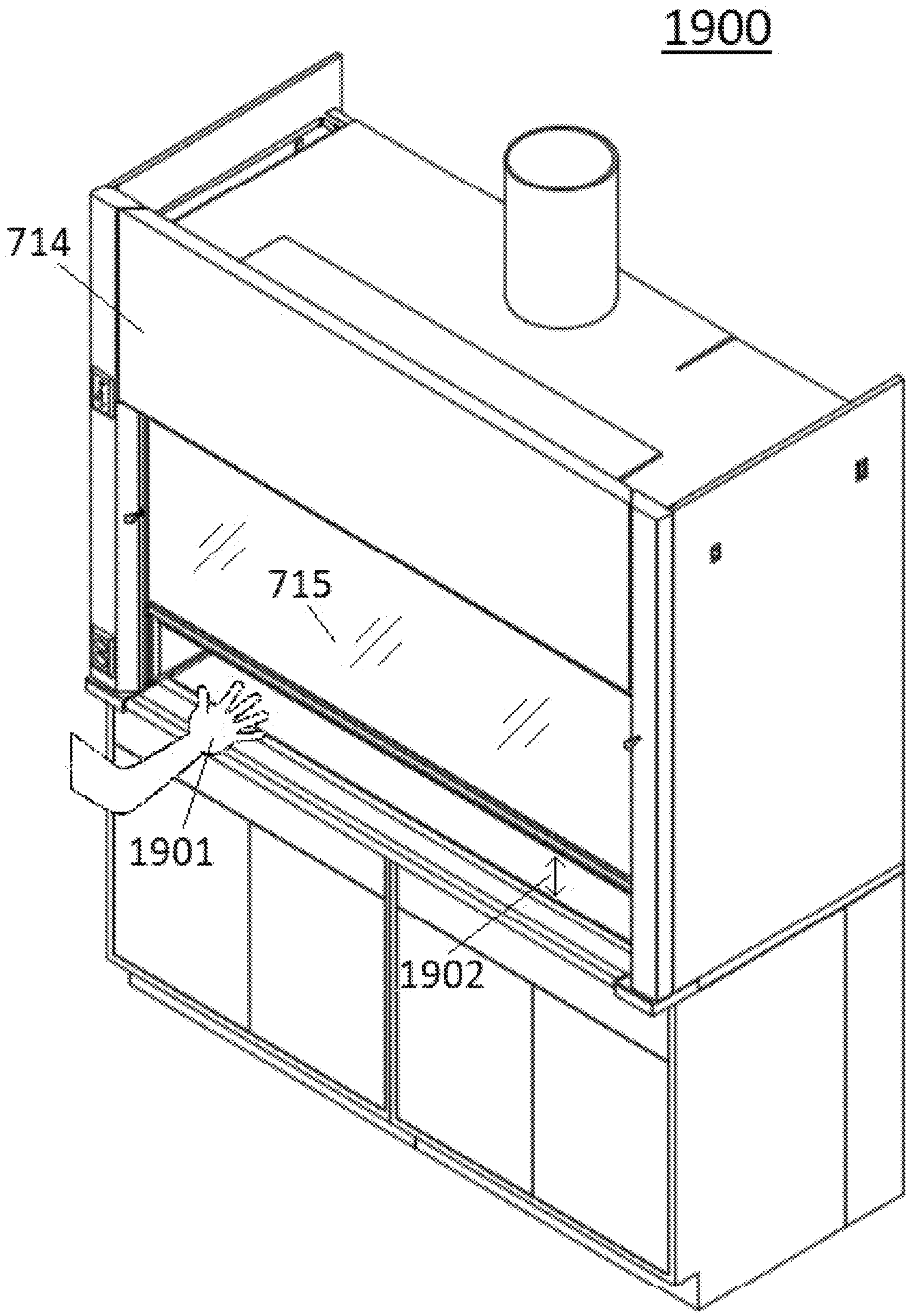
FIG. 19 illustrates a fume hood that is being accessed by a lab occupant, while the hood's sash is in a position that exemplifies a closed hood.

In the described methods of providing minimum flow setback to a fume hood, it may be possible under certain circumstances for a hood 714 to be temporarily accessed while remaining in a state of minimum flow setback. This may be possible for example under circumstances where the occupancy criterion 803 has been temporarily disabled because of a phased setback embodiment of 900B, or it may result due to limitations in the chosen occupancy detection method 803. For example, one embodiment of occupancy detection method 803 includes a time schedule and not an actual occupancy sensor. If an occupant were to approach hood 714 after hours in an implementation with a time schedule, the logic of 803 will reflect an unoccupied condition. As illustrated by FIG. 19, access to a fume hood 714 may not be detected when occupancy 803 has been disabled because the sash 715 may be open by a finite amount 1902 that is less than the setback sash threshold, thus resulting in a sash status 802 of "true" which signifies that the hood 714 is closed. Further, the sash opening 1902 may be large enough for lab personnel to place a hand or portion of an arm 1901 inside the hood. For example, the hood 714 may be considered closed even though the sash is open by several inches within the constant volume range of the hood, thus permitting access. The condition may be more pronounced if the setback sash threshold is greater than the variable air volume sash threshold, as described in embodiments; resulting in a sash opening 1902 that may, for example, be more than 6 inches and could easily be 8 to 10 inches open or more. Even an opening 1902 of 6 inches is large enough to easily permit access by an occupant's arm or hand 1901 to areas within 714. Further, if the sash 715 comprises horizontal moving sashes instead of the vertically moving sash shown, the opening 1902 of a sash 715 may be much larger than for example 6 inches within the hood's 714 constant volume range, thus permitting even greater hood access while the hood 714 is deemed to be closed via sash status 802. The scenario illustrated by 1900 could be problematic if, in the process of accessing the hood 714, the occupant's hand or arm 1901 disturbs equipment that is inside 714, resulting in a chemical spill. Further, a chemical spill may be the result of chemicals that the occupant is placing into hood 714. In embodiments of 700B, which do not include a contaminant status 801 method, such a spill may go undetected. In embodiments of 700A which does include a contaminant status 801 there are some scenarios where, even though chemical detection is provided by multipoint air sampling system 701, the said chemical spill of this example may nevertheless not be detected because the compound of the spill in this scenario may not be detectable by sensor 612.

To prevent the described spill scenario and other similar accidents due to fume hood 714 access while 714 is in minimum flow setback, as an embodiment, equipment status 806 may include both object presence and motion detection within a defined zone within fume hood 714. In this embodiment, object detection sensor 1301 may be configured so that it not only determines the presence of objects in a defined zone, but that 1301 is sensitive to transient presence or motion conditions where, if any object is present within zone 1303 for even short periods of time or is in motion within zone 1303 it will cause the equipment status 806 to be set to logical "false", which disables the hood minimum flow setback signal 808. In this embodiment, the said short periods of time that objects may be detected by 1301 may be periods lasting several seconds or less. In a preferred embodiment, sensor 1301 may detect objects which are present in zone 1303 for periods of 5 seconds or less as being considered a motion detection embodiment of sensor 1301. In further embodiments, sensor 1301 may include one or more sensors used to perform object detection within zone 1303 and one or more sensors used to detect motion within zone 1303.

In a further embodiment, the motion detection embodiment of sensor 1301 may be applied to a zone volume that exceeds the volume of zone 1303 in which the said zone volume that exceeds the volume of 1303 may include any portion of the interior volume of hood 714, up to the entire interior volume of hood 714 above work surface 208. In this embodiment, presence detection of 1301 is confined to zone 1303, while the motion detection of 1301 includes the zone 1303 and any portion of the volume of the interior of hood 714 outside zone 1303. This embodiment enables the additional detection not only of occupant-based activity, such as 1901, but also provides a method of detecting equipment movement within hood 714 as the equipment becomes dislodged while hood 714 is in a state of minimum flow setback. As an example, while hood 714 is in a state of minimum flow setback, using logic 800A or 800B, a beaker which may be placed outside of zone 1303 on a stand somewhere on work surface 208, may become dislodged or fall over from the stand, resulting in a chemical spill, due to for example any source of vibration transmitted from the lab space in which hood 714 sits. For example, vibration transmission through duct connection 712 is quite common, due to vibration from the exhaust fan system to which 712 connects. Such a spill due to a beaker falling over in this way could pose an exposure risk to lab occupants if the fume hood 714 is operating in a state of minimum flow setback. Using an embodiment of motion detection provided by sensor 1301 outside of zone 1303, sensor 1301 would detect the spill event due to the beaker falling over and the fume hood 714 would be taken out of minimum flow setback as a result.

Figure 20:
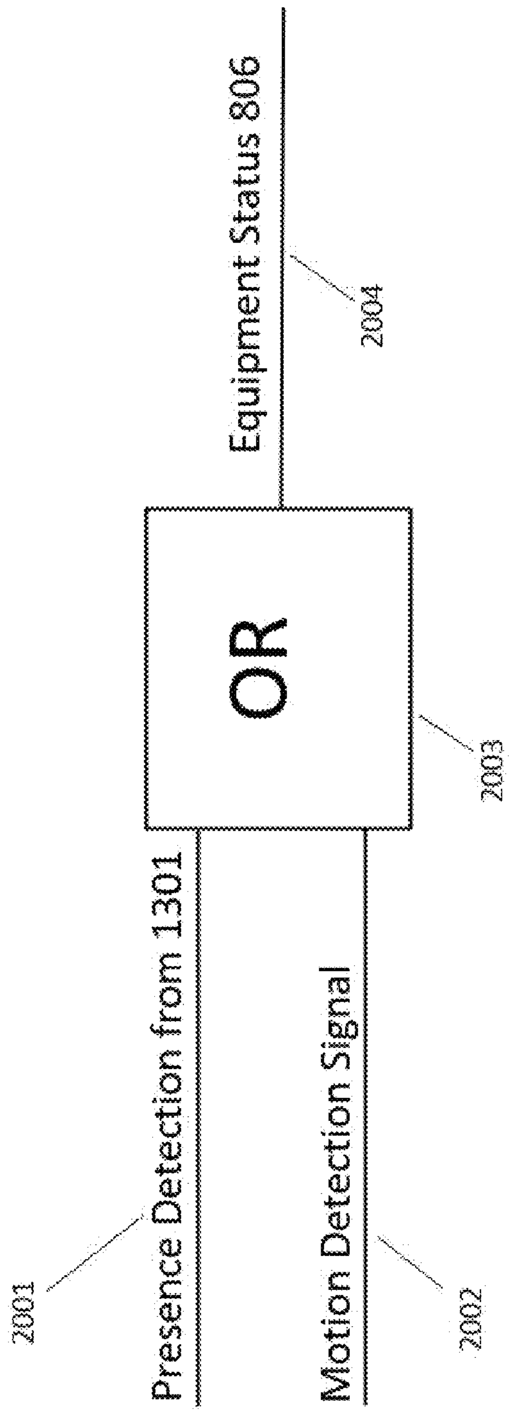
FIG. 20 illustrates logic for combining a presence and motion signal to produce an equipment status signal.

In a further embodiment where equipment status 806 comprises object presence and motion detection, the presence detection may be from a sensor 1301 while the motion detection may be from a separate motion detection sensor which motion detection sensor may either be mounted within or outside of the fume hood 714. In recent years motion detection technology has become increasingly reliable and low in cost and there are several suitable sensor technologies available for this purpose including but not limited to: microwave or millimeter wave detectors, RADAR based detectors, passive infrared (PIR) detectors, software-based image detectors, ultrasonic detectors, active proximity sensors, photoelectric sensors, and time of flight based motion detectors. Some of the discussed technologies for motion detection may provide human occupancy detection in addition to general object motion detection. For example, PIR sensors may be sensitive to human heat signatures while also being sensitive to motion by any object. Embodiments of motion detection may include motion detection within zone 1303 or any fraction of zone 1303, or motion detection may include a zone that is any portion of the interior of hood 714, including but not limited to the full volume of the interior of 714. In added embodiments involving a separate motion detector for 806, the motion detection zone may also include any space that is outside of and in front of the hood 714 in addition to regions within the hood 714. This is a practical aspect of utilizing many discrete motion sensing technologies, as there may be limitations to the extent with which the detection zone of the sensor may be adjusted. Also, in embodiments where the motion detection sensor used for equipment status 806 is mounted outside of hood 714, a portion of the detection zone unavoidably includes regions outside of the hood 714. Note that in the embodiments which incorporate a sensor 1301 for equipment presence detection and a separate sensor for motion detection, a logical OR function is applied to the logical status of the two sensors to produce equipment status 806, as shown in FIG. 20. The logical OR function 2003, results in equipment status 806 that is the OR'd result 2004 of the logical state of presence detection 2001 and motion detection 2002. The result 2004 is that, if either motion signal 2002 or presence signal 2001 are "true" then equipment status 806 will be set to true.

The fume hood condition monitoring embodiments described in this disclosure may provide substantial fume hood airflow reductions and therefore energy reductions during periods where a fume hood is in an appropriate condition of non-use. This generally includes times where experimentation or processes are not being carried out which, in many facilities, can total to many hundreds or even thousands of hours on an annual basis. One of the factors which may interfere with the energy reduction capabilities of the disclosed embodiments includes behavioral aspects of lab occupants which may prevent the setback criteria of 800A or 800B from being satisfied in certain cases. For example, if after hood use, hood 714 is left with equipment present within the equipment free zone on which equipment status 806 is based, then 806 will not resolve to "true" and the hood 714 will not be placed into minimum flow setback after use. Likewise, if electrical equipment, such as a hot plate, is not shut off after use or hood lighting 724 is not shut off, then electrical status 810 will not resolve to "true" and the hood 714 will not be placed into minimum flow setback after use. That 810 does not resolve to "true" in these examples is something that may be improved upon through personnel instruction and training on proper procedures for fume hood operation. However, such behavioral issues with the operation of fume hoods in a lab facility may go unnoticed, especially in lab buildings having many fume hoods and many lab personnel. To improve upon fume hood energy efficiency, embodiments include methods of determining and communicating operator related hood minimum flow setback performance issues as it applies to one or a plurality of hoods within a lab facility.

Figure 21:
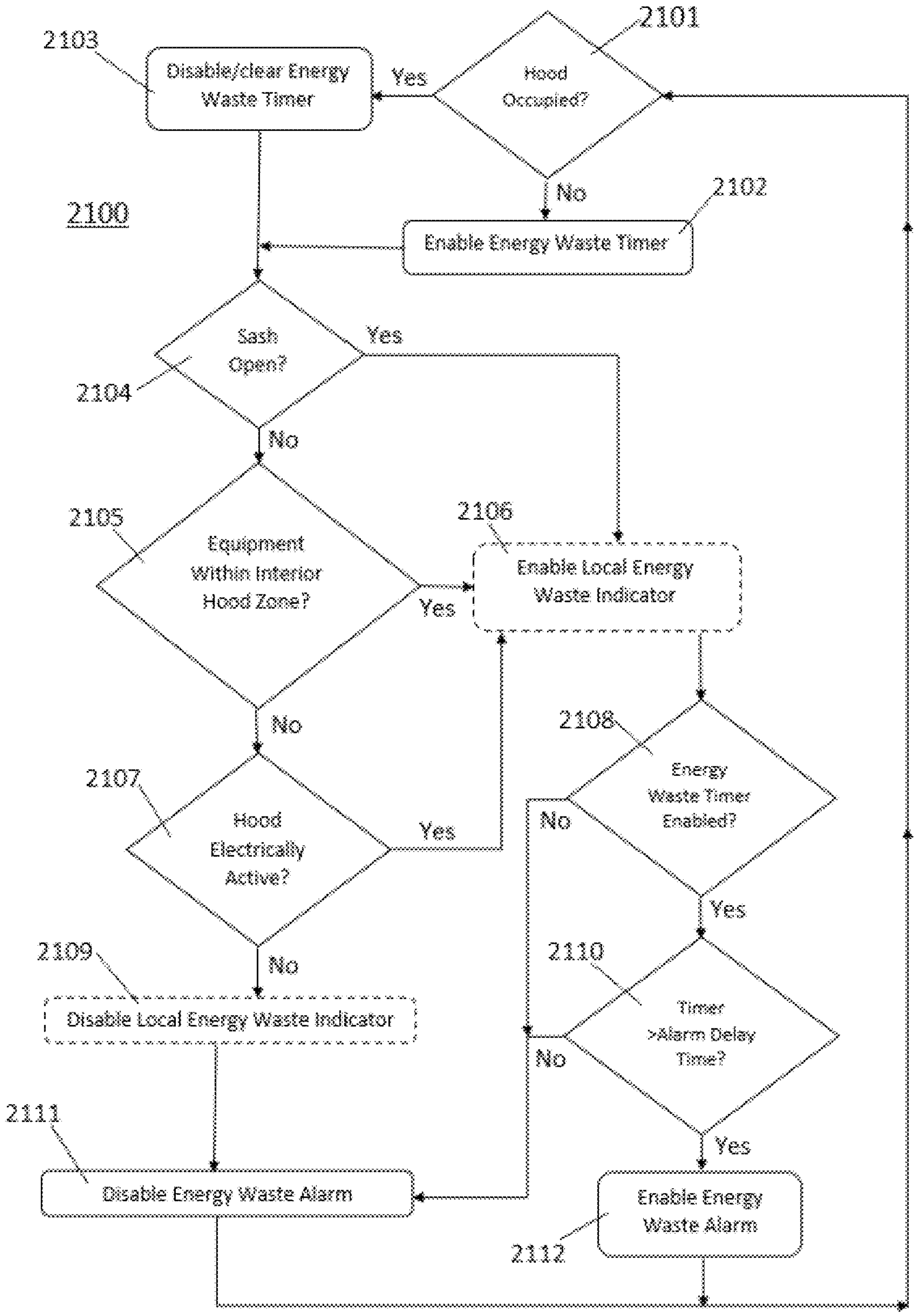
FIG. 21 illustrates logic for determining and communicating a minimum flow setback performance condition.

In the description of logic 702 an energy waste indication is described which may be displayed locally at fume hood 714 when the fume hood sash is closed and equipment status 806 resolves to "false", meaning that equipment is present within the equipment free zone of hood 714. With this embodiment, it is preferred that the indicator of energy waste be some form of subtle reminder, such as a visual indicator using a display or LED, to the operator of hood 714 that equipment is present in the equipment free zone of hood 714. In practice, while occupancy status 803 is true, even though the fume hood sash may be set to a position that is below the setback sash threshold of 714, lab personnel may still be using the hood 714, which would be a possible reason why equipment remains within the equipment free zone of hood 714. Therefore, under this scenario, a local visual reminder of energy waste, if any, may be most suitable. Further, the user of hood 714 may temporarily and deliberately step away from hood 714 for a short period of minutes to hours while still intentionally using hood 714 for purposes for example of an ongoing experiment. In this case it may not be appropriate to signify that an energy waste condition exists at 714, other than possibly via a local indicator as described, due to the usage scenario for that hood 714. The objective of maintaining only a local indicator in some conditions would be to avoid a nuisance alarm for a condition which may not be a valid energy waste condition, and a notification of such an issue may not be productive for the facility staff. In a further embodiment, as a method of determining operator related hood setback performance issues, an energy waste alarm may be generated following a predetermined period of time (herein energy waste alarm delay time) over which the fume hood 714 is unoccupied as signified by occupancy status 803 and a condition of sash status 802, equipment status 806, or electrical status 810 exists which prevents hood 714 from being placed into a state of minimum flow setback. An embodiment of the logic for the energy waste alarm is illustrated within FIG. 21.

The logic 2100 includes optional logic components 2106 and 2109 to additionally implement a local energy waste indicator in addition to determining the state of an energy waste alarm that is based on human behavioral conditions that may prevent fume hood 714 from entering a state of minimum flow setback. The logic 2100 may be implemented by logic 702, hood controls 617, monitor 706, BAS 705, or remote data center 730. Logic 2100 may initiate at block 2101 by first determining if the fume hood 714 is occupied based on occupancy status 803. If the hood 714 is occupied, then within logical step 2103 the energy waste timer is disabled and cleared. If the hood is not occupied based on 2101, then in logical step 2102, the energy waste timer is enabled, which means that it will begin to count up to measure the amount of time a potential energy waste condition is present. In logical step 2104, a determination is made as to whether the hood's 714 sash is open above the setback sash threshold using sash status 802. If not, the logic proceeds to step 2105, which determines if there is equipment within the equipment free zone of hood 714 based on equipment status 806. If not, the logic 2105 proceeds to logic 2107 which determines if the hood 714 is electrically active via 810. If it is determined that the sash is open via 2104, that equipment is within the equipment free zone via 2105, or that the hood is electrically active via 2107 then, optional block 2106 may enable a local energy waste indicator that would be visible or optionally audible to lab occupants. Note that, although logic 2104, 2105 and 2107 are shown, embodiments support any combination of 2104, 2105, and 2107. For example, in some embodiments, electrical status 810 may not be used and, therefore, logic 2107 would be disabled. If the result is a "yes" condition for 2104, 2105 or 2107 and the energy waste timer is enabled, as tested by logic 2108 then logic 2110 determines if any of the three conditions 2104, 2105 or 2107 has been present for a predetermined period referred to as the energy waste alarm delay time or alarm delay time. The energy waste alarm delay time is a setting that may be configured within logic 2100 or the logic 702 which determines the time sensitivity of the energy waste alarm of this embodiment. If the energy waste alarm delay time is set too short, it may result in nuisance alarms from logic 2100. If the energy waste alarm delay time is set too long, it may result in a less effective energy waste alarm, which can result in energy waste because of the function that this alarm provides in notifying facilities personnel of the energy waste condition. As an embodiment, the energy waste alarm delay time may be set to any value between a few minutes and several hours. As a preferred embodiment, the alarm delay time is set to a value that is equivalent to the fume hood flushing time of 811. Once an energy waste condition associated with 2104, 2105, 2107 has been present for a duration greater than the energy waste alarm delay time, then the energy waste alarm is set by logic 2112. For periods that are less than the energy waste alarm delay time, even though an energy waste condition associated with 2104, 2105, 2107 may be present, the energy waste alarm is disabled or maintained in a non-alarm state by logic 2111.

One purpose of the energy waste alarm disclosed in embodiments is that it provides a method of communicating which fume hoods 714 in a lab facility are not achieving their energy savings potential because of human behavior. Because of the varied fume hood use in any lab setting, as well as the often-large number of fume hoods in a given facility, such behavioral issues which would result in poor setback performance would be extremely difficult to observe and correct. The logic of 2100 provides such a determination and may be used to create an alarm signal that may be monitored by local hood controls 617, the BAS 705, or remote data center 730. For example, the energy waste alarm from logic 2100 may be communicated over a BACnet network to the BAS 705 or other equipment such as 617. Such an energy waste alarm from 2100 may be trended and facilities personnel may use this information to identify which fume hoods 714 in the lab facility require attention due to human factors. This information for example may be used by energy managers, lab managers, environmental health and safety personnel, or other facility personnel to identify areas where, for example, added training may be required on fume hood operation and practices.

Further embodiments of a method of determining and communicating a setback performance condition includes the logic 2100 that is adapted to communicate the specific energy waste condition. As an embodiment, the logic of 2100 may be adapted to specifically signify if the sash 715 has been left open above the setback sash threshold for a time period greater than the energy waste alarm delay time. As an embodiment, the logic of 2100 may be adapted to specifically signify if equipment has been present within the equipment free zone 1303 for a time period greater than the energy waste alarm delay time. As an embodiment, the logic of 2100 may be adapted to specifically signify if there is electrical activity in hood 714 via status 810 for a period of time greater than the energy waste alarm delay time. In embodiments, the method of specifically signifying the source of an energy waste alarm condition, including sash status 802, equipment status 806, and electrical status 810 may be communicated locally at hood 714 or to a remote device, such as the BAS 705 or remote data center 730. The said method of specifically signifying the source of an energy waste alarm condition may be applied to identify behavior related issues with minimum flow setback performance of any number of fume hoods within a lab facility. As a further embodiment, remote data center 730 enables system 728 or 701 to be remotely and proactively monitored for behavioral setback performance conditions by a support team or remote monitoring software that is part of remote data center 730. This enables issues which for example may be identified using logic 2100 or adaptations of 2100 to be identified remotely. As an embodiment of determining and communicating a behavioral related setback performance issue associated with one or a plurality of fume hoods 714, remote data center 730 incorporates software which identifies the said setback performance issues and provides a notification such as but not limited to an email notification, or a text message to facilities staff who are responsible for the one or more fume hoods 714 and their operation. As a further embodiment, data center 730 may incorporate a webpage which may be accessed to view a summary of minimum flow setback performance issues, which may be summarized by fume hood, by lab, or by some other method of organizing such information.

An important aspect of a successful application of sensor 1301 to hood 714 is its configuration to provide equipment detection based upon an equipment free zone that must be well defined by the configuration. Reliability of this configuration relates to how intuitive the configuration process is and, preferably, the configuration process should also be simple enough to be performed by a field technician in a time efficient manner. It should be understood that the equipment free zone depth of 1305 may be a consistent parameter as sensor 1301 is applied to a variety of hoods 714. For example, equipment free zone depth 1305 will often be between 6 and 10 inches. A parameter which may vary considerably from one hood to the next is the equipment free zone width 1306, due to the variety of fume hood widths which are available to the lab industry. Therefore, as an embodiment, sensor 1301 must at least be capable of supporting a wide range of fume hood 714 widths and therefore be configurable to a range of equipment free zone widths 1306.

As has been described, LIDAR systems may perform range sensing within a 3-dimensional volume by varying a laser's pitch in addition to its yaw to scan a volume of interest using a laser that is positioned at a fixed point. When applying 3-dimensional LIDAR as sensor 1301, the position of sensor 1301 must be carefully measured in relation to the position of the equipment free zone 1303 so that zone 1303 may be mapped using software provided with the LIDAR system. This can be a tedious process and is one that is subject to human error.

Figure 22:
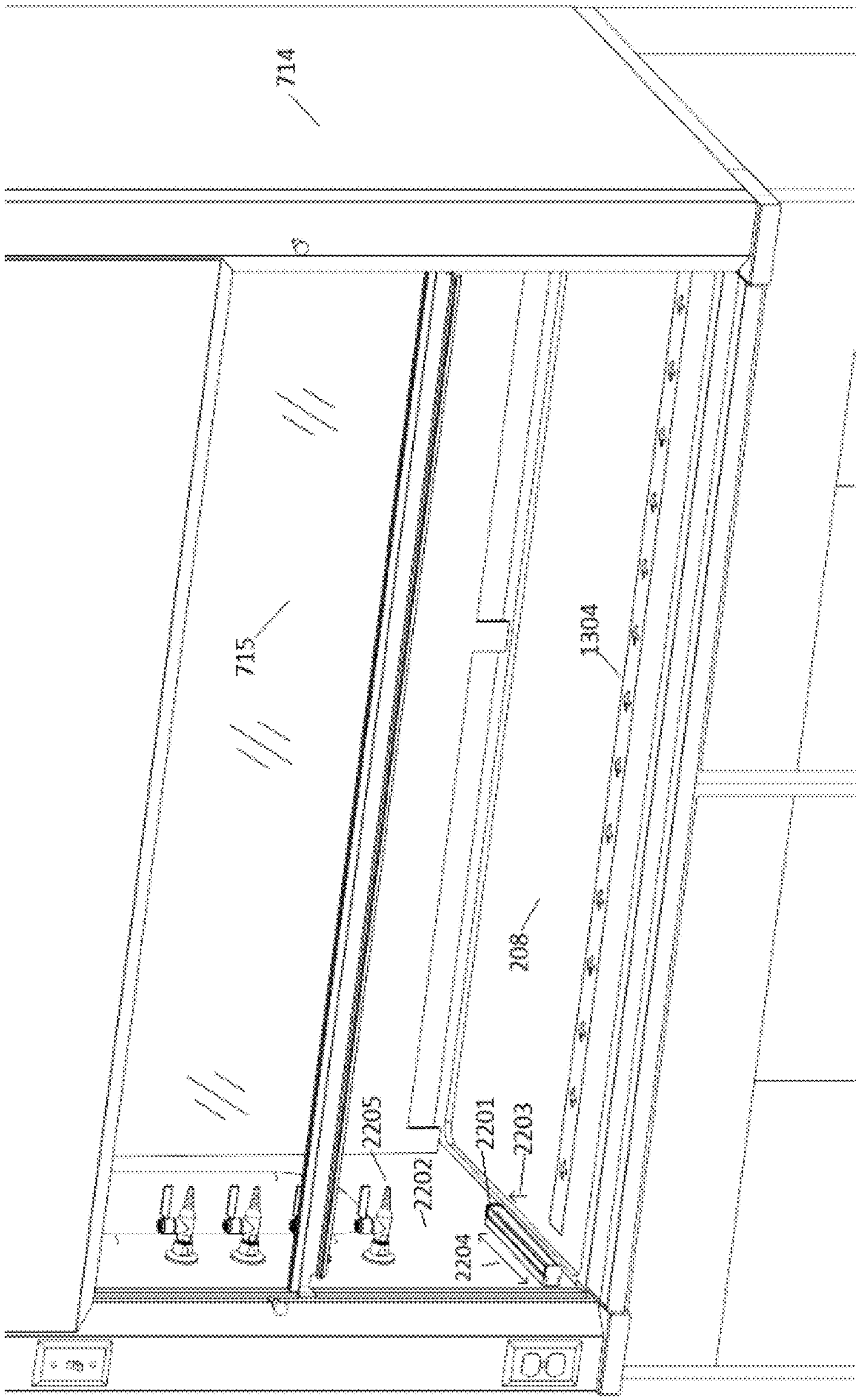
FIG. 22 illustrates a fume hood with a sensor bar embodiment.

As an embodiment, FIG. 22 illustrates a scanning equipment detector 2201 that may be used as sensor 1301 which incorporates an optical time of flight range sensor that has been specially adapted for fume hood minimum flow setback applications. For those experienced in the art of optical range sensing, it should be clear that optical time of flight range sensing may include any method of measuring the distance to an object by measuring the time taken by a light pulse to travel to a target and then to be reflected by the target and then return to a detector. This may include but is not limited to methods of directly determining the travel time of light using high speed electronics or indirectly determining the travel time of light using phase difference measurement techniques using a phase detector, for example. Those experienced in the art of optical time of flight sensing will recognize that the phase difference measurement technique is also referred to as an indirect time of flight measurement, while techniques which directly measure the light travel time are also referred to as direct time of flight measurements. For purposes of this disclosure, optical time of flight sensing shall refer to any optical time of flight sensing including direct and indirect time of flight techniques. Further, optical time of flight sensing may include any number of optical transmitters and detectors. Time of flight sensing may also include methods of measuring the distance to one or more objects using a light source and any type of imaging sensor such as, but not limited to, a CMOS- or CCD-based image sensor, where direct or indirect sensing methods are applied to sensed pixel values. Examples of this are described within U.S. Pat. Nos. 8,355,117 B2 and 10,191,154 B2, incorporated herein by reference. The sensor 2201 shown in FIG. 22 is a generalized view of several embodiments of a scanning time of flight sensor bar having a combined rotational scanning method and a linear horizontal scanning method to provide three dimensions of range data or zone data, of which more detailed embodiments are described further below. Sensor 2201 is intended to be mounted on an interior wall (such as 2202) or ceiling of fume hood 714 however, in a preferred embodiment sensor 2201 is mounted in a horizontal position which is roughly parallel to the fume hood's 714 work surface 208 as shown in FIG. 22. The scanning time of flight sensor bar 2201 incorporates a plurality of optical transmission and detection locations along the width 2204 of the sensor 2201, which optical transmission and detection locations segment the equipment free zone 1303 into a finite number of two-dimensional vertical scan fields or area slices, each area slice being an arc-shaped scan field. As will be discussed, because the light paths from the sensor bar 2201 are confined to locations defined by the sensor width 2204 within hood 714, the configuration process of 2201 where the equipment free zone 1303 is defined, is greatly simplified, eliminating or at least minimizing the need for physical measurements by a technician. In some embodiments, portions of the optical transmission and detection locations in 2201 may be disabled to adjust the sensing width of sensor bar 2201. For example, when configuring sensor 2201, a technician may physically measure the depth of 1305 and then disable or enable portions of the optical transmission and detection locations in 2201 to match 1305. In many applications, the full width 2204 may be used, with no measurements of 1305 required.

Figure 23A:
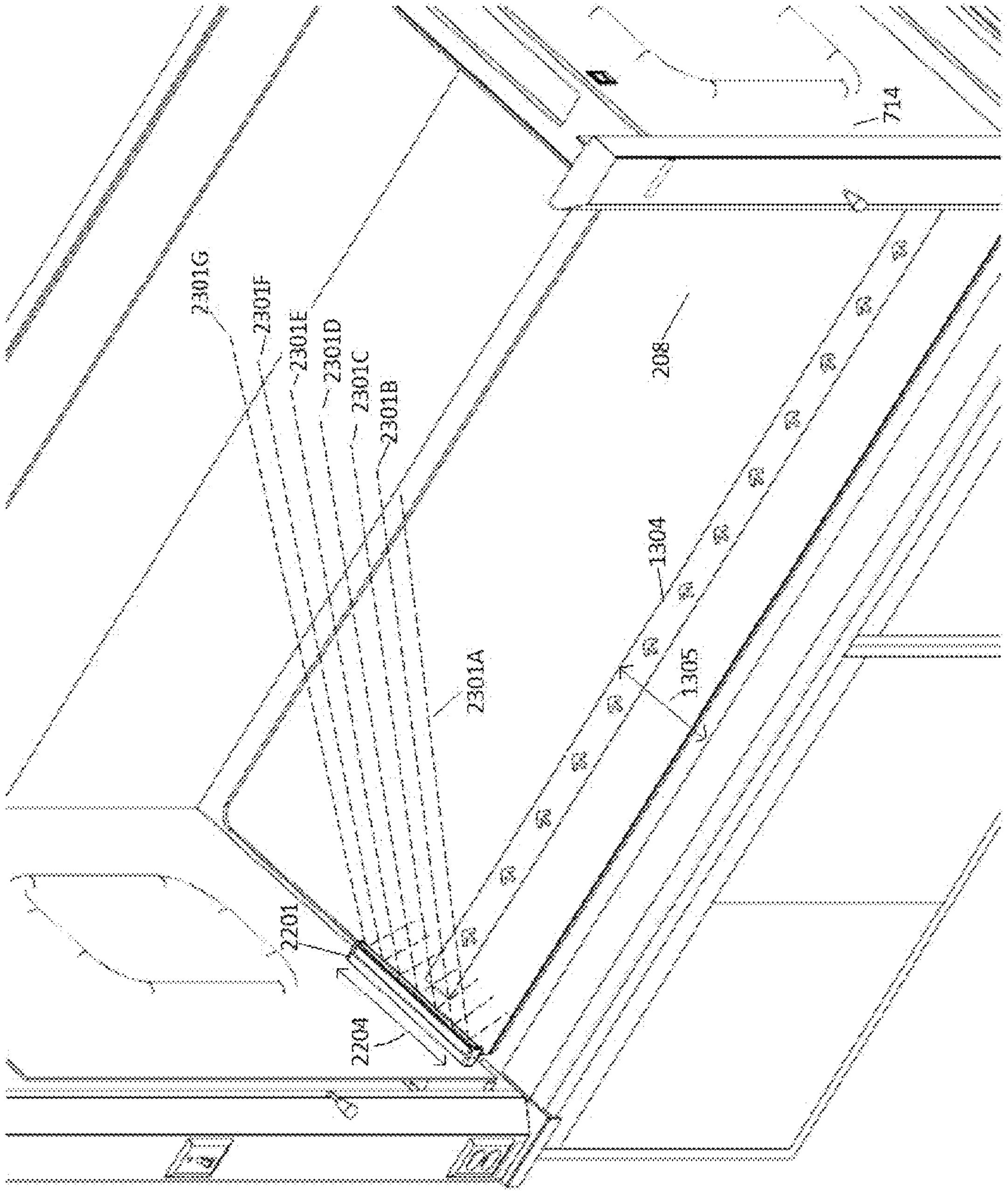
FIG. 23A is a detailed illustration of a fume hood with a sensor bar embodiment.
Figure 23B:
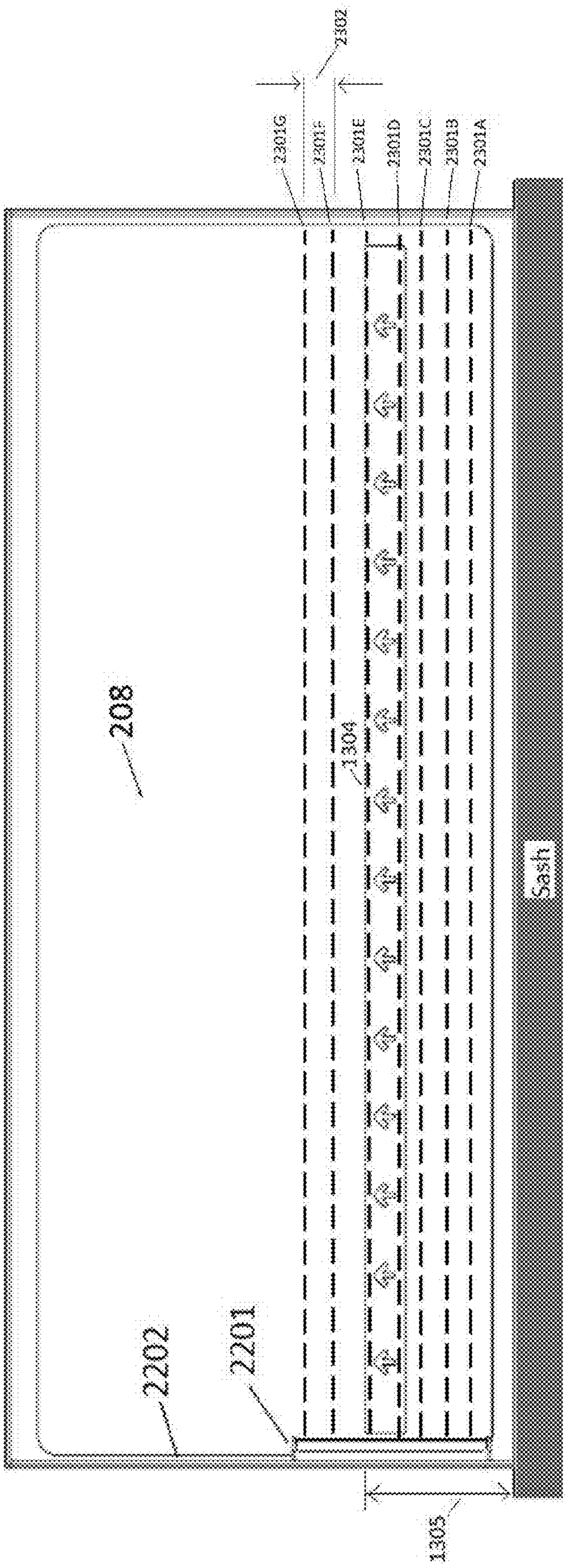
FIG. 23B illustrates a top view of a fume hood with a sensor bar embodiment.
Figure 23C:
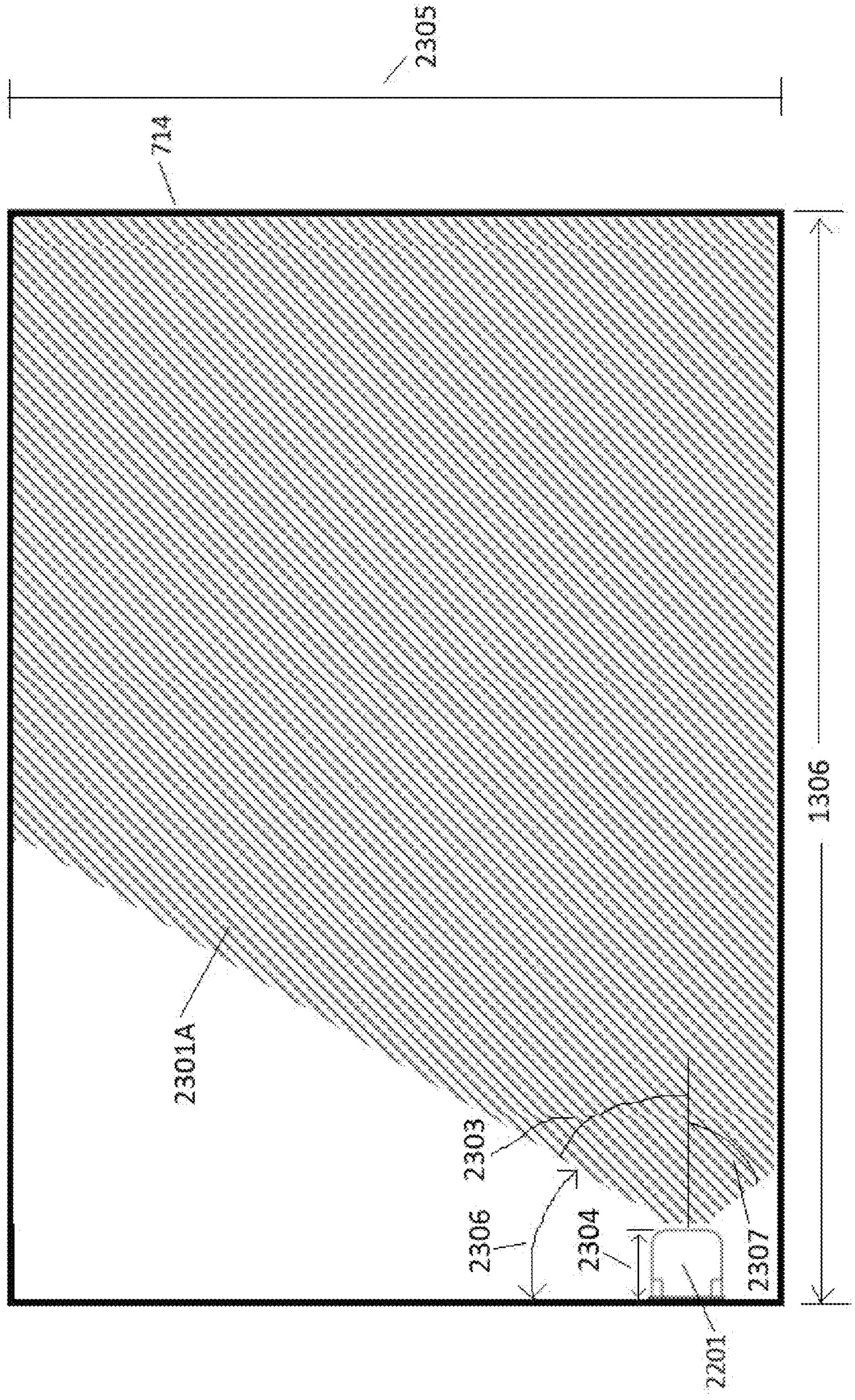
FIG. 23C illustrates a side view of a fume hood with a sensor bar embodiment.

FIGS. 23A, 23B and 23C illustrate a time of flight sensor bar embodiment of 2201, mounted within hood 714. Within each of 23A, 23B and 23C, the sash and upper section of hood 714 has been omitted for illustration clarity. In embodiments, sensor bar 2201 has a width 2204 that at least spans the depth 1305 of the equipment free zone 1303. In embodiments, sensor bar 2201 may have a fixed width 2204 of between 6 and 10 inches, which is a common range for depth 1305. In other embodiments, sensor bar 2201 may have a width 2204 that is greater than 6 to 10 inches to support applications requiring deeper values of depth 1305. For example, in some applications, due to safety reasons, environmental health and safety personnel may require larger portions of hood 714 to be free of equipment as one of the requirements for enabling minimum flow setback.

As shown within each of the FIGS. 23A, B, C the sensor bar 2201 provides a plurality of two-dimensional scan fields 2301A, 2301B, 2301C, 2301D, 2301E, 2301F, 2301G which, combined, form the sensed zone 2301. Although FIG. 23 illustrates seven scan fields within 2301 based on a field resolution 2302, embodiments include any number of scan field elements of 2301. As a preferred embodiment, a scan field element of 2301 is provided between a range of every 0.5 inches to every 1 inch along the width 2204 of sensor bar 2201. Note that the volume of 2301 may exceed the equipment free zone 1303, especially when the sensor bar width 2204 is greater than equipment free zone depth 1305. However, as an embodiment, the number of optical transmission and detection locations along the width of sensor bar 2201 may be varied based on a measurement of the required equipment free zone depth 1305. Embodiments of sensor bar 2201 allow the number of optical transmission and detection locations in 2201 to be field adjusted using software or hardware configuration features of 2201. In many applications, the width 2204 of sensor bar 2201 may be used as zone depth 1305.

FIG. 23C illustrates a side view of sensor bar 2201 installed within hood 714. The side view further illustrates the shape of a two-dimensional scan field element of 2301. Shown in FIG. 23C is scan field element 2301A which, in this example, is the scan field which is closest to the sash 715. Generally, each two-dimensional scan field element, such as 2301A is arc shaped because, in embodiments, each of the optical transmission and detection locations incorporated within sensor bar 2201 uses a rotational scanning motion during the range sensing process of 2201, and the rotational scanning motion 2306 is around an axis parallel with the sensor bar width 2204. Embodiments include any method of rotating the transmission and detection locations about the said axis parallel with the sensor bar width 2204. The motion 2306 is curvilinear in nature, and includes embodiments involving a rotating member within sensor 2201 or external portions of 2201 may rotate.

Figure 24A:
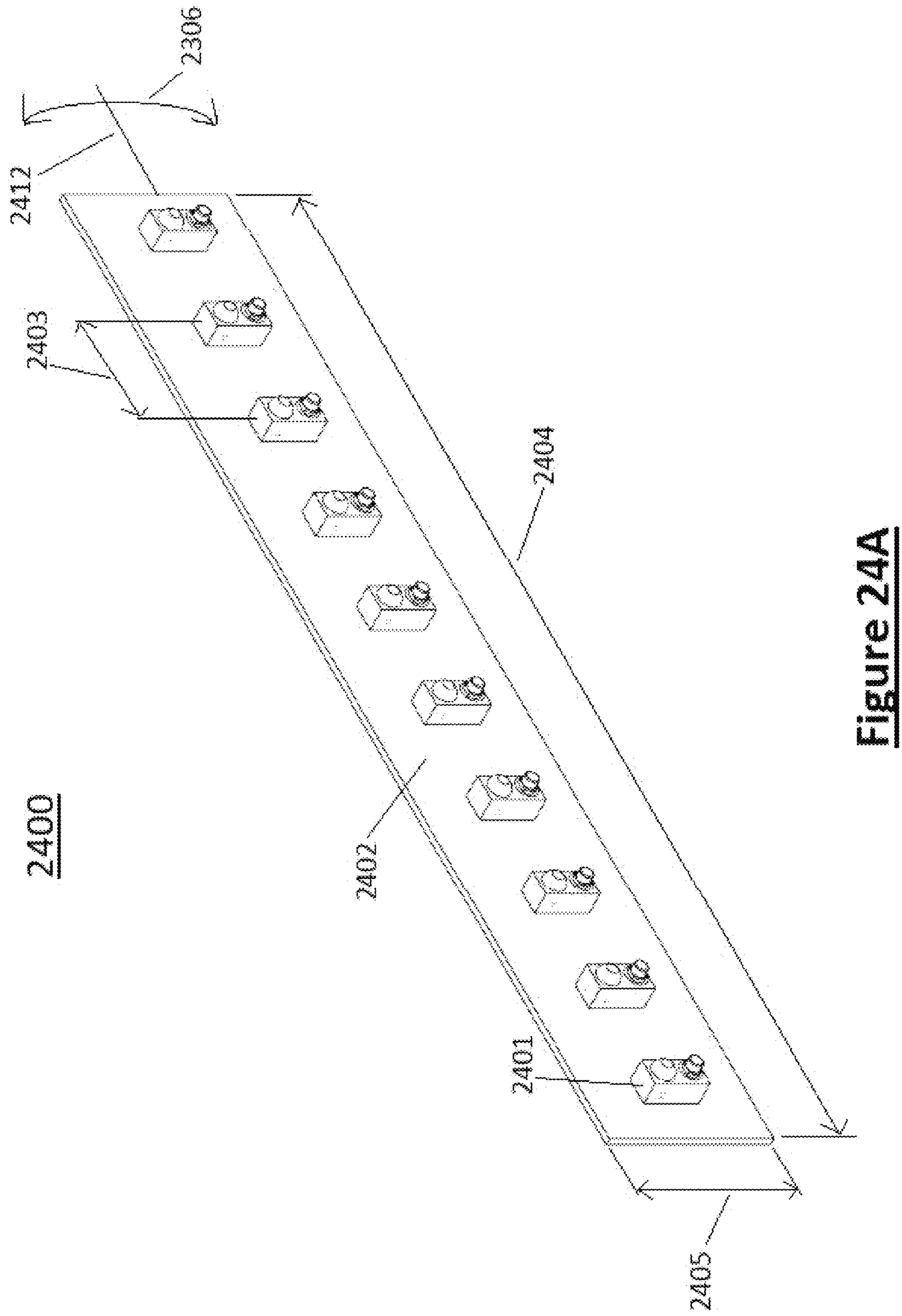
FIG. 24A illustrates an embodiment of a time of flight sensor array which may be incorporated within an equipment detector.

Embodiments of sensor bar 2201 include any method of providing a plurality of optical transmission and detection locations along the width 2204 of sensor 2201. In one embodiment, as shown in FIG. 24A, sensor bar 2201 incorporates an array of discrete light source and detector pairs 2401 at each of the optical transmission and detection locations along the width 2204 of sensor 2201. In embodiments each discrete light source and detector pair 2401 may be positioned with a pitch or spacing 2403 that determines the spacing of the scan field elements of 2301. For example, a spacing 2403 of 1 inch will result in scan field elements of 2301 being spaced by 1 inch. In embodiments sensor array 2400 may utilize a rotational scanning motion 2306 about the horizontal axis 2412 of the array 2400. Note that embodiments include any rotational scanning motion 2306 about an axis that may be at least approximately parallel to the axis 2412.

Figure 24B:
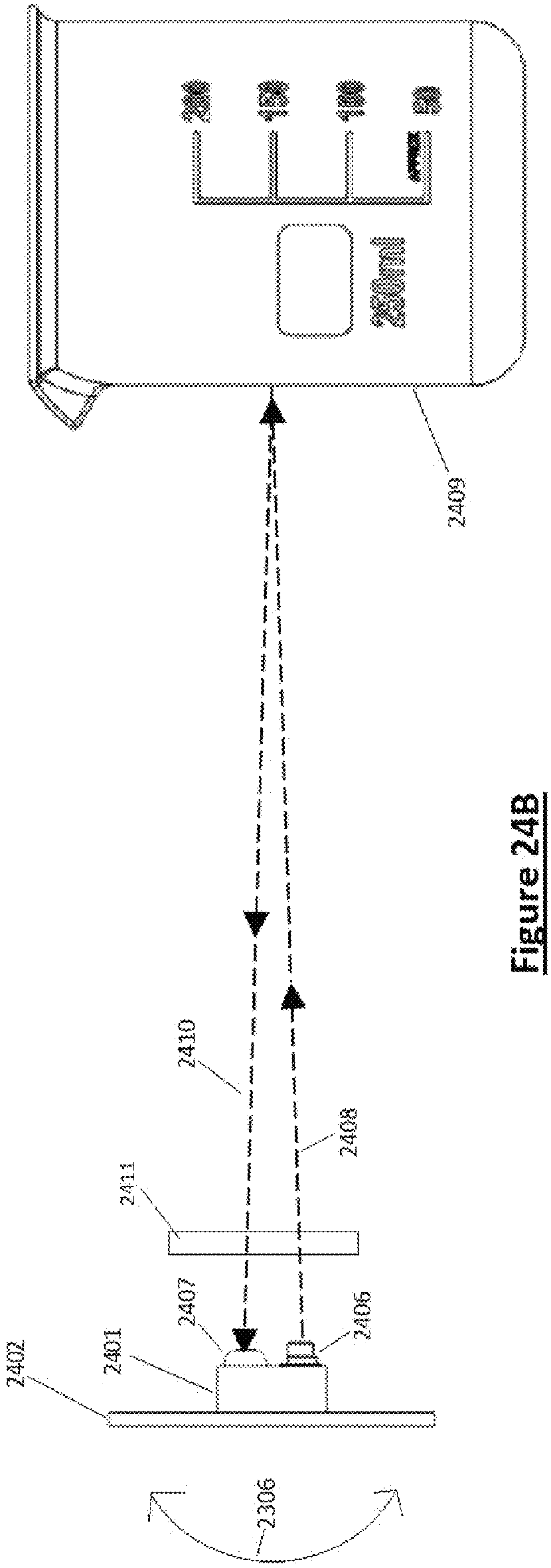
FIG. 24B illustrates a side view of a time of flight sensor array embodiment.

FIG. 24B provides a side view of sensor array 2400 and illustrates an example of the light path 2408 from light source 2406 to a target 2409, and then a reflected path 2410 which is detected by detector 2407. The discrete light source and detector pairs 2401 may be any suitable optical transmitter 2406 and detector 2407. Embodiments of transmitter 2406 include but are not limited to any light emitting diode emitting at any wavelength, or 2406 may be a laser diode emitting at any wavelength. In one embodiment, light source 2406 may be a Vertical Cavity Surface Emitting Laser which is also known to those experienced in the art of laser technology as a VCSEL. In one embodiment, light source 2406 may be a high intensity infrared emitter, such as but not limited to the SFH 4550, which is manufactured by OSRAM Opto Semiconductors of Regensburg, Germany. Embodiments of detector 2407 include any type of optical detector element such as but not limited to a photodetector; wherein detector 2407 must be suitable to detect the optical wavelength emitted by transmitter 2406. In one embodiment, transmitter 2406 is an LED having spectral emissions at infrared wavelengths. In a preferred embodiment, transmitter 2406 is an LED having peak spectral emissions at 860 nanometers and the detector 2407 is a photodiode having a peak sensitivity at 860 nanometers. As an example, the transmitter 2406 having a peak sensitivity at 860 nanometers may be an SFH45550, which is an infrared LED manufactured by OSRAM Opto Semiconductors Inc. of Regensburg, Germany. A suitable pair, as a detector to the SFH4550 may be the SFH213FA, which is also manufactured by OSRAM Opto Semiconductors.

In embodiments of 2400, an optical filter 2411 may be incorporated with each element 2401 of the sensor array 2400. For example, filter 2411 may be but is not limited to a daylight filter, which may be used to reduce the sensitivity of array 2400 to ambient light.

In embodiments, discrete light source and detector pairs 2401 may be connected to any form of electronic circuit for performing a time of flight measurement. In one embodiment, 2401 may be connected to a system on chip designed for time of flight ranging applications, wherein the system on chip electronics are separate from 2401. There are numerous system-on-chip integrated circuit products available for time of flight ranging applications. For example, 2401 may be connected to an OPT3101 chip by Texas Instruments Inc. of Dallas Texas, which is a fully integrated system on chip for time of flight ranging. In other embodiments, discrete light source and detector pairs 2401 may be fully integrated with time of flight processing circuitry. For example, 2401 may be a VL53L0X by STMicroelectronics Inc. of Geneva Switzerland.

Figure 25:
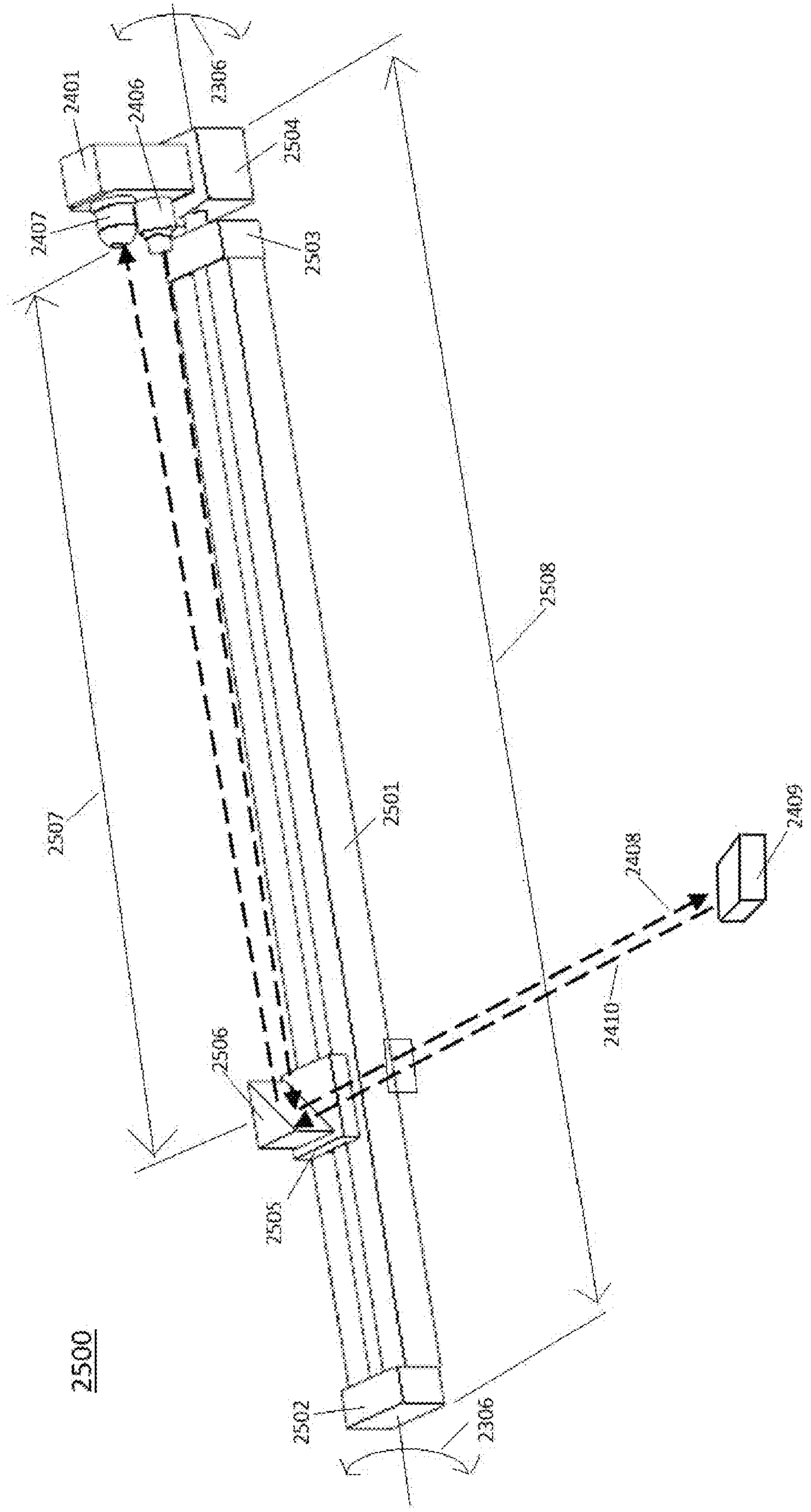
FIG. 25 illustrates a time of flight sliding mirror embodiment.

In another embodiment illustrated in FIG. 25, sensor bar 2201 incorporates a singular discrete light source and detector 2401 and, light which is transmitted 2408 and received 2410 by the discrete light source and detector is deflected through the detection locations along the width of 2204 by a movable reflective surface 2506. Embodiments of 2500 may be referred to as a sliding mirror sensor, herein. In embodiments of 2500, the movable reflective surface 2506 may be but is not limited to a mirror which is highly reflective at the optical wavelength of transmitter 2406. The reflective surface 2506 is angled approximately at a 45-degree angle to the light paths 2408 and 2410, which results in a deflection of 2408 and 2410 of approximately 90 degrees which requires sensor 2401 to be placed approximately at a 90-degree angle to the target 2409. This enables sensor 2401 to remain stationary, while only the movement of reflective surface along the width 2508 is required to provide a plurality of optical transmission and detection locations along the width 2204 or 2508. Sliding mirror embodiments include any method of providing movement of a reflective surface along the width 2508 to provide a plurality of optical transmission and detection locations along the width 2204 or 2508. As an embodiment, reflective surface 2506 may be mounted to a shuttle 2505 attached to a lead screw assembly 2501. The lead screw assembly 2501 incorporates a screw that spans the width of 2501 and said screw is rotated by a motor 2504, which 2504 may be but is not limited to a servo motor, stepper motor, voice coil, linear motor, linear solenoid, or any other type of electric motor. Also, any suitable alternative to a lead screw assembly shall be considered as embodiments, such as but not limited to a timing belt driven assembly or a linear bearing rail. The servo motor may be controlled by the same electronics which controls the rotational movement 2306 which is described further below. Using motor 2504, the position 2507 of the reflective surface 2506 may be varied to provide a plurality of optical transmission and detection locations along the width 2204 or 2508. An advantage that the sliding mirror sensor approach 2500 has over the sensor array approach 2400 is that 2500 may provide better sensing resolution 2403 without increased cost. For example, with the sensor array of 2400 to improve the sensing resolution 2403 from 1 inch to 0.5 inches requires that double the sensors 2401 be applied where, with the sliding mirror sensor approach 2500, no added hardware is required to increase the sensing resolution.

As an alternate embodiment of 2500, instead of using a reflective surface 2506, sensor 2401 is mounted directly to shuttle 2505 attached to a lead screw assembly 2501 so that, instead of having a movable reflective surface 2506, the sensor 2401 assembly is movable to provide a plurality of optical transmission and detection locations along the width 2204 or 2508. Also, any suitable alternative to a lead screw assembly shall be considered as embodiments, such as but not limited to a timing belt driven assembly or a linear bearing rail.

At times, the environment within a hood 714 may become extremely concentrated with airborne contaminants because of normal hood usage. This may be the result of experimentation and other work which potentially may include the use of a broad range of chemical compounds. As a result, a sensor placed in hood 714 used as an equipment detector 1301 may quickly become fouled by such contaminants in such a way as to interfere with the sensor's proper operation. For example, contaminants may adsorb to the surface of lens 2411 or the surface of light source 2406 or detector 2407 which may obscure light transmission or detection which can degrade the detection capabilities. To address the potential for equipment detector 1301 and its embodiments to become fouled by fume hood 714 contaminants, an embodiment of this disclosure includes methods of providing a fouling protective measure to equipment detector 1301, where the said fouling protective measure is enabled using a method of determining that the said fume hood may be in a state of use. In embodiments, methods of determining if the hood may be in a state of use for purposes of enabling or disabling a fouling protective measure applied to equipment detector 1301 may include any possible method of determining that hood 714 may be in a state of use, including methods that may not be as comprehensive or reliable as the methods used to determine if the fume hood 714 may be placed into setback using minimum flow setback. For example, as is discussed further in embodiments of FIG. 27, criteria for determining if fume hood 714 may be in a state of use to enable or disable a fouling protective measure in detector 1301 may include but is not limited to a determination of any combination of sash status 802, contaminant status 801, electrical status 810 or occupancy status 803. In other embodiments the fouling protective measure to detector 1301 may be enabled or disabled using a binary signal, such as but not limited to a relay contact closure that may be activated by the BAS 705 or hood controls 617, based upon but not limited to a time schedule.

Figure 26A:
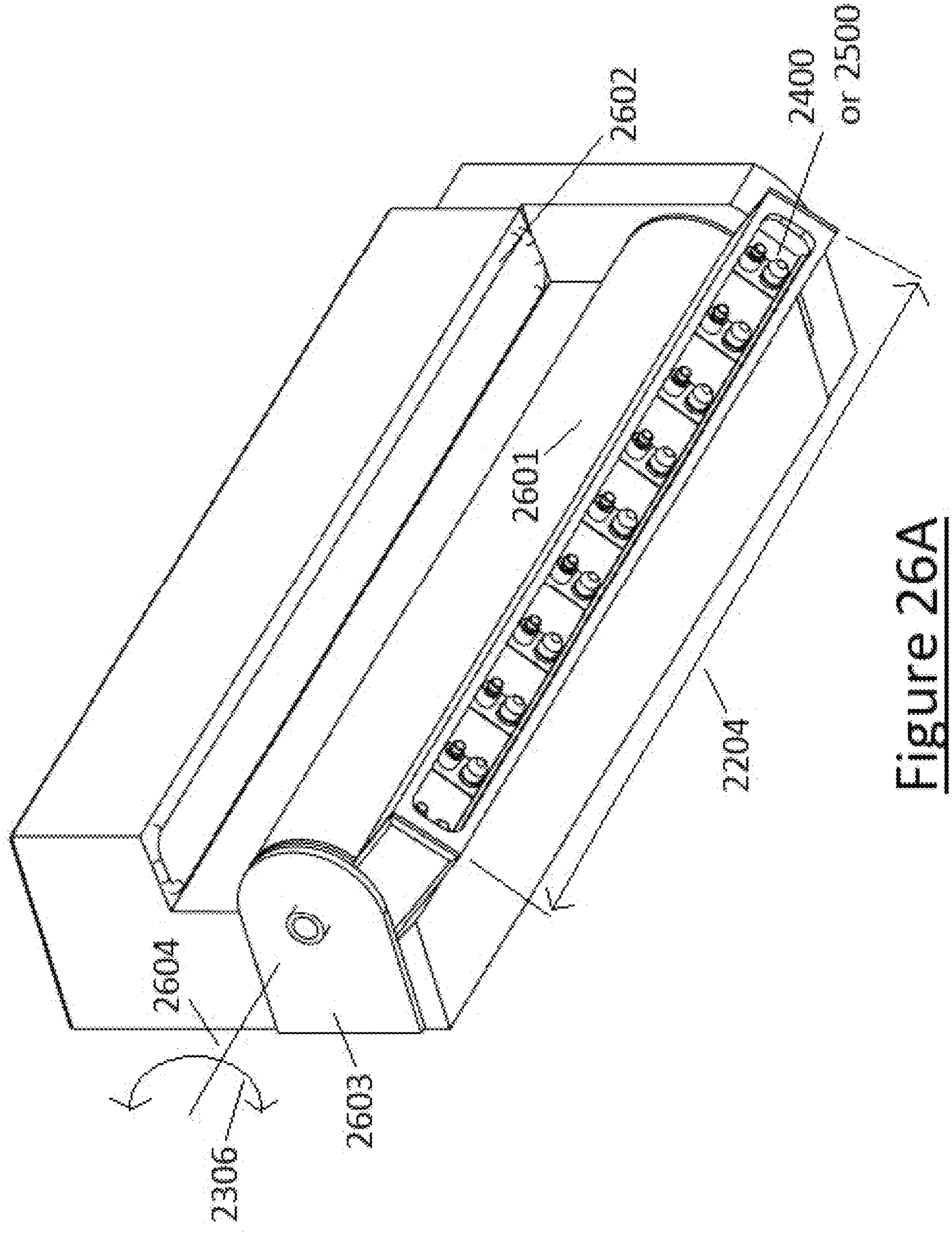
FIG. 26A illustrates an embodiment of a time of flight sensor bar which incorporates a method of providing a fouling protective measure.
Figure 26B:
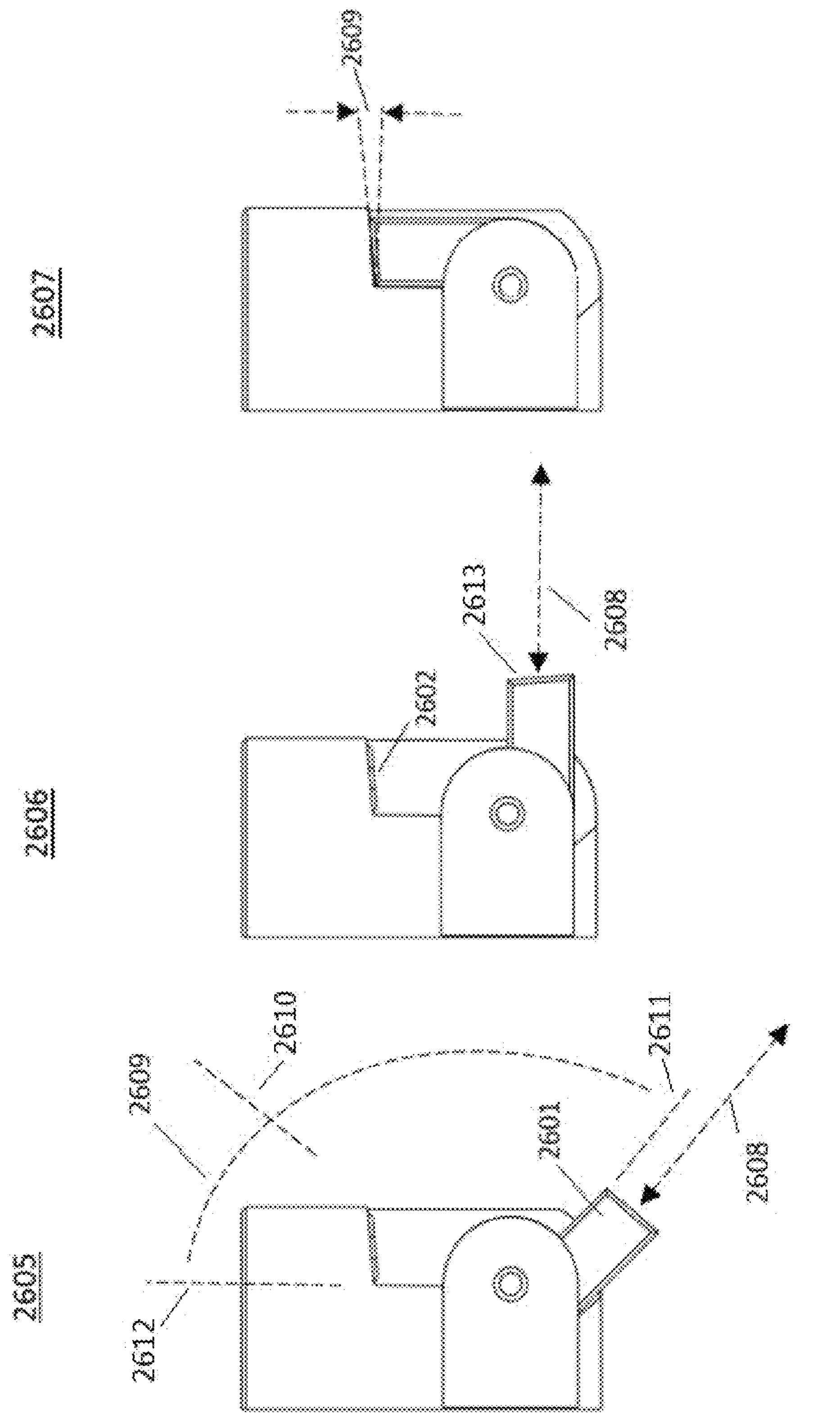
FIG. 26B illustrates profile views of an embodiment of a time of flight sensor bar which incorporates a method of providing a fouling protective measure.
Figure 26C:
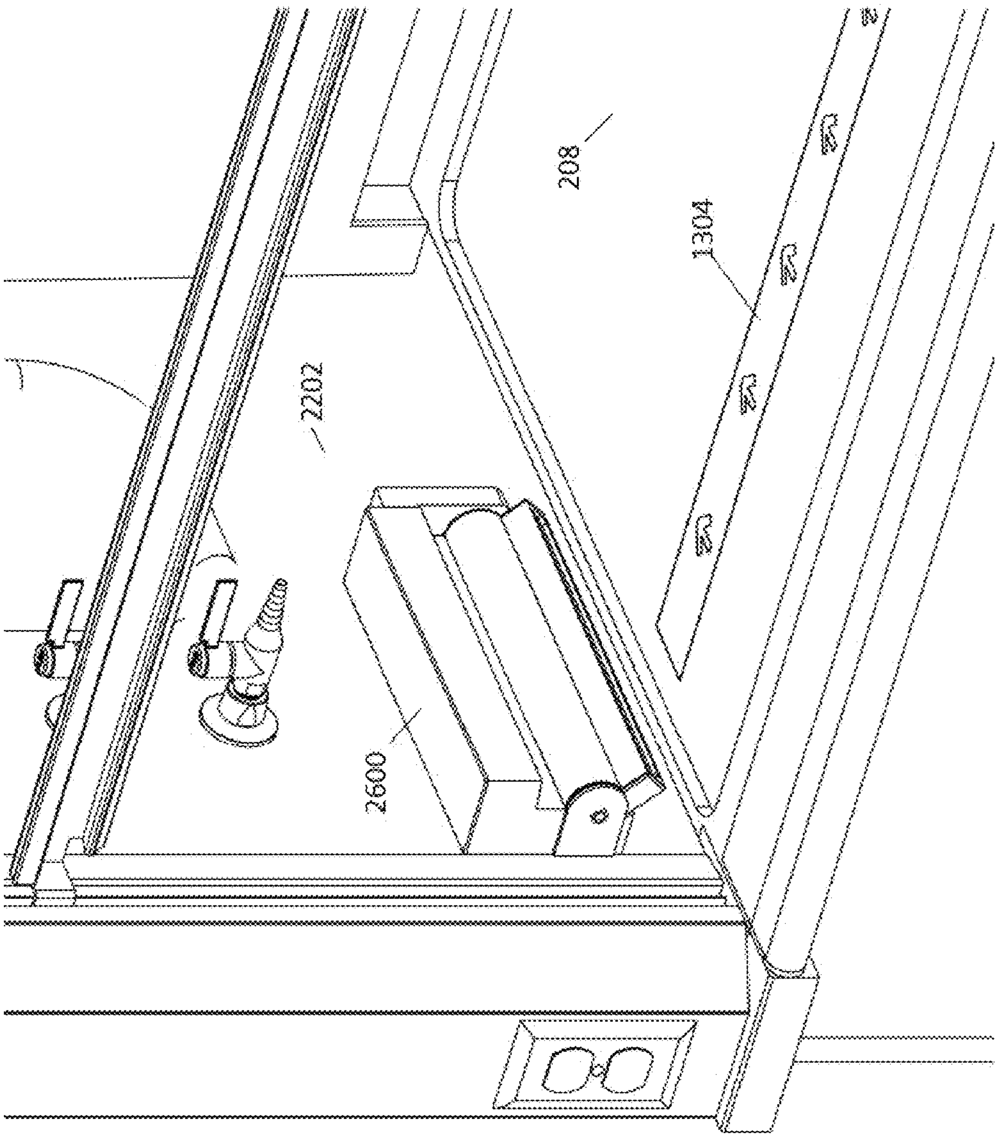
FIG. 26C illustrates an embodiment of a time of flight sensor bar which has been mounted within a fume hood.

In embodiments, methods of providing a fouling protective measure to 1301 includes any method of protecting a sensor 1301 or any sensitive subcomponents of 1301 from exposure to contaminants that would result in sensor fouling or sensor performance deteriorating affects such as but not limited to any type of damage to 1301. This includes but is not limited to any method of providing isolation to any or all components of sensor 1301 from contaminants within 714 or providing a method of decontaminating any or all components of sensor 1301 or providing a combination of sensor isolation and decontamination. Sensor fouling may include affects to the accuracy of 1301 due to contaminant exposure which may include any reversable or irreversible affects to the accuracy or the overall functionality of sensor 1301. For example, a reversable fouling affect to 1301 may include but is not limited to a loss in sensor 1301 accuracy due to contaminant exposure from any form of contaminant build up from contaminants within hood 714 on any part of sensor 1301. An irreversible fouling affect may include but is not limited to any form of corrosion, chemical reaction or triggering reaction to any part of sensor 1301 which affects the accuracy or failure of any part of 1301. Embodiments of providing a fouling protective measure additionally may include a method of pressurizing the interior of sensor 1301 using, for example, as an embodiment a source of pressurized air such as but not limited to that from an air pump. In other embodiments of providing a fouling protective measure, the interior of sensor 1301 may be pressurized using an inert gas such as but not limited to CO2 or nitrogen. FIGS. 26A, 26B, and 26C illustrate an embodiment 2600 of a time of flight sensor bar 2201 which incorporates a method of providing a fouling protective measure which may be activated using a determination that the fume hood 714 may be in a state of use. FIG. 26A illustrates an angular view of sensor bar 2600, which may incorporate as sensor array 2400 as one embodiment, or sensor bar 2600 may incorporate a sliding mirror sensor such as 2500. The sensor bar 2600 further incorporates a rotational scanning motion 2306 around an axis 2604 about which sensor assembly 2601 moves. Sensor assembly 2601 may contain sensor array 2400 or sliding mirror sensor 2500. FIG. 26B further illustrates profile views of sensor 2600 with sensor assembly 2601 in several rotational positions. Profile 2605 illustrates assembly 2601 placed at a maximum downward sensing position 2611, where angle 2609 is at a maximum sensing angle. Sensing position 2610 represents a maximum upward sensing position. In embodiments, range sensing by 2601 involves a reciprocating motion of 2601 which alternates from counterclockwise motion as 2601 is rotated from position 2611 to 2610, followed by a clockwise motion as 2601 is rotated from position 2610 to 2611, following which the counterclockwise and then clockwise cycle is repeated. In embodiments, the angle 2609 which corresponds to position 2611 may be any angle. In embodiments, the angle 2609 which corresponds to open position 2611 may be less than 180 degrees, as measured between the fully closed position 2612 of 2601 and the open position 2611. When 2601 is positioned to the maximum downward position of 2611 the light 2608 emitted and returned to sensor element 2401 may travel the least distance for each of the scan field elements of 2301 because, in position 2611 the angle 2609 is such that the light beam 2608 impinges on the hood 714 work surface 208 slightly in front of and underneath sensor 2600.

In embodiments of 2600, rotation 2306 to achieve an angle 2609 may be accomplished using any electrical method of movement, including but not limited to an electric motor. In one embodiment, rotation 2306 is achieved using a servo motor which is incorporated within sensor 2600. The method of range sensing using sensor 2600 may involve the steps of first positioning the angle of 2609 and then performing a distance measurement at each transmission and detection location along the width 2204 of 2600, following which assembly 2601 is then positioned to the next angular increment of 2609 based upon a predetermined angular resolution of movement. Embodiments include any value of angular resolution of 2609. In a preferred embodiment, the angular resolution of motion 2306 may be angular steps of between 2 degrees and 5 degrees. In embodiments, the increments of angular steps followed by a distance measurement at each transmission and detection location along the width 2204 of 2600 continues until 2601 reaches position 2610 where, as has been described, the motion of 2306 may then be reversed to from a counterclockwise motion to a clockwise motion. In embodiments, the angle 2609 which correlates with maximum sensing position 2610 may be any angle. In one embodiment, the angle 2609 which correlates to maximum upward sensing position 2610 is 15 degrees, when measured with respect to closed position 2612.

Profile 2607 illustrates a fully closed position 2612 of sensor assembly 2601, which serves as an embodiment of providing a fouling protective measure which may be enabled using a method of determining that the fume hood 714 may be in a state of use. In embodiments of 2600 the fouling protective measure may, in addition to a closed position 2607, include some form of a seal 2602 which further isolates elements 2400 or 2500 from fume hood contaminants as a portion of assembly 2601 engages with seal 2602 when 2601 is placed in closed position 2612. In embodiments, seal 2602 includes any form of seal, sealant, or gasket. In one embodiment, seal 2601 is a gasket made from a fluoroelastomer material such as, but not limited to Viton®. In an embodiment, the fouling protective measure illustrated in 2607 is further enhanced by making the sensing end 2613 of assembly 2601 angled at an angle 2609 so that when assembly is placed in position 2612, a force is exerted on gasket 2602 which compresses 2602 and therefore provides an enhanced seal to assembly 2601. In embodiments, angle 2609 includes any angle. In an embodiment, angle 2609 is an angle between 3 degrees and 7 degrees.

Figure 27:
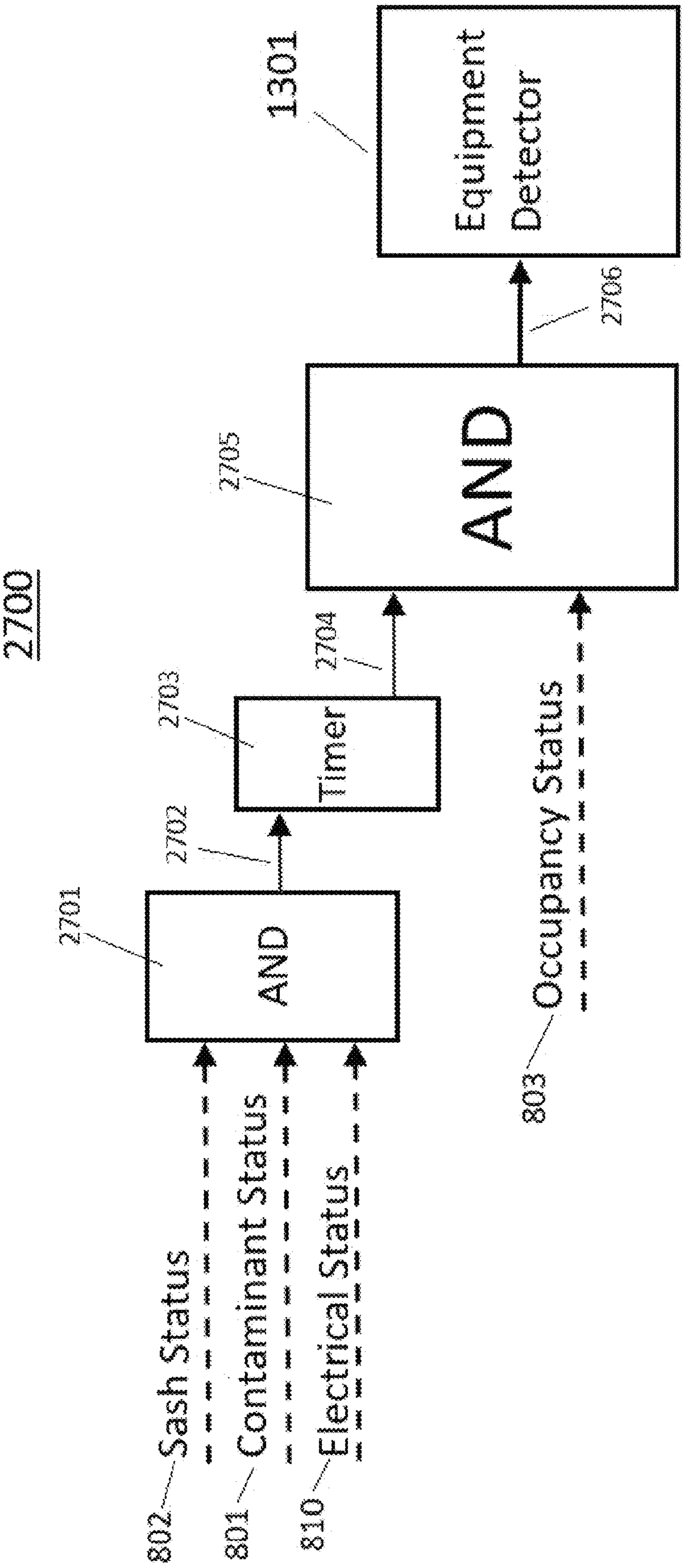
FIG. 27 illustrates logic for rendering a fouling protective measure.

In an embodiment of 1301, the range sensing operation of 1301 is only enabled when a method of determining that the hood 714 may be in a state of use determines that the hood 714 may not be in use. As has been described, if the method of determining that the hood 714 may be in a state of use determines that the hood 714 may be in use then, in this embodiment, a fouling protective measure is applied to equipment detector 1301. For example, when it is determined that the fume hood 714 may be in a state of use the sensor bar of 2600, which is an embodiment of 1301, may be commanded into a closed position 2607 to protect sensor elements 2400 or 2500 from fouling due to hood 714 contaminants that may be present. FIG. 27 illustrates an embodiment of the logic which may be applied as a method of determining that a fume hood 714 may be in a state of use for purposes of enabling or disabling a fouling protective measure applied to equipment detector 1301 and the embodiments of 1301 thereof. Embodiments of 2700 may utilize or omit any combination of sash status 802, contaminant status 801, electrical status 810 and occupancy status 803 combined with the logic of 2700 as a method of determining if hood 714 is in a state of use for purposes of enabling or disabling a fouling protective measure to equipment detector 1301. As an embodiment, the logic 2700 may enable or disable a fouling protective measure to equipment detector 1301 based on a combination of sash status 802, electrical status 810 and occupancy status 803. In other embodiments, both occupancy status and contaminant status 801 may be omitted from logic 2700. The logic of 2700 performs logical "AND" functions which may include a timed AND function for parameters contaminant status 801, sash status 802 and electrical status 810 along with a non-timed AND function applied to occupancy status 803. A timed AND function is provided via a combination of AND block 2701 and timing function 2703 whereby logical output 2704 will only be set to "true" when each of the chosen parameters 802, 801, 810 have been in a true state for a period of time set in timer 2703. In one embodiment, timer 2703 may be set to a value that is equivalent to a desired fume hood flushing time. In another embodiment the timer value of 2703 may be set to a value that is a fraction of the fume hood flushing time set in timer 811. As an example, if the fume hood flushing time is 2 hours, one may choose a value of 30 minutes for timer 2703. In another embodiment, a desired value for a fume hood flushing time may be established by setting the value of timer 2703 and by reducing the value of timer 811 to a value of zero or some fraction of 2703. Logic 2700 also includes an optional AND function 2705 which performs an AND operation on the timed AND function result 2704 and occupancy status 803. The result of 2705 is fouling protection enable 2706 which signifies the logical condition to enable or disable a fouling protective measure applied to equipment detector 1301. Based on the logic of 2700, fouling protection to detector 1301 shall be enabled when 2706 is "false", signifying that one of possible signals 802, 801, 810 or 803 is "false". Embodiments include the use of any combination of status conditions 802, 801, 810 and 803 to produce fouling protection enable signal 2706. In embodiments, logic 2700 may be performed within logic 702, BAS 705, hood controls 617, fume hood monitor 706, or detector 722. In embodiments, output 2702 may be communicated to detector 1301 using any form of digital communications, two state analog signal, relay contacts or binary signal.

An important aspect of this disclosure is that it includes embodiments which ease the field configuration of equipment detector 1301. For example, embodiments of sensor bar 2201 simplify the method of establishing the depth of equipment free zone 1303 based upon the width 2204 of bar 2201. In another embodiment, the configuration of sensor bar 2201 incorporates a zone training method used to configure sensor bar 2201 based at least in part upon the internal geometry of hood 714, wherein the zone training method is used to define the equipment free zone boundaries. As has been described, fume hoods can vary considerably in size, especially in terms of hood width 1306. Fume hoods also vary considerably in their distance between the work surface 208 and the interior portion of their top 1307. Given these geometric variations in fume hoods, the equipment free zone that sensor bar 2201 may be configured to support may vary considerably as well. Using the zone training method of this disclosure, sensor bar 2201 may be configured in a semi-automated manner using a method of determining the volumetric shape of the equipment free zone 1303 when zone 1303 is free of equipment and then storing ranging data that correlates to this volumetric shape, the said ranging data is subsequently used by sensor bar 2201 as reference data set against which ranging data is compared as a method of determining if equipment is present within the zone 1303. Using this method, the ranging data which correlate to the equipment free zone 1303 may be obtained without manual methods of hood geometry.

Figure 28:
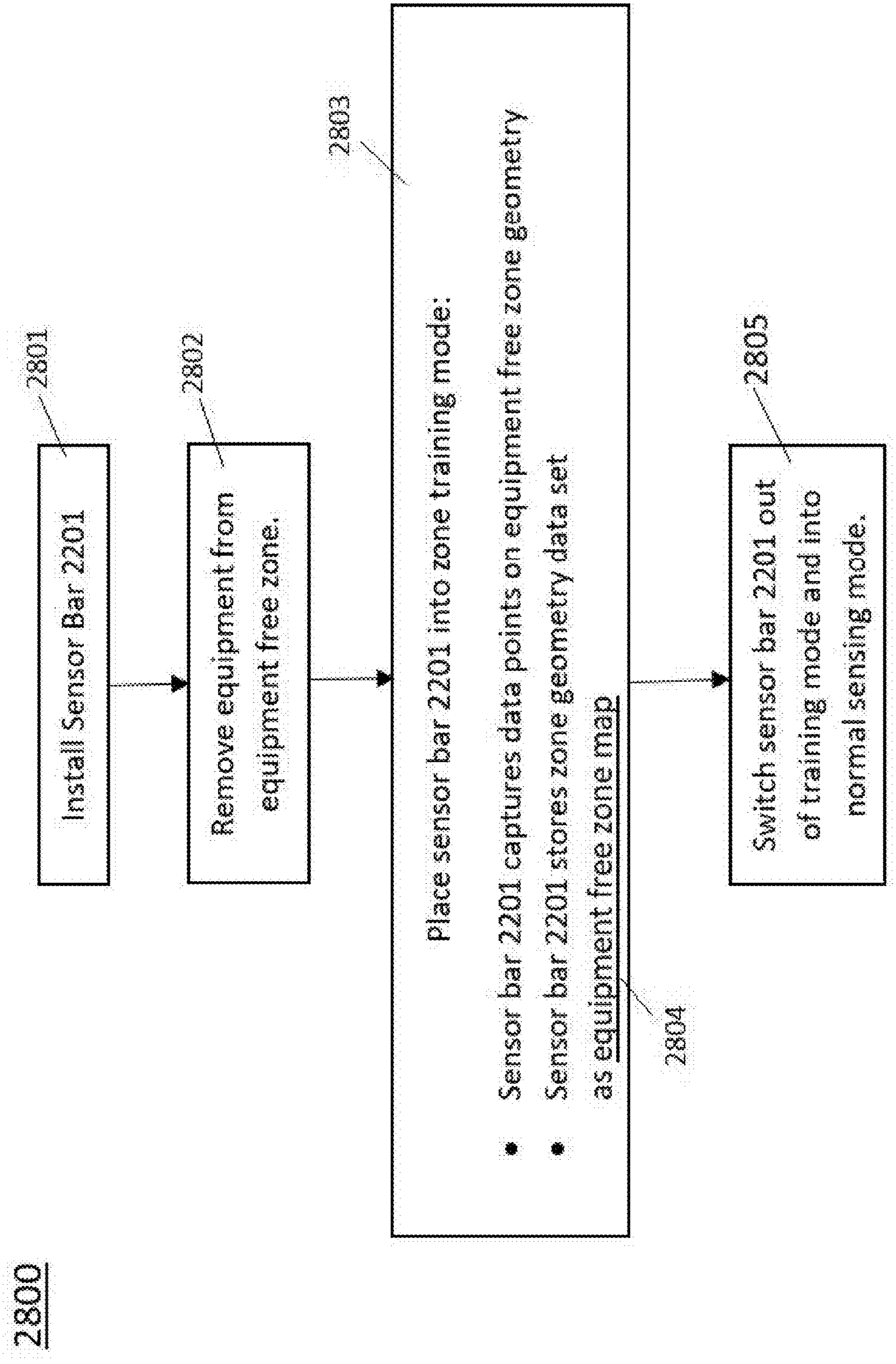
FIG. 28 illustrates a process for rendering a zone training mode.

FIG. 28 illustrates an embodiment of a procedure with the described zone training method. The procedure of 2800 may for example be performed by a field technician responsible for configuring equipment sensor 2201. The procedure of 2800 starts with the installation 2801 of sensor bar 2201 to an interior hood 714 location such as hood wall 2202, in which sensor bar 2201 is positioned to at least span the depth 1305 of the equipment free zone 1303. As an embodiment of the zone training method, in step 2802, all equipment is removed from equipment free zone 1303 so that sensor bar 2201 may be trained to identify a condition where no equipment is present within zone 1303. As an alternate embodiment, the zone training method performed by sensor bar 2201 includes a training method which is capable of identifying a zone 1303 as being free of equipment, even though some permanently present equipment exists within the zone 1303. In some cases for example, it may be desirable to allow some equipment, such as a portion of a beaker stand or other equipment which may unavoidably protrude into a portion of zone 1303 on a permanent basis to remain in the hood 714 and, in this embodiment, the zone training mode 2803 will identify such equipment as part of the equipment free zone geometry and map the equipment or portions of equipment as being a part of the equipment free zone 1303. Once equipment has been removed in step 2802, in step 2803, sensor bar 2201 is placed into a zone training mode. The zone training mode of 2803 causes sensor bar 2201 to perform a scanning operation from a minimum angular position 2611 to a maximum position 2610 in increments of angular steps based upon a predetermined angular resolution involving a distance measurement at each transmission and detection location along the width 2204 of 2600 for each angular step until the full range has been scanned from minimum position 2611 to maximum position 2610. Note that embodiments include any scanning sequence that results in the angular range between position 2611 and 2610 to be scanned. During the zone training mode of 2803, the ranging data points which are captured by sensor bar 2201 for each transmission and detection location along the width 2204 for each angular step spanning between position 2611 and 2610 represent the geometry of equipment free zone 1303, and the associated ranging data is stored in memory within sensor bar 2201 as the equipment free zone map 2804. In embodiments, the equipment free zone map serves as a reference against which, when in normal ranging mode, ranging data points for each transmission and detection location along the width 2204 at each angular increment between positions 2611 and 2610 is compared. The data points within equipment free zone map 2804 represent the minimum distance for each position of 2601 during normal ranging operation 2805, below which the equipment free zone 1303 will not be considered to be free of equipment.

In embodiments, the sensor bar 2201 may be placed into zone training mode using any possible method of software or hardware methods including but not limited to a software desktop or mobile application which communicates wirelessly, via a serial port or over a network to sensor bar 2201. For example, sensor bar 2201 may have any form of Universal Serial Port, enabling a field technician to plug into 2201 and communicate to the sensor bar to place 2201 into zone training mode. In other embodiments, the sensor bar 2201 may be placed into zone training mode using a hardware jumper that is on board 2201 or via a switch or other hardware method.

As has been described, in some fume hood applications, the hood 714 may be equipped with a combustible gas source (such as but not limited to that supplied through valve 2205) for purposes of operating a Bunsen Burner or some other gas fired heat source. When this is the case, it is not desirable to place hood 714 into minimum flow setback when the gas is in use as, usually, when the gas (such as that supplied through 2205) is in use it is for purposes of heating compounds which will give off vapors which creates an occupant exposure risk and, therefore, the hood 714 should be considered active under these conditions and should not be operated at reduced minimum flow levels. As has been described, in one embodiment involving a method of determining gas status, the flow of gas through valve 2205 may be detected and, when gas flow is present, this condition may be used either in addition to or in combination with electrical status 810 to disable minimum flow setback of the hood 714. Further embodiments of methods of determining gas status may include any method of determining if valve 2205 is open. One important consideration when applying a gas status embodiment as a logical input to timer 811 or 2703 is that the hood flushing time must be appropriately set to ensure that any compounds that were being actively heated when gas was being applied through 2205 for combustion have sufficiently cooled to ensure that compound vapor pressures are no longer elevated by thermal conditions before placing hood 714 into minimum flow setback. With embodiments of methods of determining fume hood 714 electrical status, similar considerations of hood 714 flushing time must also be made when using, for example, an electrical hot plate as the heating source, because equipment may remain at elevated temperatures for many minutes or longer after a hot plate or other heat source has been disabled, depending on the heat capacity of the equipment that has been heated. In some cases, the heat capacity of objects or compounds which are heated by a flame or combustible source, such as but not limited to a Bunsen burner, or heated by an electrical source, such as but not limited to a hot plate may vary considerably. Because of this, in some cases, the choice of an effective hood flushing time determined by timer 811 or 2703, may be difficult to determine. This may lead to very conservative settings, resulting in the application of relatively long hood flushing times, and this may result in reduced energy efficiency as the amount of time that the hood 714 may be in a state of minimum flow setback will be reduced.

Figure 29:
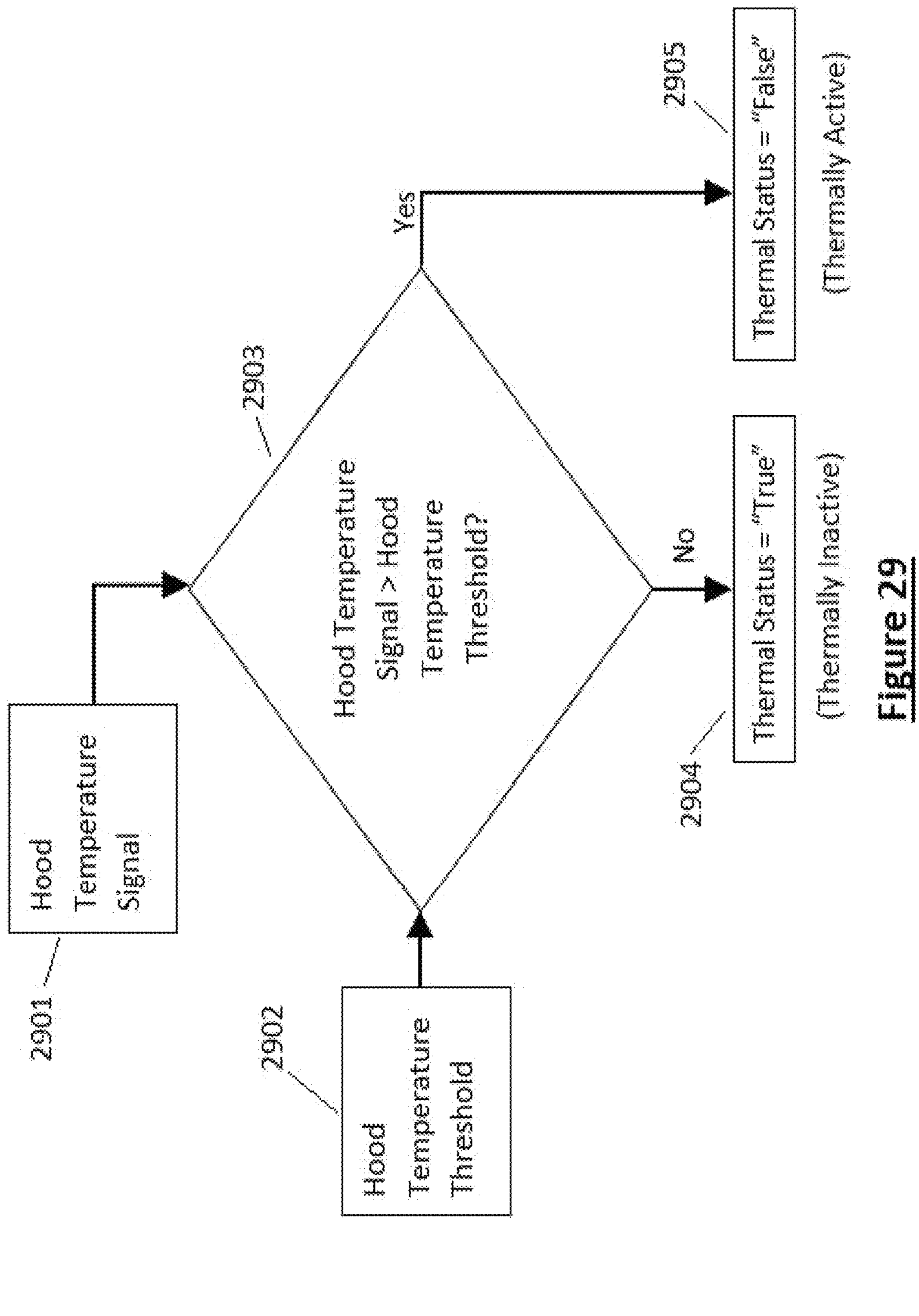
FIG. 29 illustrates logic for rendering a hood thermal status as a non-contaminant usage condition.

In embodiments, hood condition monitoring criteria used to implement hood minimum flow setback may include systems and methods to determine a fume hood's thermal status (or equivalently hood thermal status or thermal status) 819 using temperature sensing of surfaces and objects within hood 714 as one of the criteria for hood minimum flow setback. Embodiments of fume hood thermal status 819 pertain to systems and methods which inhibit the minimum flow setback of a hood 714 under conditions where the temperature of one or any number of thermally sensed locations within hood 714 is higher than a predetermined temperature threshold value that may be associated with an active heat source used within hood 714. FIG. 29 illustrates the logic 2900 which may be used to determine the thermal status of a fume hood 714. In embodiments where the temperature, as represented by a hood temperature signal 2901, of the one or any number of thermally sensed locations within hood 714 is higher than a predetermined temperature threshold value 2902, the hood 714 may be classified as being thermally active and logic 819 would be set to false (2905) which results in logical output 808 being set to false, which disables minimum flow setback to hood 714. In embodiments, where the temperature of all thermally sensed locations 2901 within hood 714 is lower than a predetermined temperature threshold value 2902, the hood 714 may be classified as being thermally inactive and logic 819 would be set to true (2904) which results in logical output 808 being set to true, provided that all other used inputs to logic 807 AND logic are also logical true.

In embodiments, the temperature of the locations that may be sensed to determine the hood thermal status 819 may include any surfaces, objects, or combination of surfaces or objects, which are contained within or part of the fume hood 714, including any portions of the fume hood 714 itself, or any portion of the fume hood 714 or components which are in thermal communication with surfaces or objects contained within fume hood 714.

Thermal or temperature sensing used in embodiments of determining thermal status 819 may include any method of temperature measurement to produce a hood temperature signal 2901 using module 732, including but not limited to the use of one or any number of discrete temperature sensor elements including but not limited to: thermistors, resistive temperature devices (RTD's), semiconductor sensors, and thermocouples. Embodiments of temperature sensing to determine thermal status 819 may also incorporate temperature sensing using any type of non-contact temperature sensing method. In embodiments of temperature sensing to determine thermal status 819, an optical infrared (IR) sensor having a field of view may be used as a non-contact temperature sensing method; wherein the IR sensor approach may include but not limited to a thermal imaging camera, microbolometer technology, any type of thermographic camera, thermopile array, or any type of infrared optical sensor array or infrared optical discrete elements. In embodiments, temperature sensing used in determining thermal status 819 may be integrated within sensor 722, 1301, 2201 or 2600 or the temperature sensing may be performed by any number of standalone temperature sensing devices. For example, the sensor 2600 may be a time of flight sensor bar which incorporates optical detection using infrared detectors, such as but not limited to detectors 2407, to perform its object detection function; yet these infrared optical detectors 2407 may also be utilized to perform heat or temperature measurements within hood 714. The hood temperature signal 2901 that is produced by the one or more temperature sensor measurements may be any form of either a raw or processed signal. In embodiments hood temperature signal 2901 may be a processed signal involving any method of processing one or more temperature signals, including but not limited to any method of signal averaging, peak detection, box car averaging or regional filtering for purposes of producing a reliable temperature measurement. In an embodiment, hood temperature signal 2901 may be an averaged temperature measurement over a field of view. As an example of a processed temperature signal, in embodiments where a thermographic camera is used to produce a hood temperature signal 2901, the signal 2901 may be a computed value that is stored in a memory location within module 732 that is the processed output of a, for example, 240×320 pixel array. The signal 2901 in this case is the processed result of 76,800 discrete temperature measurements. In this example, as an embodiment, the 76,800 discrete temperature measurements may be analyzed by a microcontroller within module 732 to determine the maximum temperature value of the discrete temperature measurements, which may be the value used as signal 2901 that is indicative of hood temperature. In other embodiments, statistical smoothing may be applied to the data taken from a thermographic pixel array, or some other heat sensing array, and the maximum of the smoothed data may be taken as signal 2901.

An example of a standalone temperature sensor approach applied to determining thermal status 819 includes but is not limited to a discrete temperature sensor that is mounted or embedded within a heat source such as a hot plate, Bunsen burner, or other heat source which may be used in hood 714; wherein the standalone temperature sensor, which is in communication with the module 732, provides a signal 2901 that is indicative of the heat source's temperature and this heat source temperature signal 2901 is compared to a temperature threshold signal 2902 and logic 2903 performs a comparison between the hood temperature threshold 2902 and temperature signal 2901 to determine thermal status 819. In embodiments, the standalone temperature sensor used to produce temperature signal 2901 may be in communication with module 732 using any wired or wireless signaling method.

In embodiments, the logic 2900 may be performed by any combination of electronics or digital processing provided by module 732 which may be integrated within object detector 722, hood controls 617, monitor 706, module 728, or BAS 705. In one embodiment, logic 2900 may be performed by remote data center 730.

The hood temperature threshold 2902 is a setting which may be a configuration setting within module 732. As an embodiment, temperature threshold 2902 may be, but is not limited to, a setting that is made using a potentiometer which is incorporated within an electronic circuit within 732. As a further embodiment, temperature threshold 2902 may be a setting that is stored in memory within 732 where it is referenced by a CPU which performs logic 2900. In most applications, setting 2902 may represent a fixed temperature threshold value which may be slightly higher than the ambient temperature of the occupant lab space outside of hood 714. When a fixed temperature threshold value 2902, it should be set to a value that is several degrees Fahrenheit warmer than the highest possible ambient temperature which may be realized within the occupant lab space outside of hood 714 so that temperature signal 2901 during warm days of hood operation does not result in thermal status 819 being erroneously set to false, even though hood 714 may be thermally inactive. For example, temperature threshold 2902, as a fixed value, may be set to a value of between 85- and 100-degrees F.

In another embodiment, temperature threshold 2902 may be a floating value which may be a calculated value that is equal to the sensed lab temperature outside hood 714 plus a fixed offset temperature value; wherein the fixed offset temperature value prevents thermal status 819 from being erroneously set to false when the interior temperature of 714 approaches the ambient temperature outside of 714, even though hood 714 may be thermally inactive. For example, the said offset temperature value may be set to a value between 10- and 30-degrees F. The floating value approach to creating threshold 2902 involves both hood 714 interior temperature measurements to create signal 2901 and one or more temperature measurements within the occupant lab space outside 714 plus an offset to produce signal 2902. Embodiments include any method of obtaining one or more temperature measurements within the lab space outside hood 714 including but not limited to any number of discrete temperature sensors which may be electrically connected to module 732, a networked lab temperature signal from BAS 705 communicated through connection 731 via logic 702, or any other practical way of providing logic 2900 with one or more lab temperature measurements which represent the ambient temperature outside of hood 714.

Embodiments of systems and methods for determining fume hood thermal status 819 may include a fouling protective measure for the one or more temperature sensors used to produce temperature signal 2901; wherein the fouling protective measure may be enabled when it is determined that the hood 714 may be in a state of use. Fouling protective embodiments for sensors associated with signal 2901 may be important in embodiments where the one or more sensors used to produce 2901 are optical IR sensors, given that any form of optical sensor may be subject to fouling when hood 714 is in use. In embodiments signal 2706 used to enable a fouling protection measure with equipment detector 1301, may also enable a fouling protective measure for one or more temperature sensors associated with temperature providing signal 2901 when, using logic 2700, it is determined that the hood 714 may be in a state of use. Embodiments include the use of any combination of status conditions 802, 801, 810 and 803 to produce fouling protection enable signal 2706.

Methods of providing a fouling protective measure for one or more sensors associated with hood temperature signal 2901 includes any method of protecting a temperature sensor from exposure to contaminants that would result in sensor fouling. This includes but is not limited to any method of providing isolation to any or all components of temperature sensors used to create hood temperature signal 2901 or providing a method of decontaminating any or all components of temperature sensors used to produce signal 2901 or providing a combination of sensor isolation and decontamination to sensors associated with signal 2901. In one embodiment, when the fouling protective signal 2901 has been enabled to activate a fouling protective measure, as a fouling protective measure the one or more optical sensors associated with hood temperature signal 2901 are protected from the interior environment of hood 714 using a method of concealing the one or more optical temperature sensors in a sealed housing. In this embodiment, when the fouling protective signal 2901 has been disabled, the one or more optical sensors associated with hood temperature signal 2901 are then exposed providing the one or more sensors with a field of view within hood 714.

Note that in some applications, according to the methods of this disclosure, it may be sufficient to provide a hood thermal status 819 without a hood electrical status 810. This would especially be but is not limited to the case where the principal hood exposure concern is due to the possible presence of a flame or other heat source and no other hood apparatus such as stirrers or mixers or other non-thermal but electrical stimulus to chemical compounds is expected to be present within hood 714. In other scenarios, such as but not limited to cases where a gas flame source and other non-thermal but electrical stimulus may be expected, the hood minimum flow setback application may require both a thermal status 819 and an electrical status 810. In yet other cases, such as but not limited to scenarios where all thermal sources, such as but not limited to hot plates, and other non-thermal apparatus, such as but not limited to stirrers, operate from an electrical source, then it may be sufficient to only use a hood electrical status 810 without a thermal status as a criterion for fume hood minimum flow setback. Also, as has been described, in embodiments where a contaminant status 801 is utilized for a hood 714, neither an electrical status 810 nor a thermal status 819 may be required in circumstances that the multipoint air sampling system used in the determination of contaminant status 801 can detect all the chemical compounds intended for use in hood 714.

What is claimed is:

1. A method of providing minimum flow setback to a VAV fume hood, comprising:

determining whether to enable or disable the minimum flow setback of the fume hood based upon a plurality of setback criteria, which includes:

a fume hood equipment status based on detection of an object presence within an equipment free zone and object motion within a motion detection zone;

a fume hood sash status based on a setback sash threshold;

a fume hood electrical status corresponding to whether electrical equipment within the fume hood is operational, and a fume hood flushing time; and providing one or more minimum flow setback signals to hood controls of the fume hood, the one or more minimum flow setback signals being responsive to results of the determination of whether to enable or disable the minimum flow setback of the fume hood.

2. The method according to claim 1 which incorporates at least a first and second phase of minimum flow setback, the first phase of minimum flow setback being temporarily interrupted anytime the fume hood is occupied, using a determination of occupancy status, while the second phase of setback is not affected by fume hood occupancy, wherein the second phase of minimum flow setback is activated following a predetermined period of time over which the first phase of minimum flow setback has been active.

3. The method according to claim 1 which incorporates at least a first and second phase of minimum flow setback, the first phase of setback having a magnitude of minimum flow setback that is less than that of the second phase of minimum flow setback, wherein the second phase of minimum flow setback is activated following a predetermined period of time over which the first phase of minimum flow setback has been active.

4. The method according to claim 1 wherein, one of the plurality of setback criteria includes a determination of fume hood thermal status which inhibits the minimum flow setback of the hood under conditions where the temperature of any number of thermally sensed locations within the hood is higher than a predetermined temperature threshold value associated with an active heat source used within the fume hood.

5. The method according to claim 1, wherein the equipment status is based on a common sensor to detect object presence within the equipment free zone and object motion within a motion detection zone that at least includes the equipment free zone.

6. The method according to claim 5 wherein, the common sensor used to detect both object presence and object motion comprises a time of flight-based sensor.

7. The method according to claim 1 wherein, the detection of object presence is based on capturing and processing an image of the equipment free zone using an imaging sensor and a sequence which is initiated following a determination by a timer function that all of the fume hood sashes have been closed, based on a setback sash threshold, for a predetermined period of time; the initiated sequence comprising the steps of:

activating a light to illuminate the equipment free zone;

capturing an image of the equipment free zone using an imaging sensor;

processing the image of the equipment free zone;

deactivating the light used to illuminate the equipment free zone;

setting a flag to indicate that the image has been taken so that the timer can be cleared;

and updating the equipment status based on whether there is object presence as determined by the processed image.

8. The method according to claim 1 wherein, the fume hood equipment status is based upon one or more sensors used to detect object presence within the equipment free zone and one or more sensors used to detect object motion within a motion detection zone that is any fraction of the equipment free zone of the fume hood.

9. The method according to claim 8 wherein, the one or more sensors used to detect object motion within at least the equipment free zone of the fume hood includes a time of flight-based motion detector.

10. The method according to claim 1, wherein the fume hood equipment status is based upon one or more sensors used to detect object presence within the equipment free zone and one or more sensors used to detect object motion within a motion detection zone that includes regions within the fume hood and space that is outside and in front of the fume hood.

11. The method according to claim 1, wherein the fume hood equipment status is based upon the detection of object presence within the equipment free zone and the detection of motion within a motion detection zone within the fume hood having a volume that exceeds the volume of the equipment free zone up to the entire interior volume of the fume hood.

12. The method according to claim 1, further including determining and communicating a minimum flow setback performance condition as an energy waste alarm which corresponds to a behavioral issue pertaining to the operation of the hood, the energy waste alarm being activated when the setback performance condition has been persistent for a period greater than an energy waste alarm delay time.

13. The method according to claim 1 wherein the sash status is based upon a setback sash threshold that is greater than a variable air volume (VAV) sash threshold of the fume hood.

14. The method according to claim 1 wherein the equipment free zone is defined by instructional signage placed inside the fume hood, wherein the detection of object presence is accomplished using an equipment detector that is calibrated to detect objects within the zone that is defined by the physical area of the instructional signage.

15. The method according to claim 1 wherein the setback criteria further includes an airflow status parameter that disables the minimum flow setback for the fume hood if an operational fault or alarm condition is present within the fume hood controls.

16. The method according to claim 1 wherein the one or more minimum flow setback signals is a binary signal to the fume hood controls, the binary signal serving to enable or disable the minimum flow setback to the fume hood associated with the fume hood controls.

17. The method according to claim 1 wherein the detection of object presence is accomplished using an equipment detector comprising an optical time of flight sensor bar incorporating a combined rotational scanning method with a linear horizontal scanning method, the sensor bar having a width that at least spans the depth of the equipment free zone as the zone intersects with the fume hood's work surface, used to inspect locations within the volume of the equipment free zone of the fume hood to determine the equipment status of the fume hood, comprising:

a method of defining the equipment free zone boundaries within a fume hood using a zone training method;

a method of scanning the defined equipment free zone to identify ranging data points which fall within the equipment free zone boundaries; and a method of determining the equipment status based upon the ranging data points.

18. A system for providing minimum flow setback to a VAV fume hood, comprising systems configured to:

determine whether to enable or disable the minimum flow setback of the fume hood based upon a plurality of setback criteria, which includes:

a fume hood equipment status based on the detection of object presence within an equipment free zone and object motion within a motion detection zone;

a fume hood sash status based on a setback sash threshold;

a fume hood electrical status used to determine if electrical equipment within the fume hood is in operation or not; and a fume hood flushing time;

provide one or more minimum flow setback signals to hood controls of the fume hood, the one or more minimum flow setback signals being responsive to results of the determination of whether to enable or disable the minimum flow setback of the fume hood.

19. The system according to claim 18 wherein, the equipment status is based on using a common sensor to detect object presence within the equipment free zone and object motion within a motion detection zone that at least includes the equipment free zone.

20. The system according to claim 18 wherein, the fume hood equipment status is based upon one or more sensors used to detect object presence within the equipment free zone and one or more sensors used to detect object motion within a motion detection zone that is any fraction of the equipment free zone of the fume hood.

* * * * *